United States Patent
Murakami et al.

(10) Patent No.: US 6,720,069 B1
(45) Date of Patent: Apr. 13, 2004

(54) SOUND ABSORBING STRUCTURE

(75) Inventors: Atsushi Murakami, Hamamatsu (JP); Shuuchirou Wada, Hamamatsu (JP); Kazuo Nishimoto, Hamamatsu (JP); Takahiro Niwa, Ota-ku (JP); Hiroto Sugai, Nerima-ku (JP); Haruko Sasaki, Yokohama (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/482,731

(22) Filed: Jan. 14, 2000

(30) Foreign Application Priority Data

| Jan. 14, 1999 | (JP) | ............................................. | 11-007994 |
| Mar. 19, 1999 | (JP) | ............................................. | 11-076152 |
| Mar. 19, 1999 | (JP) | ............................................. | 11-076153 |
| Dec. 22, 1999 | (JP) | ............................................. | 11-364690 |

(51) Int. Cl.$^7$ .............................. B32B 27/00; B32B 3/10
(52) U.S. Cl. ................ 428/319.3; 428/131; 428/134; 428/142; 428/147; 428/156; 428/158; 428/160; 428/218; 428/217; 428/319.7; 52/309.4; 52/309.8; 52/309.9
(58) Field of Search .............................. 428/131, 134, 428/142, 147, 156, 158, 160, 218, 217, 319.3, 319.7; 52/309.4, 309.8, 309.9

(56) References Cited

U.S. PATENT DOCUMENTS

| 4,128,683 A | * | 12/1978 | Nomura et al. | ............. | 156/219 |
| 4,522,165 A | * | 6/1985 | Ogawa | .................... | 123/195 C |
| 4,713,277 A | * | 12/1987 | Akiyama et al. | ............. | 164/79 |
| 5,665,943 A | * | 9/1997 | D'Antonio | .................. | 181/286 |
| 5,888,626 A | * | 3/1999 | Sensenig | ..................... | 428/206 |
| 5,981,046 A | * | 11/1999 | Masui et al. | ................. | 428/213 |

FOREIGN PATENT DOCUMENTS

| JP | 56-157346 | | 12/1981 |
| JP | 56-157347 | | 12/1981 |
| JP | 63-72033 | | 5/1988 |
| JP | 64-26799 | | 2/1989 |
| JP | 3-122366 | | 5/1991 |
| JP | 6-259082 | | 9/1994 |
| JP | 9-13943 | | 1/1997 |
| JP | 10-121598 | | 5/1998 |
| JP | 10-182865 | | 7/1998 |
| JP | 10-205021 | | 8/1998 |
| JP | 10-273938 | | 10/1998 |
| WO | WO-9628297 A1 | * | 9/1996 |
| WO | WO-9727370 | * | 7/1997 |

OTHER PUBLICATIONS

Translation of JP–10–182865, Nakamura et al, Jul. 10, 1998, 21 pages.*

* cited by examiner

*Primary Examiner*—Terrel Morris
*Assistant Examiner*—Hai Vo
(74) *Attorney, Agent, or Firm*—Nixon & Vanderhye P.C.

(57) ABSTRACT

A sound absorbing structure comprising at least one porous member including a plurality of holes, and the holes are at least one kind of through holes and non-through holes. It is preferable that a plurality of porous members are stacked. It is also preferable that the holes of porous members are formed as diameter-varied holes, and an area of opening of each diameter-varied hole formed in the surface opposite to a sound source is largest and the area of opening of each the diameter-varied hole is reduced in a direction of the thickness of the porous member. Moreover, it is also preferable that the sound absorbing structure further comprises a coating film formed on at least a surface of the porous member which is opposite to a sound source wherein the holes penetrates the coating film and the porous member.

35 Claims, 26 Drawing Sheets

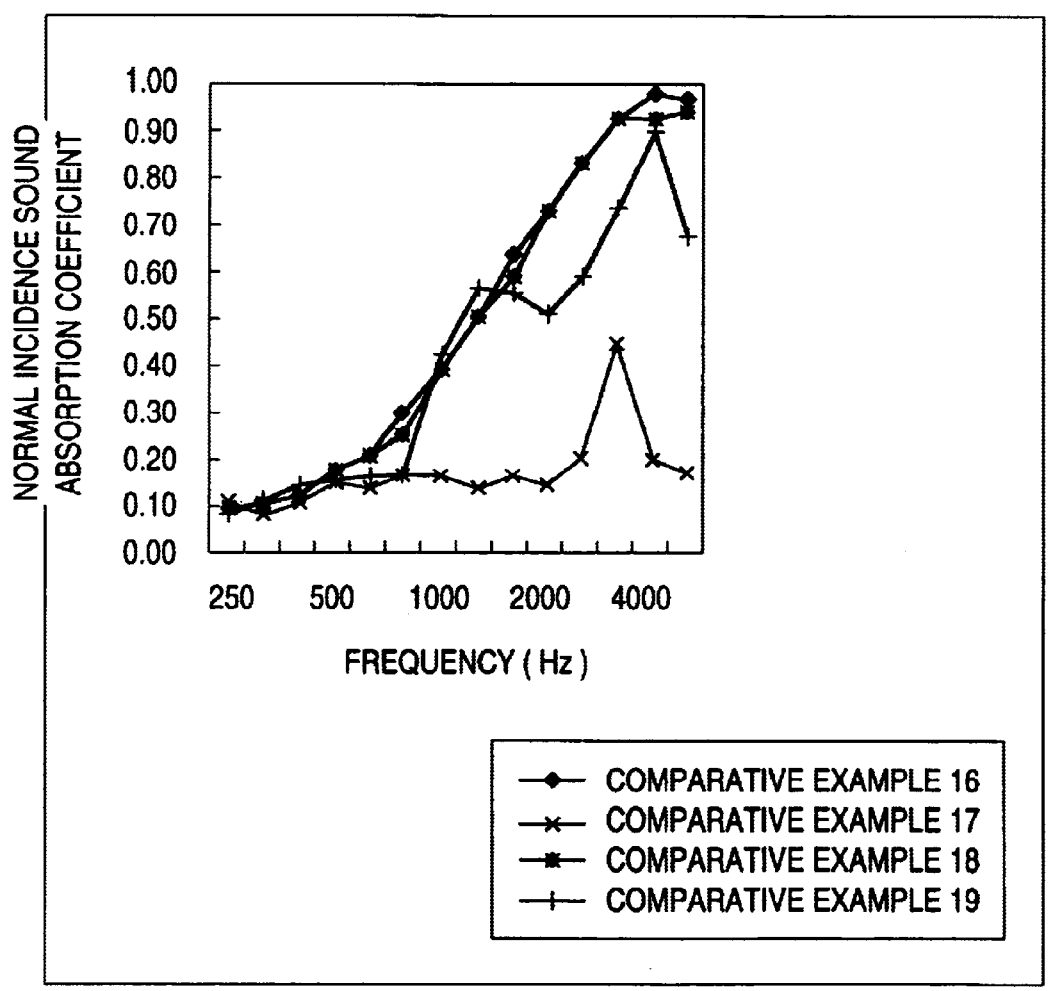

SOUND ABSORBING STRUCTURE

BACKGROUND OF THE INVENTION

1. Field of the Invention

The present invention relates to a sound absorbing structure constituted by a porous member. More particularly to a sound absorbing structure for use in an engine cover for an automobile, a sound insulating cover or the like.

2. Description of the Related Art

In general, a fact has been known that a porous member such as open-cell foam and glass wool has a satisfactory sound absorbing characteristic. Therefore, the porous member has been used to absorb sound, for example, in the engine cover or the bonnet of an automobile in order to eliminate noise propagated from an automobile. However, the thickness of the porous member constitute by the open-cell structure must be enlarged to raise the sound absorption coefficient in the midrange and the bass range. Since the space in the inside portion of the engine cover or in the inside portion of the bonnet is limited, there are many cases that the thick sound absorbing member cannot be disposed. Therefore, there are disadvantages such that the conventional porous member having the open-cell structure or continued voids cannot attain a satisfactory sound absorbing effect.

Moreover, a porous member having a cell structure obtained by mixing the open-cells and closed-cells has been employed. In addition, a porous member constituted by an open-cell urethane foam member with a coating film has been also employed as a sound absorbing member. The porous members having the above-mentioned mixed-cell structure and the open-cell urethane foam member with a coating film have a sound absorption peak in a relatively low frequency range. However, a satisfactory high peak value cannot be obtained. As the thickness is increased, the sound absorption peak is shifted to the low frequency range. However, since the width of the peak frequency is too narrow, only when a material having a thickness corresponding to a frequency in a vicinity of a specific and single frequency of a sound source is employed, a somewhat satisfactory sound absorbing effect is sometimes obtained.

However, there are may cases that thickness of the porous members cannot be changed because the structure of the position for use, for example, the inside portion of the engine cover or the inside portion of the bonnet, restricts the thickness. In general, noise from the engine room of an automobile has a frequency range having a somewhat large width. The porous member having the mixed-cell structure cannot attain a satisfactory sound absorbing effect because the width of the peak frequency of the sound absorption coefficient is too narrow and the peak frequency depends on the thickness.

In addition to the above-mentioned porous members, a porous member having a cell structure constituted by only closed-cells has been also used. For example, sponge and expanded rubber are used as this kind of porous member. However, the sound absorption coefficient is too low in the overall frequency range. Therefore, substantially sound absorbing effect cannot be obtained.

Also a perforated plate is employed which is a resonant-type sound absorbing structure incorporating an air layer disposed at the rear of a hard board having through holes. Although a usual perforated plate has a somewhat satisfactory sound absorbing characteristic in a single frequency range, the overall sound absorbing characteristic is unsatisfactory. It is known that a urethane open-cell foam or glass wool provided for the rear air layer of the perforated plate enables the sound absorbing characteristic to be improved. The sound absorbing characteristic, however, is unsatisfactory.

For example, a sound absorbing structure has been disclosed in JP-A-9-13943 which has a structure that a sound absorbing base and a perforated skin member are combined with each other. In JP-A-56-157347, a sound absorbing structure has been disclosed which has a structure that a porous member and a perforated film are combined with each other. In JE-A-56-157346, a sound absorbing structure has been disclosed which has a structure that a porous member and a soft resin sheet provided with air chambers are combined with each other. The foregoing sound absorbing structures has a satisfactory sound absorbing effect in only a specific frequency range. In only a case where a frequency range of noise which is actually made and a frequency range in which the sound absorbing effect is obtained cannot coincide wit h each other, noise can be reduced. The frequency range in which the sound absorbing effect can be obtained cannot arbitrarily be controlled. Therefore, there arises a problem in that noise reduction cannot usually be achieved. To enhance the sound absorbing effect of the foregoing sound absorbing structure, the thickness of the sound absorbing structure must be enlarged. However, if the sound absorbing structure having a large thickness cannot be provided owing to a space limit, noise cannot be reduced.

Hereinafter, the above-mentioned porous members including open-cells and/or closed-cell are generally called also as "foam members."

SUMMARY OF THE INVENTION

In view of the foregoing, an object of the present invention is to provide a sound absorbing-structure and a sound insulation cover having a satisfactory sound absorbing characteristic over a wide frequency range and improving the sound absorbing characteristic in a required frequency range to meet a purpose or the like and the total sound absorption coefficient in a wide frequency range. In addition, it is also an object of the present invention to provide an engine cover incorporating the sound absorbing structure.

The inventors of the present invention have energetically performed studies. As a result, it has been found that a special process to which a foam member having a specific cell structure enables a satisfactory sound absorbing effect to be obtained in a wide frequency range. Moreover, the sound absorbing characteristic in a required frequency range can easily be improved. Moreover, it has been found that an equivalent sound absorbing characteristic can be attained even if the thickness is half or smaller as compared with the sound absorbing material constituted by the conventional foam member. Thus, the present invention is established on the basis of the foregoing facts.

That is, according to the present invention, there is provided a sound absorbing structure comprising a foam member having a cell structure formed by mixing open-cells and closed-cells, wherein a plurality of through holes, which penetrate through the foam member, and/or non-through holes, which do not penetrate through the foam member, with a specific diameters, shapes and depth are formed in the foam member and an engine cover for an automobile incorporating the sound absorbing structure.

Moreover, a structure has been found in which foam members each having a specific cell structure are stacked in a specific state. This structure enables a satisfactory sound absorbing effect to be obtained over a wide frequency range. Moreover, the sound absorbing characteristic in a required frequency range can be easily improved. As compared with a sound absorbing material constituted by a conventional foam member, an equivalent sound absorbing characteristic can be obtained if the thickness is half or smaller. Thus, the present invention has been established on the basis of this facts.

That is, according to the present invention, there is provided a sound absorbing structure comprising two or more stacked layers of foam members each having a mixed-cell structure of open-cells and closed-cells and an engine cover for an automobile incorporating the sound absorbing structure Furthermore, a special hole formation in a foam member having a specific cell structure enables a satisfactory sound absorbing effect to be realized in a wide frequency range. Moreover, the sound absorbing characteristic can be easily improved in a frequency range having a certain width including a required frequency. As an alternative to this, the sound absorption coefficient in a wide frequency range can totally be improved so that arbitrary control of the sound absorbing characteristic is permitted. Another fact has been found that a sound absorbing characteristic equivalent to the conventional sound absorbing member comprising the foam member can be realized if the thickness is half or smaller. Thus, the present invention is established on the basis of the foregoing facts.

That is, according to the present invention, there is provided a sound absorbing structure comprising a foam member having a cell structure formed by mixing open-cells and closed-cells with one another, wherein the area of opening of each diameter-varied hole formed in the surface opposite to a sound source is largest and the area of opening of each diameter-varied hole is reduced in a direction of the thickness of the foam member and an engine cover for an automobile incorporating the sound absorbing structure.

Moreover, the following fact was found: a structure comprising a coating film formed on at least a surface of a porous member including continued voids which is opposite to a sound source; and through holes penetrating the coating film and the porous member so that the areas of openings of the through holes are adjusted. Thus, the sound absorbing characteristic in a required frequency range can easily be improved. Moreover, the sound absorbing characteristic can easily be controlled. When the sound absorbing structures are laminated, a satisfactory sound absorbing characteristic can be realized in a wide frequency range. As compared with a conventional sound absorbing member comprising a foam member or a molded fibrous material, a sound absorbing characteristic as well as or better than that of the conventional sound absorbing structure can be realized even if thickness of the foam member is not more than half of the conventional one. When the foregoing sound absorbing structure is mounted on a cover, the sound insulation characteristic of the sound insulating cover can be improved. The present invention is established on the basis of the foregoing fact.

That is, according to the present invention, there is provided a sound absorbing structure comprising: a coating film formed on at least a surface of a porous member including continued voids which is opposite to a sound source; and through holes penetrating the coating film and the porous member and a sound insulating cover comprising the sound absorbing structure.

BRIEF DESCRIPTION OF THE DRAWINGS

FIG. 19 is a graph showing results of measurement of the sound absorption coefficient of sound absorbing structures according to Comparative Examples 16, 17, 18 and 19;

DETAILED DESCRIPTION OF THE PREFERRED EMBODIMENTS

Figure 1:
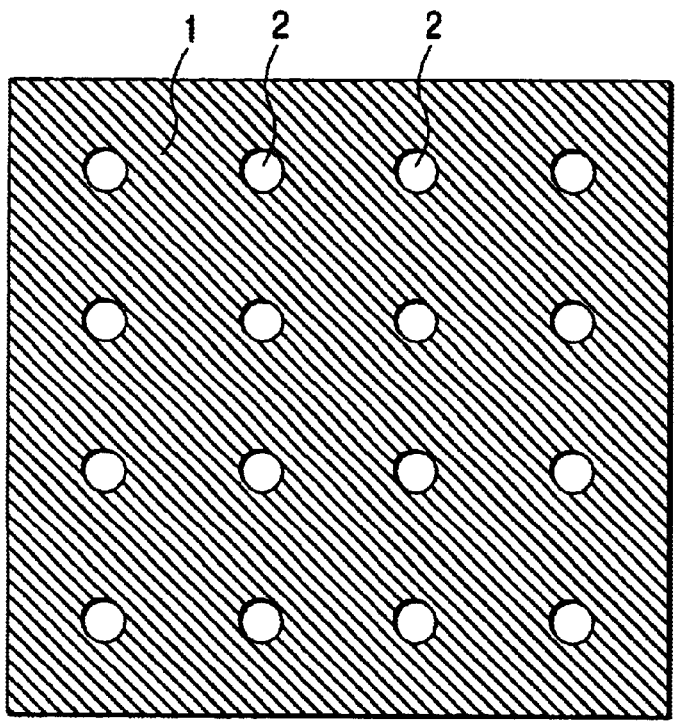
FIG. 1 is a portion of a plan view showing an first embodiment of a sound absorbing structure according to the present invention.

Now, the first embodiment of the present invention will be described in detail.

In general, the cell structure of a foam member is classified roughly into one including only open-cells, mixture of the open-cells and closed-cells and only closed-cells.

The foam member constituted by only the open-cells has a low normal incidence sound absorption coefficient in the low frequency region. Therefore, the thickness of the material must be enlarged. If through holes, which penetrate through the foam member, or non-through holes, which do not penetrate through the foam member, are formed in the foam member having the open-cells structure, the sound absorbing effect cannot be improved. On the contrary, the effect deteriorates in some cases.

On the other hand, the foam member constituted by only closed-cells has a low normal incidence sound absorption coefficient in the overall frequency range. When through holes or non-through holes are formed in the foam member having the closed-cell structure, the sound absorbing effect can be improved. The obtained structure has a low peak value of the sound absorption coefficient. Also the width of the peak frequency is too narrow to overcome the above-mentioned problem.

The sound absorbing structure according to the present invention comprises a foam member having a cell structure formed by mixing open-cells and closed-cells, and a plurality of through holes and/or non-through holes are formed in the foam member. Thus, a satisfactory sound absorbing effect can be obtained. Moreover, the sound absorbing characteristic in a required frequency range can easily be improved.

It is preferable that the main component of the foam member having the cell structure formed by mixing the open-cells and the closed-cells is rubber or elastomer. With these materials, soft foam members can be formed so that a sound absorbing mechanism using vibrations of membranes of cells appears. Therefore, a sound absorbing structure having a satisfactory sound absorbing characteristic can be obtained. The rubber or the elastomer is exemplified by any one of a variety of rubber, such as natural rubber, CR (chloroprene rubber), SBR (styrenebutadiene rubber), NBR (nitrilebutadiene rubber), EPDM (ternary polymer of ethylene, propylene and diene) rubber, silicon rubber, fluorine rubber and acrylic rubber, and any one of various elastomers, such as a thermoplastic elastomer and soft urethane. Even though, the material is not limited to the foregoing materials, a foam member mainly composed of EPDM rubber is a satisfactory material for an engine cover for an automobile since it has the satisfactory balance among the heat resistance, ozone resistance and the cost.

Also a sheet constituted by foam members made of EPDM or NBR and marketed as a waterproof sealer for a construction material or low electricity may be employed.

The foam member according to the present invention has the mixed-cell structure obtained by mixing open-cells and closed-cells. Therefore, when the ratio of the open-cells is increased, the problem of the foam member including only open-cells arises. When the ratio of the closed-cells is increased, the problem of the foam member including only closed-cells arises.

In general, the foam member having the open-cell structure has a high coefficient of water absorption, and the foam member having the closed-cell structure has a low coefficient of water absorption. The foam member having the mixed-cell structure of the open-cells and the closed-cells has an intermediate coefficient of water absorption. Therefore, when the coefficient of water absorption is specified, the ratio of open-cells and closed-cell can be determined. The coefficient of water absorption is measured by method B of JIS K6767. It is preferable that the coefficient of water absorption of the foam member according to the present invention is not lower than 0.01 g/cm$^3$ nor higher than 0.2 g/cm$^3$, more preferably not lower than 0.02 g/cm$^3$ nor more higher 0.15 g/cm$^3$, and most preferably not lower than 0.04 g/cm$^3$ nor higher than 0.1 g/cm$^3$. The foam member having the mixed-cell structure of the open-cells and the closed-cells satisfying the frequency range is able to significantly improve the sound absorbing characteristic when through holes or non-through holes are provided.

Since a foam member having a low bulk density has a low normal incidence sound absorption coefficient in the low frequency range, the thickness of the material must be enlarged. If through holes or non-through holes are formed in the foam member having a low bulk density, the sound absorbing effect cannot substantially be improved. The sound absorbing effect sometimes deteriorates.

On the other hand, the foam member having the high bulk density exhibits a low normal incidence sound absorption coefficient in the overall frequency range. When through holes or non-through holes are formed in the foam member having a high bulk density, the sound absorbing effect can be improved. However, the obtained sound absorbing structure suffers from a low peak value of the sound absorption coefficient, and the width of the peak frequency is too narrow to overcome the foregoing problem.

Therefore, the foam member according to the present invention has densities satisfying a specific range. It is preferable that the bulk density of the foam member according to the present invention in a state where the through holes or non-through holes are formed is not lower than 20 kg/m$^3$ nor more than 400 kg/m$^3$, more preferably not lower than 30 kg/m$^3$ nor more than 300 kg/m$^3$, and most preferably not lower than 50 kg/m$^3$ nor higher than 200 kg/m$^3$. The foam member having the mixed-cell structure of the open-cells and the closed-cells satisfying the foregoing range is able to improve the sound absorbing characteristic when the through holes or non-through holes are provided.

In general, a sound absorbing mechanism is imparted to the foam member of a soft type owing to vibration of the cell films. Therefore, a structure having a satisfactory sound absorbing characteristic can be obtained. On the other hand, a hard foam member cannot realize the sound absorbing mechanism. On the other hand, a hard foam member cannot realize the sound absorbing mechanism. Therefore, only a low normal incidence sound absorption coefficient is exhibited i n the overall frequency range. If the through holes or non-through holes are formed in the hard foam member, the sound absorbing effect can be improved. However, the obtained sound absorbing structure suffers from a low peak value of the sound absorption coefficient. Also the width of the peak frequency is too narrow to overcome the foregoing problem.

Therefore, it is preferable that the foam member according to the present invention has compressive hardness satisfying a specific range. Specifically, it is preferable that the compressive hardness is 0.5 N/cm$^2$ or lower at 25%-compressive hardness , preferably 0.3 N/cm$^2$ or lower, and most preferably 0.1 N/cm$^2$ or lower. The foam member having the mixed-cell structure of the open-cells and the closed-cells satisfying the foregoing 25%-compressive hardness is able to improve the sound absorbing characteristic when the through hole or the non-through hole are provided. Note that the 25%-compressive hardness is measured by a method conforming to JIS K6767.

In general, the foam member has a film structure on the surface thereof when the foam member is manufactured. The film structure is cut and disposed of or the same is maintained. In the present invention, the sound absorbing characteristic in the low frequency range can be improved when the foam member of a type that the foregoing film structure is maintained. If the thickness of the material is reduced, a sound absorbing structure can be obtained which has a sound absorbing characteristic equivalent to the foam member having no film structure.

Therefore, it is preferable for the present invention that the foam member having the film structure maintained on at least one surface is employed. When the sound absorbing structure is provided, the sound absorbing structure is disposed such that the film structure side faces the sound source. In a case of non-through holes, the non-through holes are formed in the film structure portion.

The sound absorbing structure according to the present invention is structured by forming a plurality of the through holes and/or non-through hole. The non-through hole may be formed by providing a recess having a predetermined depth in the direction of the thickness of the foam member. As an alternative to this, a foam member having the through holes and a foam member having no through hole may be stacked and bonded to each other.

When the sum of the areas of opening (hereinafter called a "total area of opening") of the through holes and the non-through hole is too small with respect to the total area of the sound absorbing structure, a satisfactory sound absorbing characteristic cannot be realized. If the ratio of the total area of opening is too high, the sound absorption coefficient sometimes deteriorates as compared with the foam member structured such that the through holes and the non-through hole are not formed.

Therefore, it is preferable for the present invention that the ratio of the total area of opening has a value satisfying a specific range. It is preferable that the value is not lower than 1% nor higher than 70%, more preferably not lower than 3% nor higher than 50% and most preferably not lower than 5% nor higher than 40%. A sound absorbing structure having the total area of opening which satisfies the foregoing range is able to greatly improve the sound absorbing characteristic.

In the present invention, the diameter and the shape of opening (the planar shape of the hole) of each of the through holes and the non-through holes, the depth of the non-through hole and the configuration may be arbitrarily determined.

For example, as shown in FIG. 1, through holes or non-through holes 2 may be formed in the overall surface of a foam member 1 at intersections of a lattice formed apart from one another for the same intervals. At this time, the diameter of each of the through holes or the non-through holes 2 is enlarged or the number of holes per unit area is enlarged. That is, when the intervals of the lattice is reduced, the sound absorption coefficient in the high frequency range can be improved. When the diameter of each of the through holes or the non-through holes 2 is reduced or the number of the holes per unit area is reduced, that is, when the interval of the lattice is enlarged, the sound absorption coefficient in the low frequency range can be improved. Therefore, the sound absorption coefficient in a required frequency range can be improved by appropriately determining the diameter of each of the through hole or the non-through hole or the intervals of the lattice.

In the present invention, two or more types of through holes or non-through holes having different diameter, shapes of opening and depths may be mixed with one another. As a result of the foregoing mixed arrangement, a structure having an excellent sound absorbing characteristic over a wide frequency range can be obtained.

Figure 2:
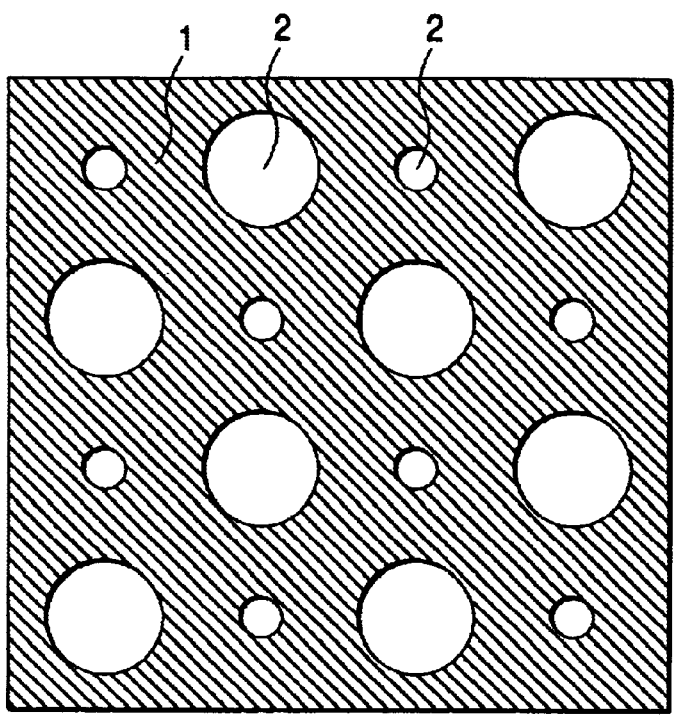
FIG. 2 is a portion of a plan view showing another example of the first embodiment of the sound absorbing structure according to the present invention.

For example, as shown in FIG. 2, two types of through holes or non-through holes 2 having different diameters may be formed at intersections of a lattice formed apart from one another for the same distance such that different types of adjacent through holes or non-through holes in rows and columns of the intersections. Moreover, through holes or non-through holes positioned on the diagonal of the cells are of the same types.

Although omitted from illustration, a mixed arrangement may be employed as a substitute for changing the diameter of the hole that the shape of opening or the depth of the non-through hole is changed.

When the foregoing arrangement is employed, an intermediate sound absorbing effect of the structure in which only the through holes or non-through holes having the same diameter or the shape of opening is realized. Thus, a high sound absorption coefficient can be exhibited over a wide frequency range.

In the present invention, the number of the through holes or the non-through holes may be varied per unit area according to the position (the planar position) of the foam member. Also in this case, a sound absorbing structure having a satisfactory sound absorbing characteristic over a wide frequency range can be obtained.

Figure 3:
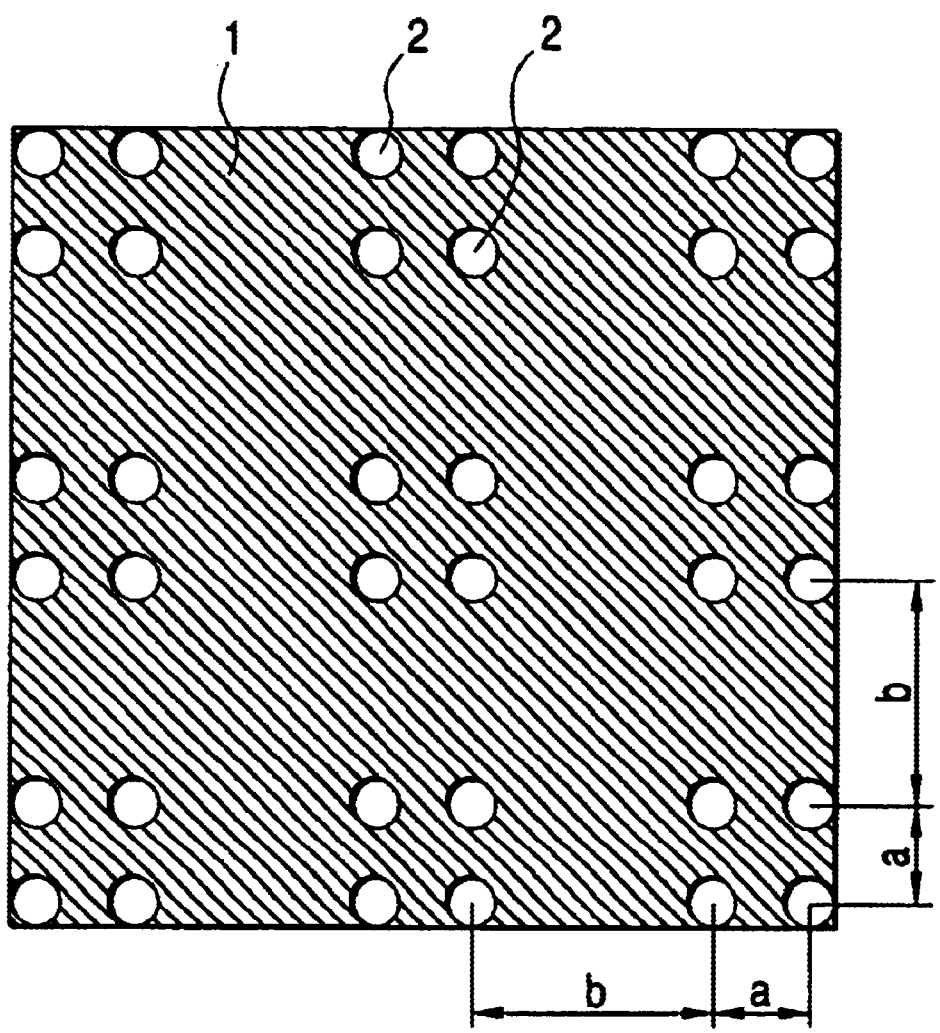
FIG. 3 is a portion of a plan view showing another example of the first embodiment of the sound absorbing structure according to the present invention.

For example, as shown in FIG. 3, a plurality (four in the case shown in FIG. 3) of through holes or non-through holes 2 may be formed around each intersection of a lattice. In this arrangement, portions in which the distance between the lattice is narrow (=a) and portions (=b) in which the distance is wide alternately appear. As a result, the bulk density of the through holes or the non-through holes 2 is complicatedly changed. As a result, the sound absorbing effects of the individual through holes and the non-through hole formed at the intersections of the lattice apart from one another for the same intervals are added. Therefore, a high sound absorption coefficient can be exhibited over a wide frequency range.

The arrangement shown in FIG. 3 may be formed into a further complicated mixed form by changing the diameter or the shape of opening of each of the through holes or the non-through hole or the depth of the non-through hole.

As an alternative to the lattice configuration, a random configuration may be employed.

The shape of opening of each the above-mentioned through hole and the non-through hole 2 may be formed into an arbitrary shape, for example, an elliptic shape, a triangle shape, a square shape or a polygonal shape as a substitute for the circular shape.

Similarly to the sound absorbing material constituted by the conventional foam member, the sound absorption coefficient can be improved as the thickness of the sound absorbing structure is enlarged if the through holes or the non-through holes are the same. On the contrary, when the thickness is reduced, the sound absorption coefficient in the high frequency range can be improved. Thus, the frequency range in which a satisfactory sound absorbing effect can be obtained varies according to the thickness of the sound absorbing structure. However, when the diameter, the shape, the depth or the bulk density of each of the through holes or the non-through holes is changed, the sound absorbing characteristic can be changed. When the thickness of the foam member must be changed according to the position for use, for example, the inside portion of the engine cover or the inside portion of the bonnet, there arises a problem in the sound absorbing effect is undesirably changed according to the position. According to the present invention, the diameter, the shape, the depth or the position (the bulk density) of each of the through holes or the non-through holes is changed to correspond to the change in the thickness. Thus, the sound. absorption coefficient at a required frequency can be raised regardless of the position. As a result, a constant sound absorbing effect can be maintained.

Examples of the present invention will now be described.

Note that the present invention is not limited to the following examples.

In the following examples, the through holes were formed by punching a foam member by using a punch having a predetermined diameter. The total area of opening of the through holes or the non-through holes was lower than 70% except for Comparative Example 7.

EXAMPLE 1

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes each having a diameter of 7 mm at intersections of a lattice, the pitch of which was 20 mm. Thus, a sound absorbing structure was manufactured.

EXAMPLE 2

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes each having a diameter of 10 mm at intersections of a lattice, the pitch of which was 20 mm. Thus, a sound absorbing structure was manufactured.

EXAMPLE 3

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes each having a diameter of 7 mm at intersections of a lattice, the pitch of which was 30 mm. Thus, a sound absorbing structure was manufactured.

EXAMPLE 4

A foam member made of NBR and having a thickness of 20 mm, a bulk density of 120 kg/m$^3$, a coefficient of water absorption of 0.058 g/cm$^3$ and 25%-compressive hardness of 0.070 N/cm$^2$ was provided with through holes each having a diameter of 7 mm at intersections of a lattice, the pitch of which was 20 mm. Thus, a sound absorbing structure was manufactured.

EXAMPLE 5

A foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was provided with through holes each having a diameter of 7 mm at intersections of a lattice, the pitch of which was 20 mm. Thus, a sound absorbing structure was manufactured.

EXAMPLE 6

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes each having a diameter of 7 mm at intersections of a lattice, the pitch of which was 20 mm. The foam member having film structure on both of the right and reverse sides thereof. Thus, a sound absorbing structure was manufactured.

EXAMPLE 7

A foam member made of EPDM and having a thickness of 20 mm, a bulk density of 100kg/m$^3$, a coefficient of water absorption of 0.071 g/cm$^3$ and 25%-compressive hardness of 0.040 N/cm$^2$ was provided with through holes having diameters of 7 mm and 10 mm, respectively. As shown in FIG. 2, the through holes were formed at intersections of a lattice, the pitch of which was 20 mm, such that the diameters of adjacent through holes in rows and columns of the intersections of the lattice were different from each other. Moreover, the diameters of the through holes on the diagonal of the cells of the lattice were the same. Thus, a sound absorbing structure was manufactured.

EXAMPLE 8

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes. As shown in FIG. 3, the through holes each having a diameter of 7 mm were formed at intersections of a lattice such that the intervals of the lattice were alternately different from each other so that a=20 mm and b=30 mm. Thus, a sound absorbing structure was manufactured.

EXAMPLE 9

A foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ and the foam member provided with through holes each having a diameter of 7 mm and formed at intersections of a lattice, the pitch of which was 20 mm were stacked and bonded to each other. Thus, a sound absorbing structure having non-through holes each having a depth of 10 mm was manufactured.

COMPARATIVE EXAMPLE 1

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was not provided with both of through holes and non-through holes. Thus, a sound absorbing structure was manufactured.

COMPARATIVE EXAMPLE 2

A foam member made of EPDM and having a thickness of 20 mm, a bulk density of 100 kg/m$^3$, a coefficient of water absorption of 0.106 g/cm$^3$ and 25%-compressive hardness of 0.470 N/cm$^2$ was not provided with both of through holes and non-through holes. Thus, a sound absorbing structure was manufactured.

COMPARATIVE EXAMPLE 3

A foam member made of EPDM and having a thickness of 20 mm, a bulk density of 460 kg/m$^3$, a coefficient of water absorption of 0.0028 g/cm$^3$ and 25%-compressive hardness of 1.05 N/cm$^2$ was not provided with both of through holes and non-through holes. Thus, a sound absorbing structure was manufactured.

COMPARATIVE EXAMPLE 4

A foam member made of soft urethane and having a thickness of 20 mm, a bulk density of 25 kg/m$^3$, a coefficient of water absorption of 0.76 g/cm$^3$ and 25%-compressive hardness of 0.065 N/cm$^2$ was not provided with both of through holes and non-through holes. Thus, a sound absorbing structure was manufactured.

COMPARATIVE EXAMPLE 5

A foam member made of EPDM and having a thickness of 20 mm, a bulk density of 460 kg/m$^3$, a coefficient of water absorption of 0.0028 g/cm$^3$ and 25%-compressive hardness of 1.05 N/cm$^2$ was provided with through holes each having a thickness of 7 mm at intersections of a lattice, the pitch of was 20 mm. Thus, a sound absorbing structure was manufactured.

COMPARATIVE EXAMPLE 6

A foam member made of soft urethane and having a thickness of 20 mm, a bulk density of 25 kg/m$^3$, a coefficient of water absorption of 0.76 g/cm$^3$ and 25%-compressive hardness of 0.065 N/cm$^2$ was provided with through holes each having a thickness of 7 mm at intersections of a lattice, the pitch of was 20 mm. Thus, a sound absorbing structure was manufactured.

COMPARATIVE EXAMPLE 7

A foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was provided with through holes having diameters of 15 mm and 7 mm, respectively. As shown in FIG. 2, the through holes were formed at intersections of a lattice, the pitch of which was 20 mm, such that the diameters of adjacent through holes in rows and columns of the intersections of the lattice were different from each other. Moreover, the diameters of the through holes on the diagonal of the cells of the lattice were the same. Thus, a sound absorbing structure was manufactured. The total area of opening of the through holes of this sound absorbing structure was 73%.

The normal incidence sound absorption coefficient of each of the foregoing sound absorbing structures was measured at each of predetermined frequencies. The measurement was performed by a method conforming to JIS A1405 under a close-contact with the rigid wall. Results of the measurement was shown in Tables 1 and 2.

TABLE 1

| Frequency (Hz) | Example 1 | Example 2 | Example 3 | Example 4 | Example 5 | Example 6 | Example 7 | Example 8 | Example 9 |
|---|---|---|---|---|---|---|---|---|---|
| 250 | 0.22 | 0.18 | 0.38 | 0.20 | 0.18 | 0.30 | 0.21 | 0.30 | 0.23 |
| 315 | 0.46 | 0.26 | 0.71 | 0.23 | 0.24 | 0.54 | 0.39 | 0.70 | 0.50 |
| 400 | 0.74 | 0.53 | 0.92 | 0.55 | 0.50 | 0.88 | 0.70 | 0.87 | 0.77 |
| 500 | 0.89 | 0.70 | 0.94 | 0.80 | 0.72 | 0.93 | 0.88 | 0.85 | 0.88 |
| 600 | 0.93 | 0.83 | 0.99 | 0.91 | 0.82 | 0.98 | 0.90 | 0.93 | 0.96 |
| 800 | 0.98 | 0.94 | 0.91 | 0.90 | 0.90 | 0.98 | 0.91 | 0.94 | 0.99 |
| 1000 | 0.99 | 0.94 | 0.94 | 0.90 | 0.90 | 0.91 | 0.88 | 0.96 | 0.97 |
| 1250 | 0.94 | 0.98 | 0.84 | 0.88 | 0.96 | 0.88 | 0.89 | 0.93 | 0.95 |
| 1600 | 0.85 | 0.95 | 0.70 | 0.78 | 0.96 | 0.75 | 0.91 | 0.79 | 0.83 |
| 2000 | 0.66 | 0.92 | 0.61 | 0.68 | 0.85 | 0.60 | 0.86 | 0.76 | 0.78 |
| 2500 | 0.51 | 0.78 | 0.65 | 0.71 | 0.70 | 0.55 | 0.81 | 0.64 | 0.77 |
| 3150 | 0.62 | 0.56 | 0.63 | 0.71 | 0.55 | 0.58 | 0.74 | 0.70 | 0.68 |
| 4000 | 0.63 | 0.60 | 0.59 | 0.75 | 0.60 | 0.66 | 0.70 | 0.71 | 0.74 |
| 5000 | 0.67 | 0.65 | 0.60 | 0.68 | 0.64 | 0.66 | 0.65 | 0.73 | 0.75 |

TABLE 2

| Frequency (Hz) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| 250 | 0.34 | 0.21 | 0.09 | 0.09 | 0.09 | 0.08 | 0.08 |
| 315 | 0.45 | 0.23 | 0.08 | 0.11 | 0.09 | 0.10 | 0.11 |
| 400 | 0.65 | 0.24 | 0.10 | 0.13 | 0.11 | 0.13 | 0.15 |
| 500 | 0.55 | 0.30 | 0.14 | 0.18 | 0.13 | 0.16 | 0.17 |
| 600 | 0.48 | 0.39 | 0.14 | 0.22 | 0.14 | 0.20 | 0.14 |
| 800 | 0.47 | 0.31 | 0.16 | 0.30 | 0.15 | 0.27 | 0.18 |
| 1000 | 0.40 | 0.30 | 0.14 | 0.40 | 0.14 | 0.37 | 0.27 |
| 1250 | 0.43 | 0.24 | 0.14 | 0.51 | 0.13 | 0.50 | 0.30 |
| 1600 | 0.45 | 0.26 | 0.15 | 0.64 | 0.15 | 0.60 | 0.33 |
| 2000 | 0.47 | 0.27 | 0.14 | 0.74 | 0.14 | 0.72 | 0.29 |
| 2500 | 0.36 | 0.25 | 0.15 | 0.84 | 0.20 | 0.82 | 0.35 |
| 3150 | 0.38 | 0.24 | 0.17 | 0.92 | 0.45 | 0.91 | 0.56 |
| 4000 | 0.39 | 0.24 | 0.18 | 0.98 | 0.21 | 0.95 | 0.66 |
| 5000 | 0.39 | 0.26 | 0.19 | 0.97 | 0.19 | 0.96 | 0.41 |

As can be understood from Tables 1 and 2, the absorbing structure according to the present invention has an excellent sound absorbing characteristic. When the diameter or the arrangement of the through holes or the non-through holes is changed in the same foam member, different sound absorbing characteristics can be realized. Therefore, control of the sound absorbing characteristic can easily be performed.

Foam members having different thicknesses usually have different sound absorbing characteristics. According to the present invention, however, appropriate through holes or non-through holes adaptable to the thickness are provided so that the sound absorbing characteristics of the sound absorbing structures having different thicknesses are allowed to close to each other. As a result, noise in a specific frequency range can be eliminated regardless of the position.

As described above, according to the present invention, a sound absorbing structure having a satisfactory sound absorbing effect over a wide frequency range and, capable of improving the sound absorbing characteristic in a required frequency range to meet a requirement or the like and suitable for an engine cover of an automobile or the like can be provided.

Now, a second embodiment of the present invention will be described in detail.

As discussed above, in general, the foam structure of a foam member includes only one of open-cells, mixture of the open-cells and closed-cells, and closed-cells.

The foam member constituted by only the open-cells has a low normal incidence sound absorption coefficient in the low frequency region. Therefore, the thickness of the material must be enlarged. When foam members each having the open-cell structure are stacked, the sound absorbing effect cannot be improved.

On the other hand, the foam member comprising only closed-cells has only a low normal incidence sound absorption coefficient in the overall frequency range. When the foam members each having the closed-cell structure are stacked, the sound absorbing effect cannot be improved.

On the other hand, the sound absorbing structure according to the present invention comprises two or more stacked layers of foam members each having a mixed-cell structure of open-cells and closed-cells. Thus, the foregoing sound absorbing structure has a satisfactory sound absorbing effect over a wide frequency range.

As well as the first embodiment, it is preferable for the second embodiment of the present invention that the main component of the foam member having the foam structure formed by mixing the open-cells and the closed-cells is rubber or elastomer. With these materials, soft foams can be formed so that a sound absorbing mechanism using vibrations of membranes of cells appears. Therefore, a sound absorbing structure having a satisfactory sound absorbing characteristic can be obtained. The rubber or the elastomer is exemplified by any one of a variety of rubber, such as natural rubber, CR (chloroprene rubber), SBR (styrene butadiene rubber), NBR (nitrile butadiene rubber), EPDM (ternary polymer of ethylene, propylene and diene) rubber, silicon rubber, fluorine rubber and acrylic rubber, and any one of various elastomers, such as a thermoplastic elastomer and soft urethane. Even though, the material is not limited to the foregoing materials, a foam member mainly composed of EPDM rubber is a satisfactory material for an engine cover for an automobile since it has the satisfactory balance among the heat resistance, ozone resistance and the cost.

Also a sheet constituted by foams made of EPDM or NBR and marketed as a waterproof sealer for a construction material or low electricity may be employed.

The foam member according to the present invention has the mixed-cell structure obtained by mixing open-cells and closed-cells. Therefore, when the ratio of the open-cells is increased, the problem of the foam member including only open-cells arises. When the ratio of the closed-cells is increased, the problem of the foam member including only closed-cells arises.

In general, the foam member having the open-cell structure has a high coefficient of water absorption, and the foam member having the closed-cell structure has a low coefficient of water absorption. The foam member having the mixed-cell structure of the open-cells and the closed-cells has an intermediate coefficient of water absorption. Therefore, when the coefficient of water absorption is specified, the ratio of open-cells and closed-cells can be determined. The coefficient of water absorption is measured by method B of JIS K6767. It is preferable that the coefficient of water absorption of the foam member according to the present invention is not lower than 0.01 g/cm$^3$ nor higher than 0.2 g/cm$^3$, more preferably not lower than 0.02 g/cm$^3$ nor more higher 0.15 g/cm$^3$, and most preferably not lower than 0.04 g/cm$^3$ nor higher than 0.1 g/cm$^3$.

Since a foam member having a low bulk density has a low normal incidence sound absorption coefficient, the thickness of the material must be enlarged. When foam members each having a low bulk density are stacked, the sound absorbing cannot substantially be improved. A foam member having a high bulk density has only a low normal incidence sound absorption coefficient in the overall frequency range. When foam members each having a high bulk density are stacked, the sound absorbing effect cannot substantially be improved. Therefore, it is preferable that the foam member according to the present invention has a bulk density satisfying a specific range.

It is preferable that the bulk density of the foam member according to the present invention is not lower than 20 kg/m$^3$ nor higher than 400 kg/m$^3$, more preferably not lower than 30 kg/m$^3$ nor higher than 300 kg/m$^3$, and most preferably not lower than 50 kg/m$^3$ nor higher than 200 kg/m$^3$.

In general, a sound absorbing mechanism is imparted to the foam member of a soft type owing to vibrations of the cell films. Therefore, a structure having a satisfactory sound absorbing characteristic can be obtained. On the other hand, a hard foam member cannot realize the sound absorbing mechanism owing to vibrations of the cell films. Therefore, only a low normal incidence sound absorption coefficient is exhibited in the overall frequency range. When the hard foam members are stacked, the sound absorbing effect cannot be improved.

Therefore, it is preferable that the foam member according to the present invention has compressive hardness satisfying a specific range. Specifically, it is preferable that the compressive hardness is 0.5 N/cm$^2$ or lower at 25%-compressive hardness, preferably 0.3 N/cm$^2$ or lower, and most preferably 0.1 N/cm$^2$ or lower. A foam member having the cell. structure having the 25%-compressive hardness satisfying the foregoing range and formed by mixing the open-cells and the closed-cells is able to greatly improve the sound absorbing characteristic when the foregoing foam members are stacked without adhesion. Note that the 25%-compressive hardness is measured by a method conforming to JIS K6767.

The sound absorbing structure according to the present invention is formed by stacking two or more layers of the foam members.

The foam members may be stacked in a non-secured state along at least one interface, that is, the foam members are freely moved along the interface. As an alternative to this, stacking may be performed in a state in which the foam members are partially secured to each other.

When stacking is performed in the non-secured state, the state of stacking must be maintained by wrapping the overall body with a mesh or the like. When partial securing is performed, the securing method is not limited. For example, bonding may be performed by using a double-coated adhesive tape or an adhesive agent. As an alternative to this, the foam members may be sewed on each other or joined by using pins. The foregoing methods may be combined with one another.

When the foam members are partially secured to each other, a satisfactory sound absorbing characteristic cannot be realized if the ratio of the sum of the secured areas (hereinafter called a "total secured area") with respect to the overall area of the interface is too high. In the present invention, it is preferable that the ratio of the total secured area has a value which satisfies a specific range. It is preferable that the ratio is 50% or lower, more preferably 30% or lower and most preferably 10% or lower. A sound absorbing structure having the structure that the ratio of the total secured area satisfies the above-mentioned range is able to greatly improve the sound absorbing characteristic. When the overall interface of the foam members are secured, the sound absorbing characteristic undesirably deteriorates as compared with a non-stacked structure.

The reason why the sound absorbing characteristic can be improved when the foam member are stacked as employed in the present invention has not been found. An estimation can be made that incident acoustic waves vibrate the foam members along the interface of the foam members so that the acoustic waves are attenuated. When the foam members are secured to each other along the overall surface, the foregoing effect cannot be obtained. Thus, the sound absorbing effect cannot be obtained.

The number of the foam members, which must be stacked, is not limited. For example, three or four layers may be stacked. If the overall thickness is the same, the sound absorption coefficient in the high frequency range can be increased as the number of the foam member which must be stacked is increased. As the number of the foam members is reduced, the sound absorption coefficient in the low frequency range can be improved.

As described above, according to the present invention, the number of the foam members, which must be stacked, is arbitrarily changed to raise the sound absorption coefficient at a required frequency.

In the present invention, the type of the foam members may vary among the layers. For example, foam members having different densities may be stacked or foam members made of different types of elastomer or rubber may be stacked (for example, EPDM and NBR). A variety of the other states of stacking may be employed.

To apply the sound absorbing structure formed as described above to an engine cover for an automobile, the sound absorbing structure is secured to the cover body by fixing using pins, covering with a net or sewing. A plurality of the foregoing means may simultaneously be employed.

Examples of the second embodiment of the present invention will now be described. Note that the present invention is not limited to the following examples.

EXAMPLE 10

Two foam members each of which was made of EPDM and which had a thickness of 15 mm, a bulk density of 100 kg/m$^3$, a coefficient of water absorption of 0.071 g/cm$^3$ and 25%-compressive hardness of 0.040 N/cm$^2$ were stacked such that the foam members were not bonded to each other. Thus, a sound absorbing structure was manufactured.

EXAMPLE 11

Three foam members each of which was made of EPDM and which had a thickness of 10 mm, a bulk density of 100 kg/m$^3$, a coefficient of water absorption of 0.071 g/cm$^3$ and 25%-compressive hardness of 0.040 N/cm$^2$ were stacked such that the foam members were not bonded to each other. Thus, a sound absorbing structure was manufactured.

EXAMPLE 12

Four foam members each of which was made of EPDM and which had a thickness of 7.5 mm, a bulk density of 100 kg/m$^3$, a coefficient of water absorption of 0.071 g/cm$^3$ and 25%-compressive hardness of 0.040 N/cm$^2$ were stacked such that the foam members were not bonded to each other. Thus, a sound absorbing structure was manufactured.

EXAMPLE 13

A first foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ and a second foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ were stacked such that the foam members were not bonded to each other. Thus, a sound absorbing structure was manufactured.

Note that the normal incidence sound absorption coefficient was measured by disposing the sound absorbing structure in such a manner that the second foam member faces the rigid wall.

EXAMPLE 14

Two foam members each of which was made of NBR and which had a thickness of 15 mm, a bulk density of 120 kg/m$^3$, a coefficient of water absorption of 0.058 g/cm$^3$ and 25%-compressive hardness of 0.070 N/cm$^2$ were stacked such that the foam members were not bonded to each other. Thus, a sound absorbing structure was manufactured.

EXAMPLE 15

A first foam member made of EPDM and having a thickness of 10 mm, a bulk density of 100 kg/m$^3$ a coefficient of water absorption of 0.071 g/cm$^3$ and 25%-compressive hardness of 0.040 N/cm$^2$ and a second foam member made of NBR and having a thickness of 15 mm, a bulk density of 120 kg/m$^3$, a coefficient of water absorption of 0.058 g/cm$^3$ and 25%-compressive hardness of 0.070 N/cm$^2$ were stacked such that the foam members were not bonded to each other. Thus, a sound absorbing structure was manufactured.

Note that the normal incidence sound absorption coefficient was measured by disposing the sound absorbing structure in such a manner that the foam member made of NBR faces the rigid wall.

EXAMPLE 16

Two foam members were prepared each of which was made of EPDM and which had a thickness of 15 mm, a bulk density of 100 kg/m$^3$ a coefficient of water absorption of 0.071 g/cm$^3$ and 25%-compressive hardness of 0.040 N/cm$^2$. Only the central portions of the surfaces of the foam members were bonded. Thus, a sound absorbing structure was manufactured.

Note that circular portions were bonded such that the area of the bonded portion was 10% of the overall area of the interface.

EXAMPLE 17

Two foam members were prepared each of which was made of EPDM and which had a thickness of 15 mm, a bulk density of 100 kg/m$^3$, a coefficient of water absorption of 0.071 g/cm$^3$ and 25%-compressive hardness of 0.040 N/cm$^2$. Only the central portions of the surfaces of the foam members were secured with a pin. Thus, a sound absorbing structure was manufactured.

COMPARATIVE EXAMPLE 8

Two foam members were prepared each of which was made of EPDM and which had a thickness of 15 mm, a bulk density of 100 kg/m$^3$, a coefficient of water absorption of 0.071 g/cm$^3$ and 25%-compressive hardness of 0.040N/cm$^2$. The overall interface was bonded with a double-coated adhesive tape. Thus, a sound absorbing structure was manufactured.

COMPARATIVE EXAMPLE 9

One foam member made of EPDM and having a thickness of 30 mm, a bulk density of 100 kg/m$^3$, a coefficient of water absorption of 0.071 g/cm$^3$ and 25%-compressive hardness of 0.040 N/cm$^2$ was used to manufacture a sound absorbing structure.

COMPARATIVE EXAMPLE 10

Two foam members each of which was made of EPDM and which had a thickness of 15 mm, a bulk density of 460 kg/m$^3$, a coefficient of water absorption of 0.0028 g/cm$^3$ and 25%-compressive hardness of 1.05 N/cm$^2$ were stacked such that the foam members were not bonded to each other. Thus, a sound absorbing structure was manufactured.

COMPARATIVE EXAMPLE 11

Two foam members each of which was made of soft urethane and which had a thickness of 15 mm, a bulk density of 25 kg/m$^3$ a coefficient of water absorption of 0.76 g/cm$^3$ and 25%-compressive hardness of 0.065 N/cm$^2$ were stacked such that the foam members were not bonded to each other. Thus, a sound absorbing structure was manufactured.

COMPARATIVE EXAMPLE 12

One foam member made of soft urethane and having a thickness of 30 mm, a bulk density of 25 kg/m$^3$, a coefficient of water absorption of 0.76 g/cm$^3$ and 25%-compressive hardness of 0.065 N/cm$^2$ was used to manufacture a sound absorbing structure.

The normal incidence sound absorption coefficient of each of the sound absorbing structure was measured at predetermined frequencies. The measurement was performed by a method conforming to JIS A1405 under a close-contact with the rigid wall. Results of the measurement was shown in Tables 3 and 4.

TABLE 3

| Frequency (Hz) | Example 10 | Example 11 | Example 12 | Example 13 | Example 14 | Example 15 | Example 16 | Example 17 |
|---|---|---|---|---|---|---|---|---|
| 250 | 0.35 | 0.35 | 0.34 | 0.35 | 0.29 | 0.31 | 0.34 | 0.34 |
| 315 | 0.45 | 0.44 | 0.43 | 0.44 | 0.30 | 0.35 | 0.44 | 0.44 |
| 400 | 0.69 | 0.65 | 0.61 | 0.65 | 0.58 | 0.63 | 0.69 | 0.68 |
| 500 | 0.83 | 0.72 | 0.61 | 0.76 | 0.75 | 0.77 | 0.82 | 0.82 |
| 600 | 0.95 | 0.86 | 0.77 | 0.90 | 0.81 | 0.87 | 0.94 | 0.93 |
| 800 | 0.90 | 0.99 | 0.98 | 0.93 | 0.86 | 0.87 | 0.89 | 0.89 |
| 1000 | 0.68 | 0.93 | 0.99 | 0.80 | 0.84 | 0.78 | 0.68 | 0.67 |
| 1250 | 0.70 | 0.76 | 0.82 | 0.71 | 0.70 | 0.72 | 0.70 | 0.70 |
| 1600 | 0.64 | 0.75 | 0.80 | 0.68 | 0.57 | 0.58 | 0.64 | 0.63 |
| 2000 | 0.66 | 0.69 | 0.70 | 0.67 | 0.58 | 0.63 | 0.67 | 0.67 |
| 2500 | 0.67 | 0.71 | 0.75 | 0.68 | 0.58 | 0.62 | 0.66 | 0.65 |
| 3150 | 0.69 | 0.74 | 0.79 | 0.70 | 0.59 | 0.64 | 0.68 | 0.68 |
| 4000 | 0.61 | 0.69 | 0.71 | 0.64 | 0.58 | 0.59 | 0.60 | 0.60 |
| 5000 | 0.66 | 0.65 | 0.64 | 0.64 | 0.62 | 0.62 | 0.65 | 0.64 |

TABLE 4

| Frequency (Hz) | Comparative Example 8 | Comparative Example 9 | Comparative Example 10 | Comparative Example 11 | Comparative Example 12 |
|---|---|---|---|---|---|
| 250 | 0.22 | 0.22 | 0.10 | 0.09 | 0.09 |
| 315 | 0.32 | 0.31 | 0.08 | 0.11 | 0.10 |
| 400 | 0.38 | 0.39 | 0.09 | 0.12 | 0.13 |
| 500 | 0.42 | 0.59 | 0.14 | 0.14 | 0.13 |
| 600 | 0.50 | 0.65 | 0.15 | 0.18 | 0.16 |
| 800 | 0.62 | 0.64 | 0.15 | 0.25 | 0.25 |
| 1000 | 0.62 | 0.43 | 0.14 | 0.40 | 0.40 |
| 1250 | 0.38 | 0.43 | 0.14 | 0.55 | 0.56 |
| 1600 | 0.27 | 0.35 | 0.14 | 0.67 | 0.67 |
| 2000 | 0.30 | 0.36 | 0.14 | 0.78 | 0.80 |
| 2500 | 0.31 | 0.39 | 0.15 | 0.89 | 0.88 |
| 3150 | 0.32 | 0.40 | 0.16 | 0.94 | 0.94 |
| 4000 | 0.27 | 0.36 | 0.19 | 0.98 | 0.97 |
| 5000 | 0.30 | 0.38 | 0.18 | 0.97 | 0.97 |

As can be understood from the results shown in Table 3, the sound absorbing structure according to the present invention has an excellent sound absorbing characteristic in a wide frequency range. Therefore, a sound absorbing structure suitable for an engine cover for an automobile or the like can be provided.

On the other hand, the sound absorbing structure according to Comparative Example 8 had the structure that the two foam members having a mixed-cell structure consisting of open-cells and closed-cells were stacked such that the overall interface was bonded. Therefore, an unsatisfactory sound absorbing characteristic was realized.

The sound absorbing structure according to Comparative Example 9 is structured by one layer of the foam member having the mixed-cell structure of the open-cells and the closed-cells. Therefore, an unsatisfactory sound absorbing characteristic was realized.

The sound absorbing structure according to Comparative Example 10 was structured by stacking the two foam members each having an closed-cell structure, the 25%-compressive hardness and the bulk density larger than those satisfying the scope of the present invention such that the two foam member were not bonded to each other. Only an unsatisfactory sound absorbing characteristic was realized.

The sound absorbing structure according to Comparative Example 11 was structured by stacking the two foam members having the open-cell structure such that the foam members were not bonded to each other. The sound absorbing structure according to Comparative Example 12 was constituted by only one foam member having the open-cell structure. The sound absorbing structure according to Comparative Example 11 and that according to Comparative Example 12 exhibited similar sound absorbing characteristics. Moreover, unsatisfactory sound absorbing characteristic was realized in the midrange and bass range. Thus, a fact was confirmed that the sound absorbing characteristic was not improved if the foam members each having only the open-cell structure were stacked.

As described above, according to the present invention, the sound absorbing structure can be provided which has a satisfactory sound absorbing characteristic in a wide frequency range, which is capable of improving the sound absorbing characteristic in a required frequency range to meet a purpose or the like and which is suitable for an engine cover for an automobile or the like.

Now, a third embodiment of the present invention will be described in detail.

As discussed above, in general, the cell structure of a foam member is classified into open-cells, mixture of the open-cells and closed-cells, and only closed-cells.

The foam member constituted by only the open-cells has a low normal incidence sound absorption coefficient in the low frequency region. Therefore, the thickness of the material must be increased. If diameter-varied holes are formed in the foam member constituted by only the open-cells, the sound absorbing effect cannot be improved. According to the circumstances, the effect sometimes deteriorates. On the other hand, when the foam member comprising the closed-cell structure is subjected to the foregoing process, the sound absorbing effect can be improved. The obtained structure, however, suffers from a low peak value of the sound absorption coefficient. In addition, the width of the peak frequency is narrow to overcome the foregoing problem.

The sound absorbing structure according to the present invention comprises a foam member having a foam structure formed by mixing open-cells and closed-cells with one another, wherein the area of opening of each the diameter-varied hole formed in the surface opposite to a sound source is largest and the area of opening of each diameter-varied hole is reduced in a direction of the thickness of the foam member, as described below.

When the foregoing holes are formed, a satisfactory sound absorbing effect can be obtained over a wide frequency range.

As well as the first and second embodiments, it is preferable for the third embodiment that the main component of the foam member is rubber or elastomer. With these materials, soft foams can be formed so that a sound absorbing mechanism using vibrations of membranes of cells appears. Therefore, a sound absorbing structure having a satisfactory sound absorbing characteristic can be obtained. The rubber or the elastomer is exemplified by any one of a variety of rubber, such as natural rubber, CR (chloroprene rubber), SBR (styrenebutadiene rubber), NBR (nitrile butadiene rubber), EPDM (ternary polymer of ethylene, propylene and diene) rubber, silicon rubber, fluorine rubber and acrylic rubber, and any one of various elastomers, such as a thermoplastic elastomer and soft urethane. Even though, the material is not limited to the foregoing materials, a foam member mainly composed of EPDM rubber is a satisfactory material for an engine cover for an automobile since it has the satisfactory balance among the heat resistance, ozone resistance and the cost.

Also a sheet constituted by foam members made of EPDM or NBR and marketed as a waterproof sealer for a construction material or low electricity may be employed.

The foam member according to the present invention has the mixed-cell structure obtained by mixing open-cells and closed-cells. Therefore, when the ratio of the open-cells is increased, the problem of the foam member including only open-cells arises. When the ratio of the closed-cells is increased, the problem of the foam member including only closed-cells arises.

In general, the foam member having the open-cell structure has a high coefficient of water absorption, and the foam member having the closed-cell structure has a low coefficient of water absorption. The foam member having the mixed-cell structure of the open-cells and the closed-cells has an intermediate coefficient of water absorption. Therefore, when the coefficient of water absorption is specified, the ratio of open-cells and closed-cell can be determined. The coefficient of water absorption is measured by method B of JIS K6767. It is preferable that the coefficient of water absorption of the foam member according to the present invention is not lower than 0.01 g/cm$^3$ nor higher than 0.2 g/cm$^3$, more preferably not lower than 0.02 g/cm$^3$ nor more higher 0.15 g/cm$^3$, and most preferably not lower than 0.04 g/cm$^3$ nor higher than 0.1 g/cm$^3$. When the diameter-varied holes are formed, a foam member having the mixed-cell structure of the open-cells and the closed-cells shows remarkable improvement in sound absorbing characteristic.

Since a foam member having a low bulk density has a low normal incidence sound absorption coefficient, the thickness of the material must be increased. If diameter-varied holes are formed in only the foam member having the low bulk density, the sound absorbing effect cannot substantially be improved. The foam member having the high bulk density exhibits a low normal incidence sound absorption coefficient in the overall frequency range. If the diameter-varied holes are formed in only the foam member having a high bulk density, the sound absorbing effect cannot substantially be improved.

Therefore, the foam member according to the present invention has a bulk density satisfying a specific range. It is preferable that the bulk density of the foam member according to the present invention is not lower than 20 kg/m$^3$ nor higher than 400 kg/m$^3$, more preferably not lower than 30 kg/m$^3$ nor higher than 300 kg/m$^3$, and most preferably not lower than 50 kg/m$^3$ nor higher than 200 kg/m$^3$.

In general, a sound absorbing mechanism is imparted to the foam member of a soft type owing to vibrations of the cell films. Therefore, a structure having a satisfactory sound absorbing characteristic can be obtained. On the other hand, a hard foam member cannot realize the sound absorbing mechanism owing to vibrations of the cell films. Therefore, only a low normal incidence sound absorption coefficient is exhibited in the overall frequency range. If the diameter-varied holes are formed in the hard foam member, a satisfactory sound absorbing effect cannot be obtained.

Therefore, it is preferable that the foam member according to the present invention has compressive hardness satisfying a specific range. Specifically, it is preferable that the compressive hardness is 0.5 N/cm$^2$ or lower at 25%-compressive hardness, preferably 0.3 N/cm$^2$ or lower, and most preferably 0.1 N/cm$^2$ or lower. A foam member having the cell structure having the 25%-compressive hardness satisfying the foregoing range and formed by mixing the open-cells and the closed-cells is able to greatly improve the sound absorbing characteristic when the diameter-varied holes are formed.

Note that the 25%-compressive hardness is measured by a method conforming to JIS K6767.

The sound absorbing structure according to the present invention has a structure that a plurality of diameter-varied holes are formed in the foregoing foam member. Moreover, each of the diameter-varied hole has a larger area of opening formed in the surface adjacent to the sound source.

The structure of the diameter-varied hole is exemplified by a multiple-hole structure having the area of opening which is reduced in a stepped manner from either surface (the surface opposite to a sound source which is hereinafter called a "sound-source surface") toward another surface or a hole (hereinafter called a "tapered hole") having a structure that the area of opening is gradually reduced from the sound source surface toward another surface. The present invention is not limited to the foregoing structure. Each diameter-varied hole may have a through-hole structure which penetrates the foam member or a non-through structure opened in only the sound source surface.

When the diameter-varied hole is formed into a tapered shape, for example, a conical drill may be employed to form a conical recess in the foam member.

When the multiple-hole structure is formed; a cylindrical drill having a large diameter is used to form a first recess having a predetermined depth in the direction of the thickness of the foam member. Then, a drill having a small diameter is used to form a second recess having a predetermined depth in the bottom surface of the first recess. A plurality of types of foam members having different areas of opening of the through holes may be stacked in such a manner that the through holes are coaxially positioned in a direction in which the areas of opening are gradually reduced.

When the sum of the areas of opening (hereinafter called a "total area of opening") of the diameter-varied holes formed in the sound source surface is too small with respect to the area of the sound source surface, a satisfactory sound absorbing characteristic cannot be realized. If the ratio of the total area of opening of the diameter-varied holes is too low, the sound absorbing characteristic sometimes deteriorates.

Therefore, it is preferable for the present invention that the ratio of the total area of opening of the diameter-varied holes has a specific value. It is preferable that the value is not lower than 1% nor higher than 70%, more preferably not lower than 3% nor higher than 50% and most preferably not lower than 5% nor higher than 40%. When the ratio of the total area of opening of the diameter-varied holes satisfies the foregoing range, a great effect of improving the sound absorbing characteristic of the sound absorbing structure can be obtained.

When a smallest area of opening of the diameter-varied hole is too large with respect to a largest area of opening, the sound absorbing characteristic over the frequency range is unsatisfactory in spite of a satisfactory sound absorbing characteristic which is realized in a vicinity of a specific frequency.

Therefore, it is preferable for the present invention that at least a portion of the diameter-varied holes has a specific ratio of the minimum area of opening with respect to the largest area of opening. It is preferable that the ratio is 90% or lower, more preferably 70% or lower, and most preferably 50% or lower. The sound absorbing structure having the above-mentioned ratio of the areas of opening is able to greatly improve the sound absorbing characteristic.

Preferred embodiments of the sound absorbing structure according to the present invention will now be described with reference to the drawings. Hereinafter this side of each plan view is the sound source side.

Figure 4A:
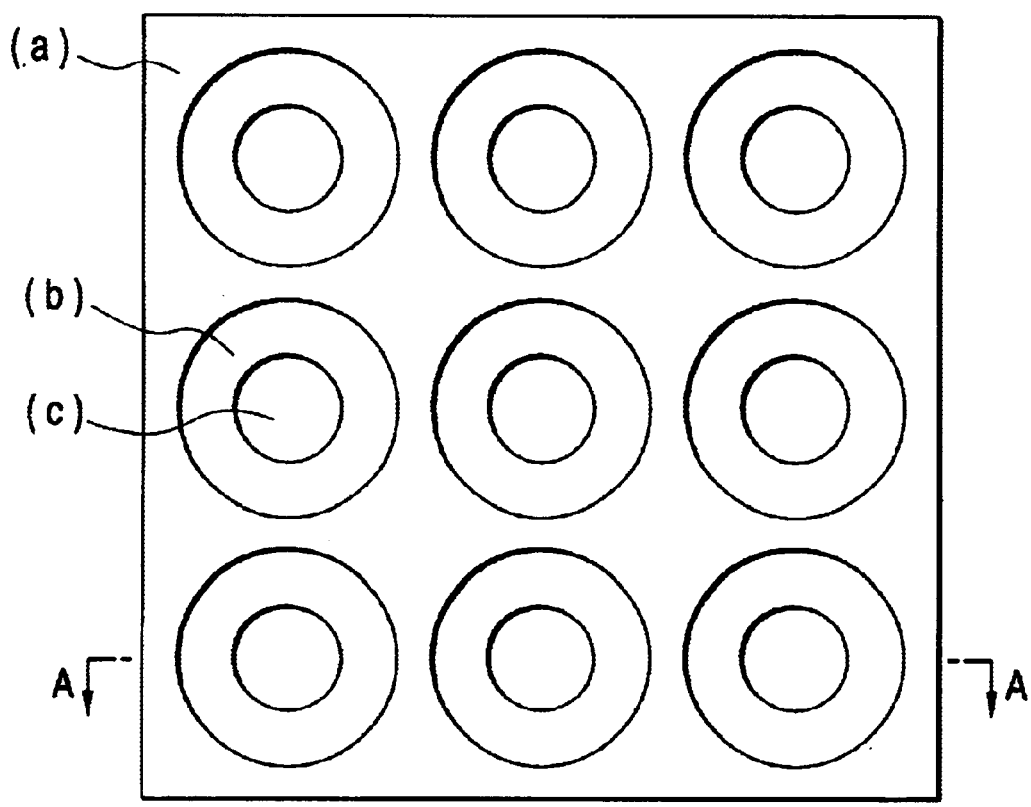
FIG. 4A is a diagram showing an example of a third embodiment of a sound absorbing structure according to the present invention.
Figure 4B:
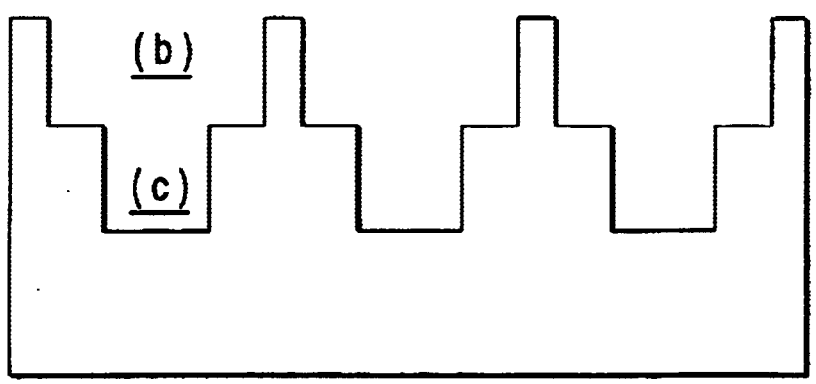
FIG. 4B is a sectional view taken on line A—A of FIG. 4A.

For example, as shown in FIGS. 4A and 4B, the overall surface of the foam member (a) is provided with a first recess (b) having a large diameter and a cylindrical shape and formed at each of intersection of the lattice which are apart from one another for the same distance. Moreover, a second recess (c) is formed in the central portion of the first recess (b), the second recess (c) having a diameter smaller than that of the first recess (b) and formed into a cylindrical shape. Thus, a sound absorbing structure having diameter-varied holes each having a double-structure can be formed.

Figure 5A:
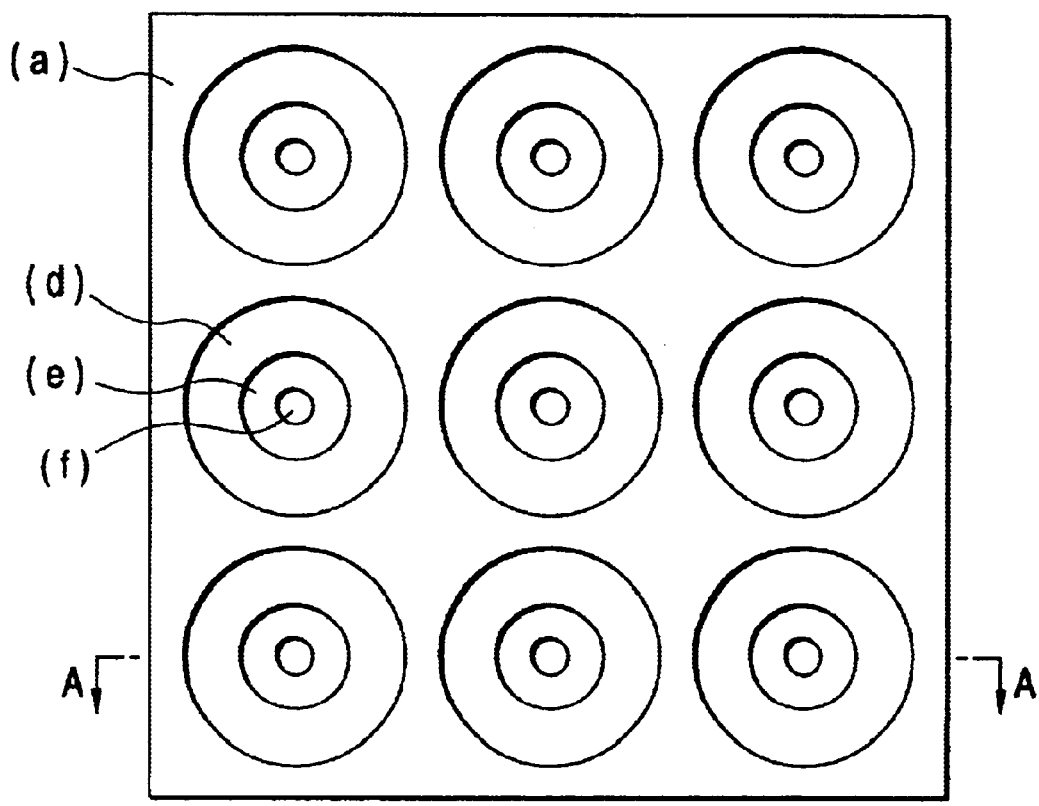
FIG. 5A is a diagram showing another example of the third embodiment of the sound absorbing structure.
Figure 5B:
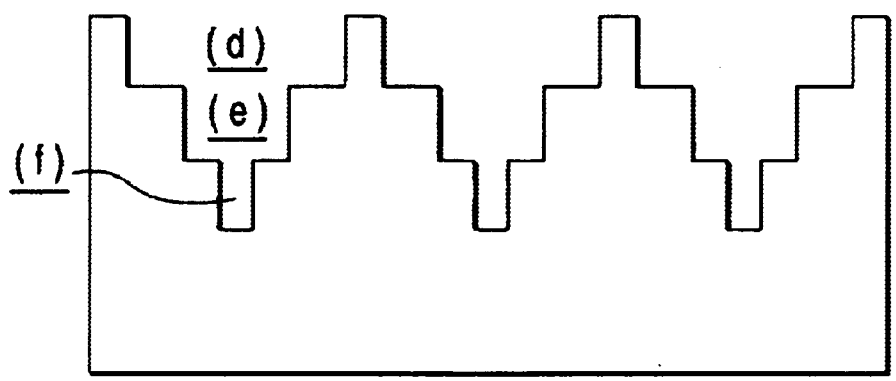
FIG. 5B is a sectional view taken on line A—A of FIG. 5A.

For example, as shown in FIGS. 5A and 5B, the overall surface of a foam member (a) is provided with a first recess (d) having a large diameter and a cylindrical shape and formed at each of intersections of the lattice which are apart from one another for the same distance. A second recess (e) having a diameter smaller than that of the first recess (d) and a cylindrical shape is formed in the central portion of the bottom of the first recess (d). Moreover, a third recess (f) having a diameter smaller than that of the second recess (e) and a cylindrical shape is formed in the central portion of the bottom of the second recess (e). Thus, a sound absorbing structure having diameter-varied holes each having a triple structure can be formed.

Figure 6A:
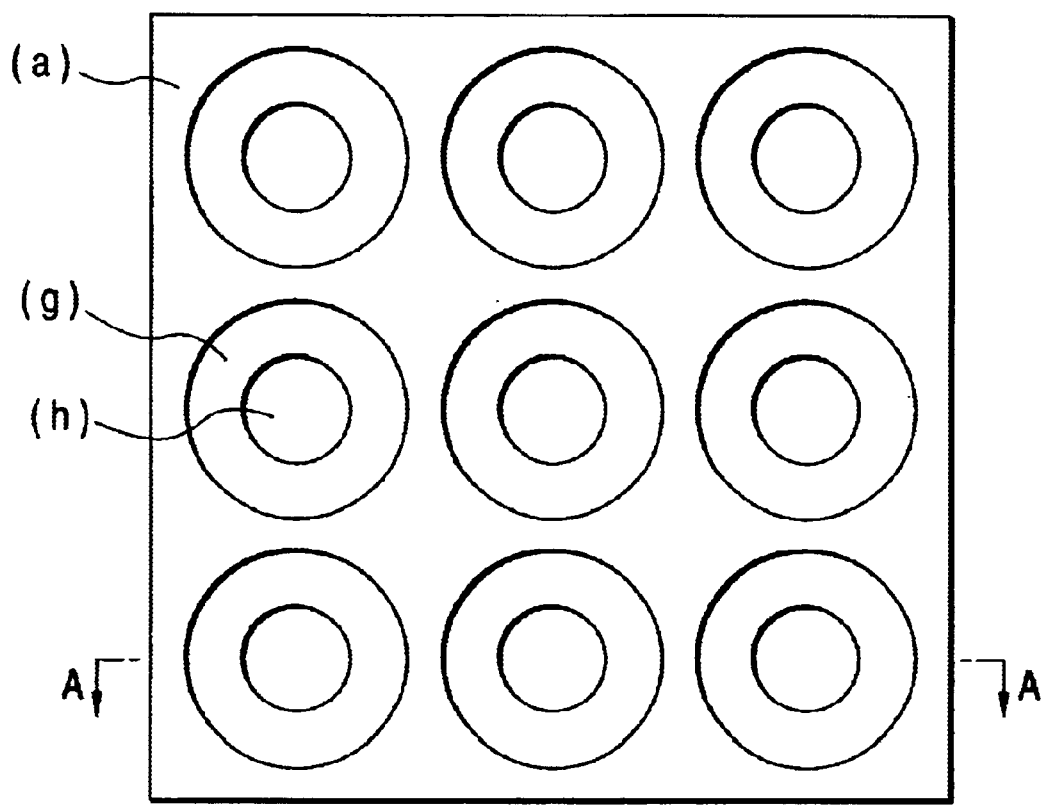
FIG. 6A is a diagram showing another example of the third embodiment of the sound absorbing structure.
Figure 6B:
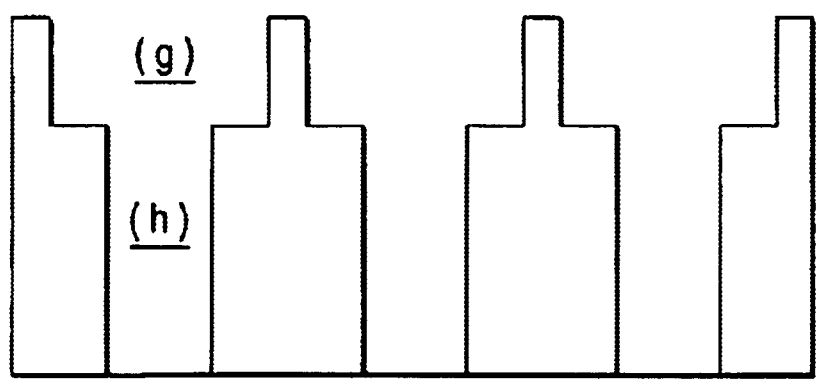
FIG. 6B is a sectional view taken on line A—A of FIG. 6A.

For example, as shown in FIGS. 6A and 6B, the overall surface of a foam member (a) is provided with a first recess (g) having a large diameter and a cylindrical shape and formed at each of intersections of the lattice which are apart from one another for the same distance. A through hole (h) having a diameter smaller than that of the first recess (g) and a cylindrical shape is formed in the central portion of the bottom of the first recess (g). Thus, a sound absorbing structure having through diameter-varied holes each having a double structure can be formed.

Figure 7A:
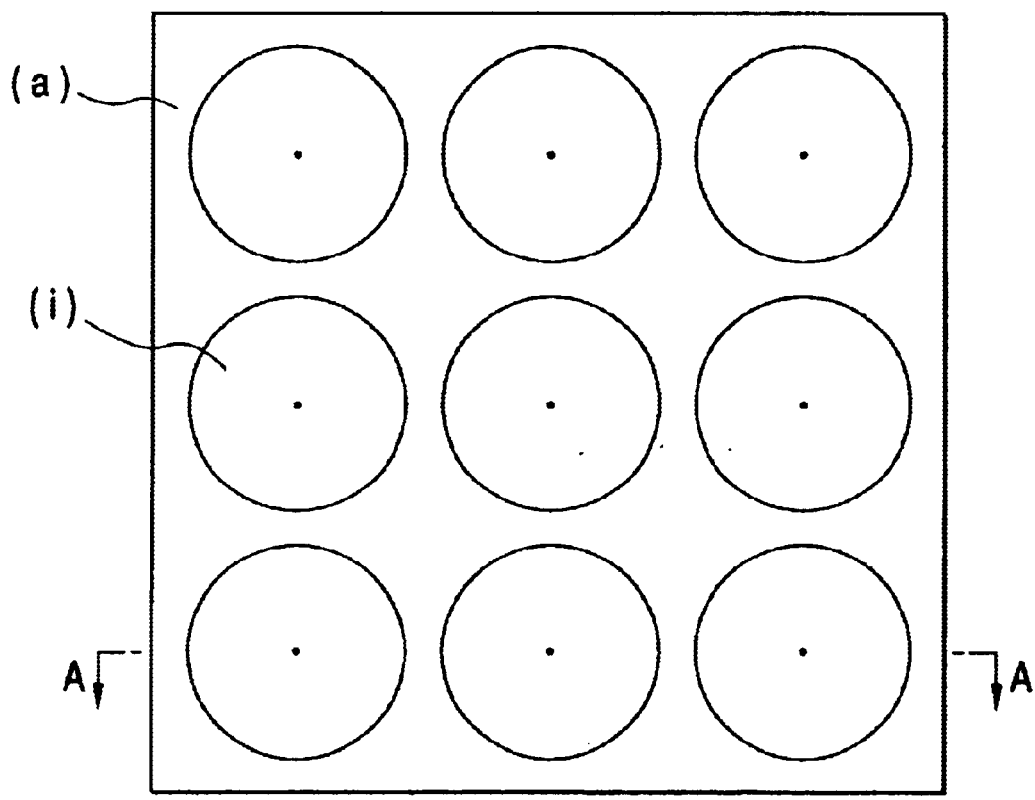
FIG. 7A is a diagram showing another example of the third embodiment of the sound absorbing structure.
Figure 7B:
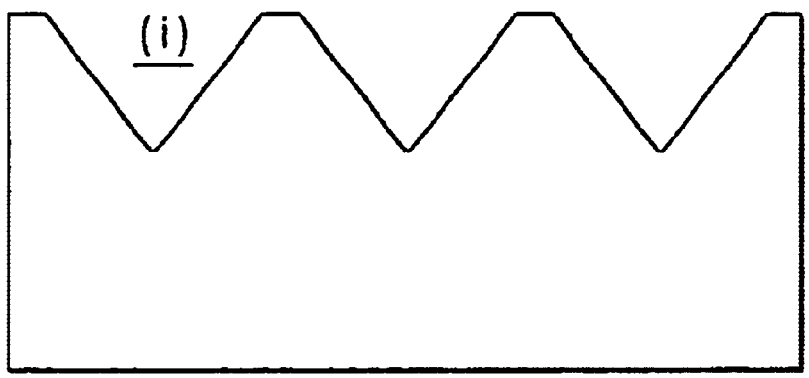
FIG. 7B is a sectional view taken on line A—A of FIG. 7A.

For example, as shown in FIGS. 7A and 7B, the overall surface of a foam member (a) is provided with a conical tapered hole (i) having the area of opening which is gradually reduced from the sound source surface and formed at each of intersections of the lattice which are apart from one another for the same distance. Thus, a sound absorbing structure having the diameter-varied holes can be formed.

Figure 8A:
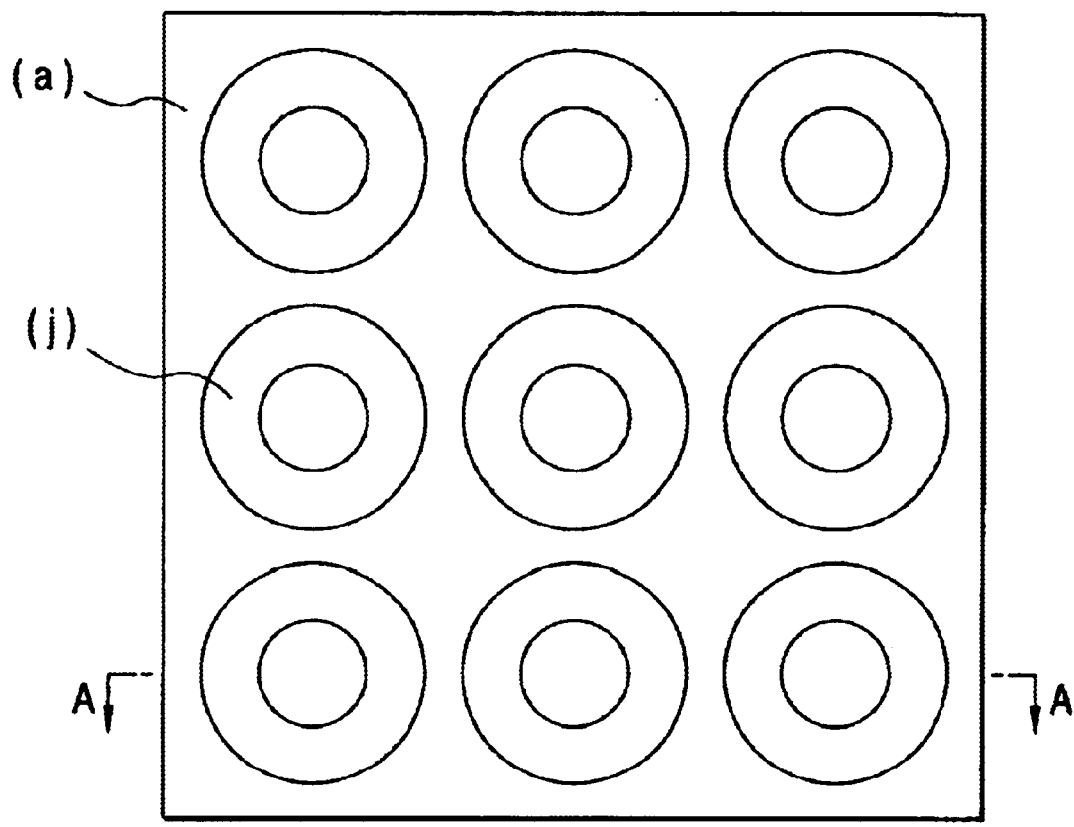
FIG. 8A is a diagram showing another example of the third embodiment of the sound absorbing structure.
Figure 8B:
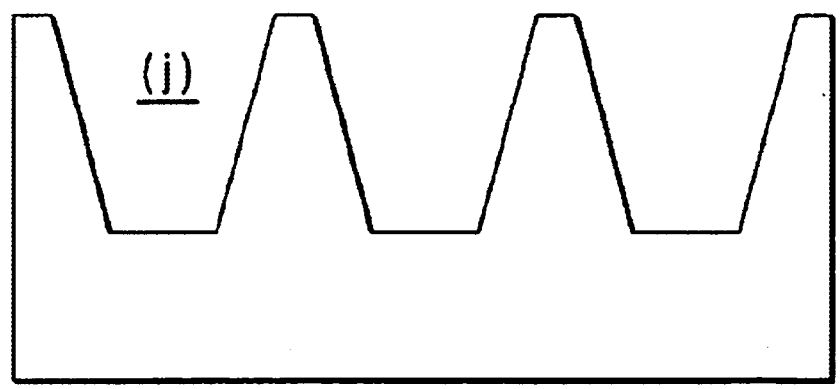
FIG. 8B is a sectional view taken on line A—A of FIG. 8A.

For example, as shown in FIGS. 8A and 8B, the overall surface of a foam member (a) is provided with a tapered hole (j) having the diameter which is gradually reduced from the sound source surface and having a bottom continued from the opening. The tapered hole (j) having a trapezoidal cross sectional shape is formed at each of intersections of the lattice which are apart from one another for the same distance. Thus, a sound absorbing structure having diameter-varied holes can be formed.

Figure 9A:
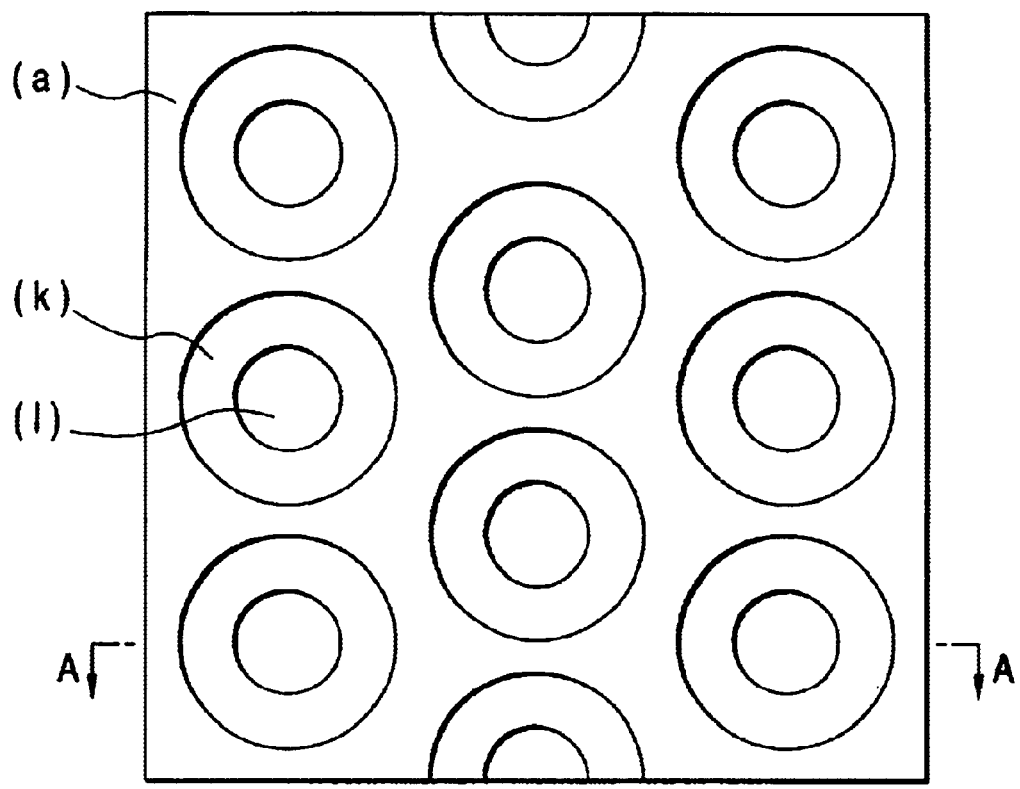
FIG. 9A is a diagram showing another example of the third embodiment of the sound absorbing.
Figure 9B:
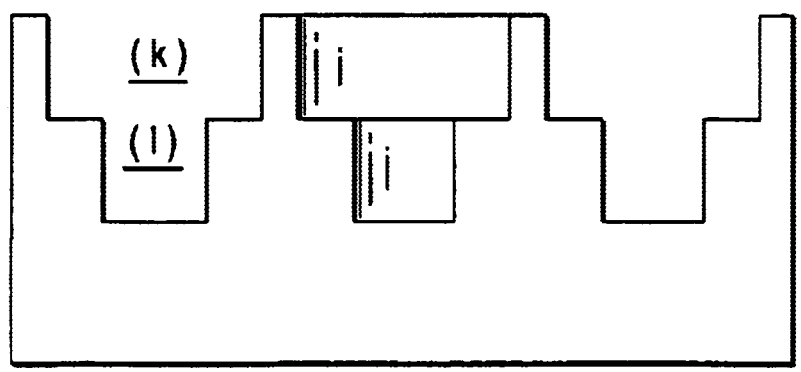
FIG. 9B is a sectional view taken on line A—A of FIG. 9A.

For example, as shown in FIGS. 9A and 9B, the overall surface of a foam member (a) is provided with a first recess (k) having a large diameter and a cylindrical shape and formed at each vertex of cells formed in the equilateral triangle configuration and positioned apart from one another for the same distance. A second recess (l) having a diameter smaller than that the first recess (k) and a cylindrical shape is formed in the central portion of the bottom of the first recess (k). Thus, a sound absorbing structure can be formed which has double-structure diameter-varied holes formed at staggered positions.

Figure 10A:
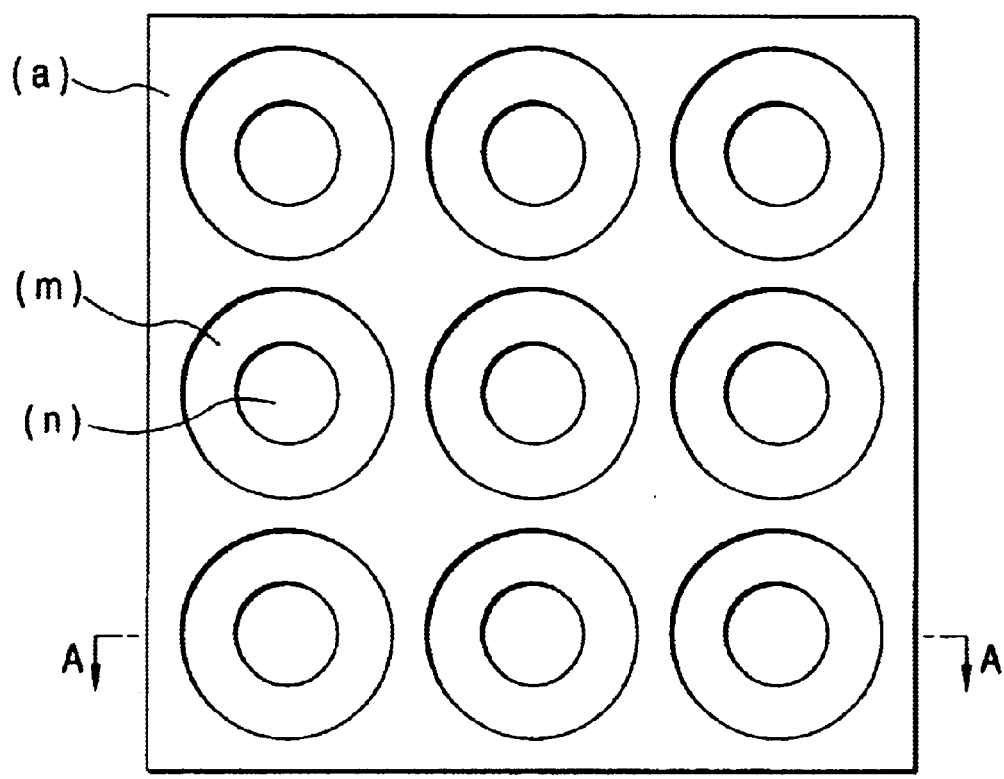
FIG. 10A is a diagram showing another example of the third embodiment of the sound absorbing structure.
Figure 10B:
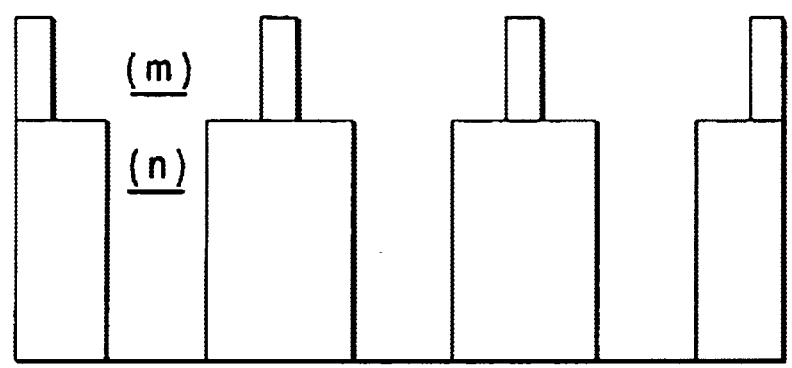
FIG. 10B is a sectional view taken on line A—A of FIG. 10A.
Figure 11:
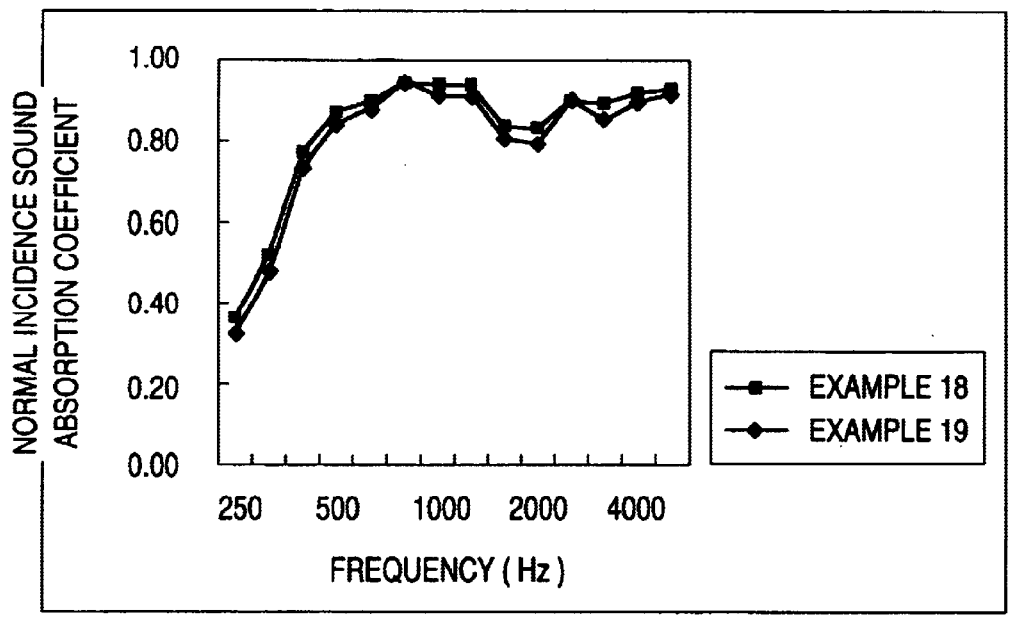
FIG. 11 is a graph showing results of measurement of the sound absorption coefficient of sound absorbing structures according to Examples 18 and 19.
Figure 12:
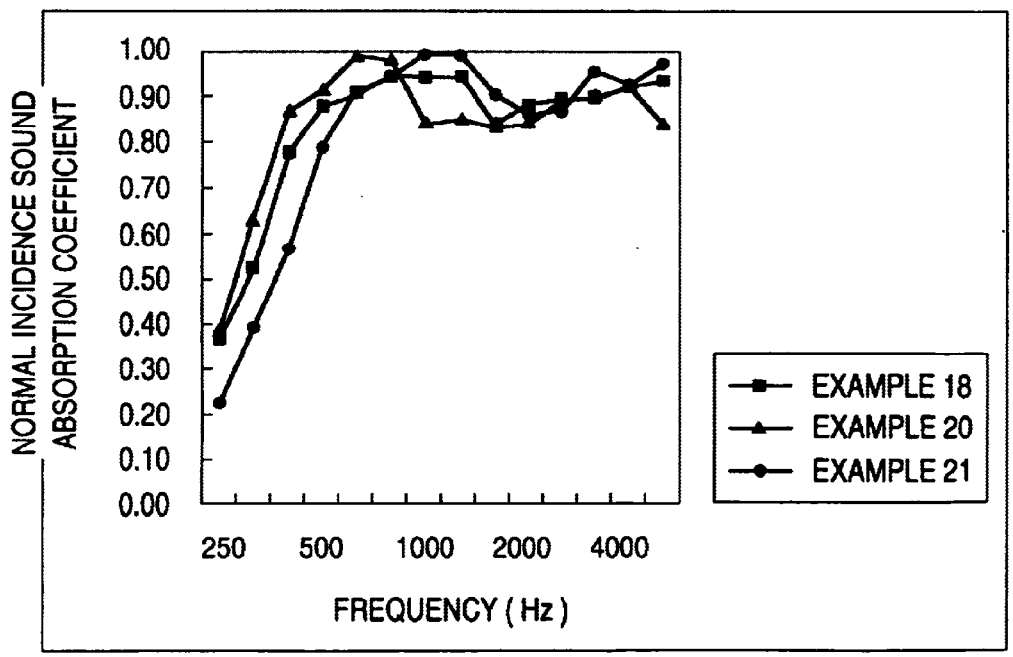
FIG. 12 is a graph showing results of measurement of the sound absorption coefficient of sound absorbing structures according to Examples 18, 20 and 21.
Figure 13:
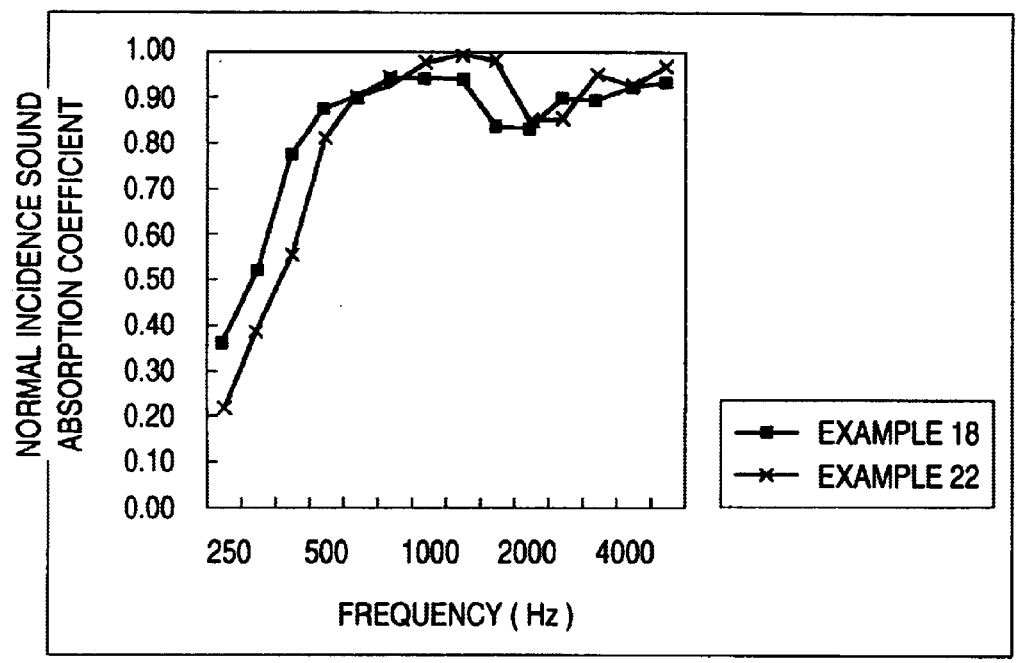
FIG. 13 is a graph showing results of measurement of the sound absorption coefficient of sound absorbing structures according to Example 18 and 22.
Figure 14:
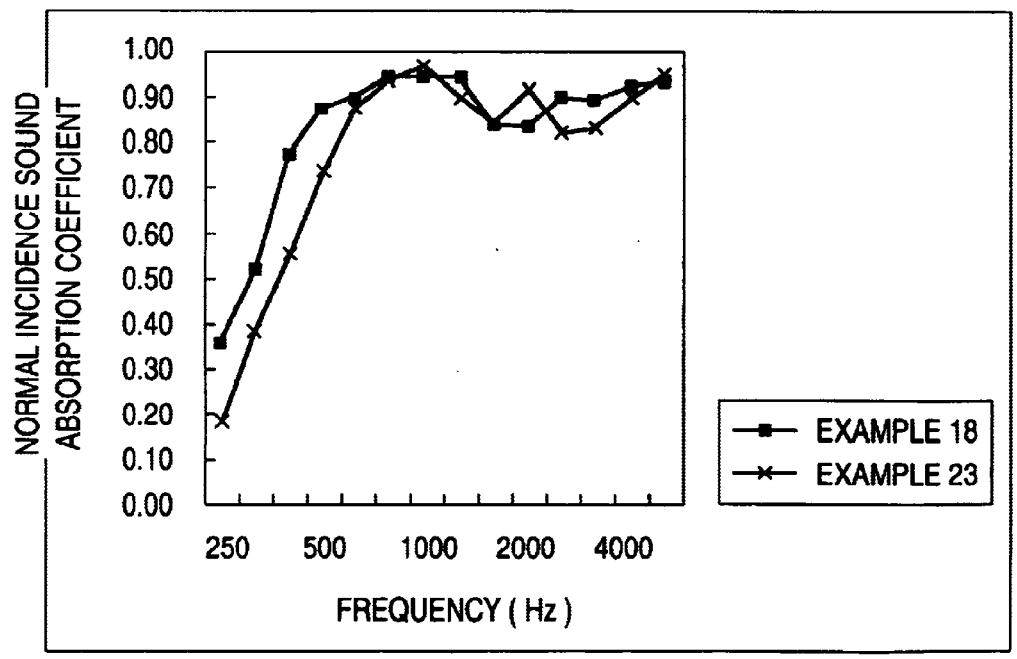
FIG. 14 is a graph showing results of measurement of the sound absorption coefficient of sound absorbing structures according to Examples 18 and 23.
Figure 15:
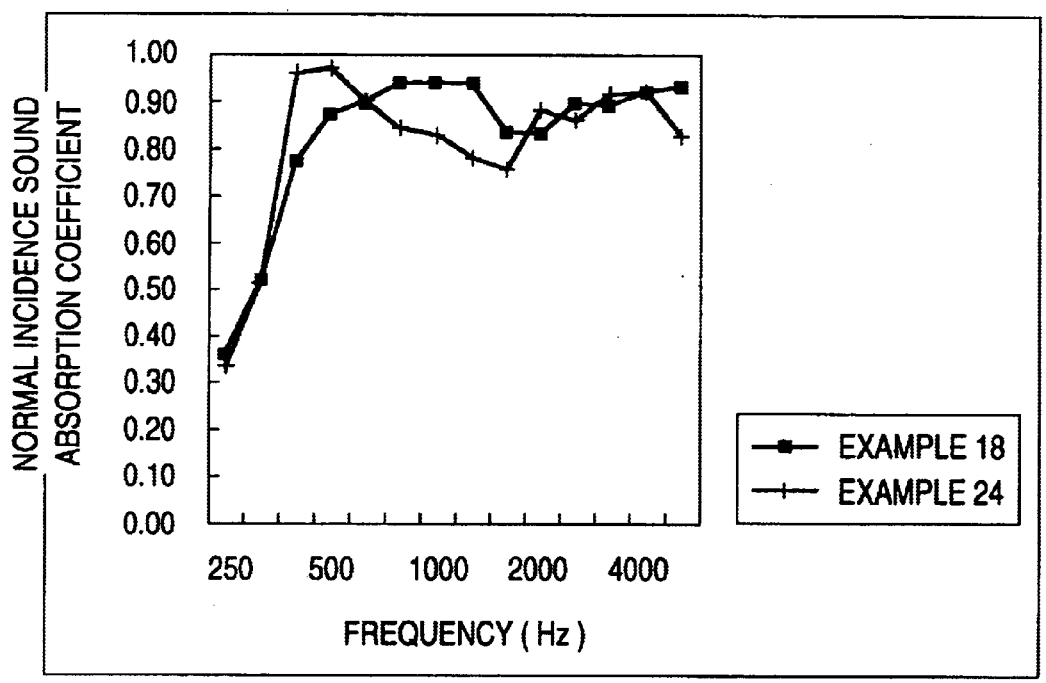
FIG. 15 is a graph showing results of measurement of the sound absorption coefficient of sound absorbing structures according to Examples 18 and 24.
Figure 16:
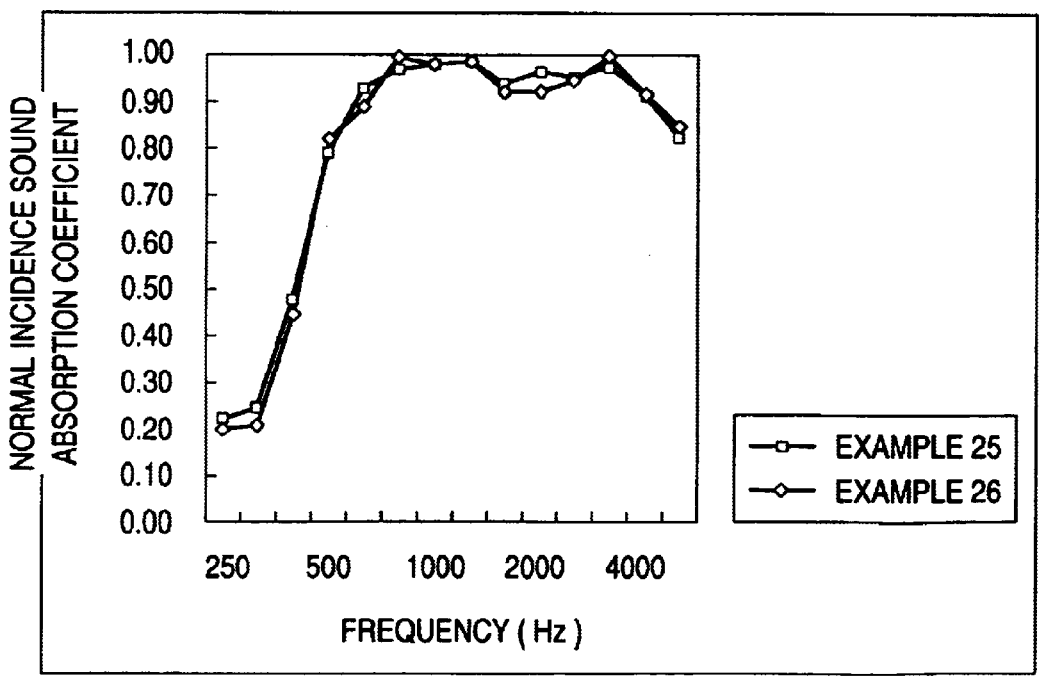
FIG. 16 is a graph showing results of measurement of the sound absorption coefficient of sound absorbing structures according to Examples 25 and 26.
Figure 17:
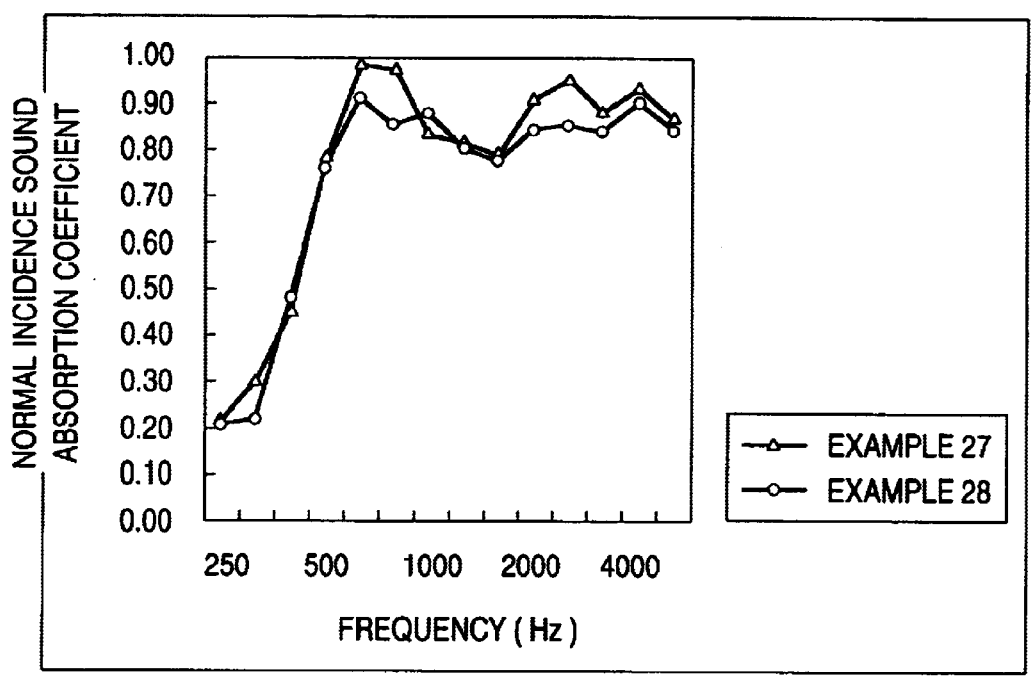
FIG. 17 is a graph showing results of measurement of the sound absorption coefficient of sound absorbing structures according to Examples 27 and 28.
Figure 18:
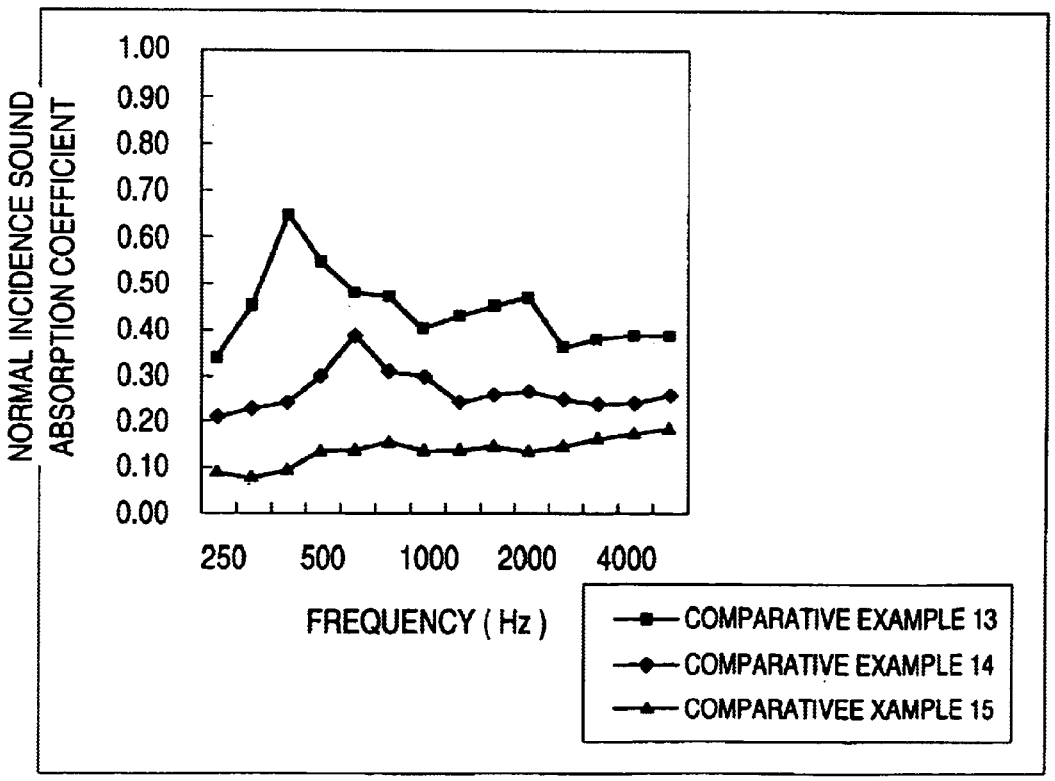
FIG. 18 is a graph showing results of measurement of the sound absorption coefficient of sound absorbing structures according to Comparative Examples 13, 14, and 15.

For example, as shown in FIGS. 10A and 10B, a sheet consisting of two foam members (a) having different diameters of opening is employed. Moreover, the sheet having large holes (m) is disposed adjacent to the sound source and the sheet having small holes (n) is disposed opposite to the sound source. Moreover, the two sheets are stacked in such a manner that the foregoing holes are positioned coaxially. Thus, a sound absorbing structure having through diameter-varied holes each having a double structure can be formed.

In the present invention, the area of opening of the diameter-varied holes formed in the sound source surface and/or the area of opening of the diameter-varied holes formed in the bottom is enlarged. As an alternative to this, the number of the diameter-varied holes per unit area of the surface opposite to the sound source surface is enlarged. In each of the foregoing cases, the sound absorption coefficient in the high frequency range can be improved. The area of opening of the diameter-varied holes formed in the sound source surface and/or the area of opening of the diameter-varied holes formed in the bottom is reduced. As an alternative to this, the number of the diameter-varied holes per unit area of the surface opposite to the sound source surface is reduced. In each of the foregoing cases, the sound absorption coefficient in the low frequency range can be improved.

As the difference between the area of opening in the surface opposite to the sound source and that in the bottom surface is enlarged, the sound absorption coefficient is, in particular, raised in a wide frequency range. On the contrary, as the difference between the area of opening between the upper layer portion and the lower layer opposite is reduced, only the sound absorption coefficient in the vicinity of a specific frequency is, in particular, raised.

As described above, when the sound absorption coefficient in a wide and specific frequency range is raised or when the sound absorption coefficient in a frequency range having a certain width including a required frequency is raised, the intervals of diameter-varied holes in the lattice or the diameter of each diameter-varied hole including the ratio of the diameter-varied holes in the surface opposite to the sound source and those in the bottom must have an appropriate value.

The shape of the foregoing diameter-varied hole (including the planar shape of the hole) is not limited. The hole may be formed into a circle shape, a triangle shape, a polygonal shape, an elliptical shape or an amorphous shape in some cases. Also the depth is not limited.

The planar configuration of the diameter-varied holes may be the lattice configuration in the form of a rectangle or a random configuration.

A configuration may be employed in which two or more types of diameter-varied holes having the different diameters, shapes of the opening and depths are mixed.

Similarly to the sound absorbing material constituted by the conventional foam member, the sound absorbing structure according to the present invention has a satisfactory sound absorption coefficient in the low frequency range as the thickness is enlarged. A thin sound absorbing structure has an improved sound absorption coefficient in the high frequency range. Thus, the frequency range in which an improved sound absorbing effect can be obtained varies according to the thickness. When the shape and the arrangement of the diameter-varied holes is changed, the sound absorbing characteristic can arbitrarily be changed. When the thickness of the foam member must be changed according to the position for use, for example, the inside portion of the engine cover or the inside portion of the bonnet, the conventional sound absorbing structure encounters a problem in that the sound absorbing effect varies depending on the position. According to the present invention, the shape, diameter or the depth of the diameter-varied holes formed in the surface opposite to the sound source and/or the bottom or the arrangement (density) of the diameter-varied holes is changed. Thus, the sound absorption coefficient in a required frequency can be raised regardless of the position (the thickness) or the sound absorption coefficient in a wide frequency range can be raised. Thus, a sound absorbing effect meeting a purpose can be realized.

Examples of the third embodiment of the present invention will now be described in detail. Note that the present invention is not limited to the following examples.

In the examples, a drilling work was performed to form diameter-varied holes in a foam member or a plurality of foam member sheets were punched and stacked to form multiple holes. Thus, sound absorbing structures were manufactured. The total area of opening of the diameter-varied holes opposite to the sound source surface was 70 E or lower except for Comparative Example 19.

EXAMPLE 18

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 5 mm and formed at intersections of a lattice, the pitch of which was 20 mm. Moreover, a sheet having through holes each having a diameter of 15 mm and formed at the intersections of a lattice, the pitch of which was 20 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

EXAMPLE 19

A sheet constituted by a foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was prepared. The sheet had holes each having a diameter of 15 mm and a depth of 10 mm formed, by drilling, at intersections of a lattice, the pitch of which was 20 mm. Moreover, through holes each having a diameter of 5mm were formed in the central portions of the holes. Thus, a sound absorbing structure having double holes and a thickness of 20 mm was manufactured. The surface having the through holes each having the diameter of 5 mm was disposed opposite to a rigid wall so that the normal incidence sound absorption coefficient was measured.

EXAMPLE 20

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 5 mm and formed at intersections of a lattice, the pitch of which was 20 mm. Moreover, a sheet having through holes each having a diameter of 10 mm and formed at the intersections of a lattice, the pitch of which was 20 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

EXAMPLE 21

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 10 mm and formed at intersections of a lattice, the pitch of which was 20 mm. Moreover, a sheet having through holes each having a diameter of 15 mm and formed at the intersections of a lattice, the pitch of was 20 mm, was prepared. The two sheets were stacked so that a sound absorbing structure having double holes and a total thickness of 20 mm was manufactured. Then, the sheet having the through holes each having the diameter of 10 mm was disposed opposite to a rigid wall so that the normal incidence sound absorption coefficient was measured.

EXAMPLE 22

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 5 mm and formed at intersections of a lattice, the pitch of which was 15 mm. Moreover, a sheet having through holes each having a diameter of 10 mm and formed at the intersections of a lattice, the pitch of which was 15 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

EXAMPLE 23

A sheet constituted by a foam member made of NBR and having a thickness of 10 mm, a bulk density of 120 kg/m$^3$, a coefficient of water absorption of 0.058 g/cm$^3$ and 25%-compressive hardness of 0.070 N/cm$^2$ was prepared. The sheet had through holes each having a diameter of 5 mm and formed at intersections of a lattice, the pitch of which was 20 mm. Moreover, a sheet having through holes each having a diameter of 15 mm and formed at the intersections of a lattice, the pitch of which was 20 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

EXAMPLE 24

A sheet constituted by a foam member made of EPDM and having a thickness of 15 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 5 mm and formed at intersections of a lattice, the pitch of which was 20 mm. Moreover, a sheet having through holes each having a diameter of 15 mm and formed at the intersections of a lattice, the pitch of which was 20 mm, was prepared. The two sheets were stacked so that a sound absorbing structure having double holes and a total thickness of 30 mm was manufactured. Then, the sheet having the through holes each having the diameter of 5 mm was disposed opposite to a rigid wall so that the normal incidence sound absorption coefficient was measured.

EXAMPLE 25

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had no through hole. Moreover, a sheet having through holes each having a diameter of 5 mm and formed at the intersections of a lattice, the pitch of which was 20 mm, was prepared. Moreover, a sheet having through holes each having a diameter of 15 mm and formed at the intersections of a lattice, the pitch of which was 20 mm, was prepared. Then, the sheet having no through hole, the sheet having the through holes each having the diameter of 5 mm and the sheet having the through holes each having the diameter of 15 were upwards stacked. Thus, a sound absorbing structure having double holes and a total thickness of 20 mm was manufactured. The sheet having no through hole was disposed opposite to a rigid wall so that the normal incidence sound absorption coefficient was measured.

EXAMPLE 26

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had through holes each having a diameter of 5 mm and formed at intersections of a lattice, the pitch of which was 20 mm, was prepared. Moreover, a sheet having through holes each having a diameter of 10 mm and formed at the intersections of a lattice, the pitch of which was 20 mm, was prepared. Moreover; a sheet having through holes each having a diameter of 15 mm and formed at the intersections of a lattice, the pitch of which was 20 mm, was prepared. Then, the sheet having the through holes each having the diameter of 5 mm, the sheet having the through holes each having the diameter of 10 mm and the sheet having the through holes each having the diameter of 15 mm were upwards stacked. Thus, a sound absorbing, structure having the triple holes and having a thickness of 20 mm was manufactured. The sheet having the through holes each having the diameter of 5 mm was disposed opposite to a rigid wall so that the normal incidence sound absorption coefficient was measured.

EXAMPLE 27

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had 10 mm×10 mm square through holes and formed at intersections of a lattice, the pitch of which was 20 mm, was prepared. Moreover, a sheet having through holes each having a diameter of 10 mm and formed at the intersections of a lattice, the pitch of which was 20 mm, was prepared. Moreover, a sheet having through holes each having a diameter of 5 mm and formed at the intersections of a lattice, the pitch of which was 20 mm, was prepared. Then, the sheets were stacked so that a sound absorbing structure having double holes and a total thickness of 20 mm was manufactured. The sheet having the through holes each having the diameter of 5 mm was disposed opposite to a rigid wall so that the normal incidence sound absorption coefficient was measured.

EXAMPLE 28

A sheet constituted by a foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was prepared. The sheet had conical holes each having a diameter of 15 mm and a depth of 10 mm formed, by drilling, at the intersections of a lattice, the pitch of which was 20 mm, was prepared. Thus, a sound absorbing structure was manufactured. The surface having no hole was disposed opposite to a rigid wall so that the normal incidence sound absorption coefficient was measured.

COMPARATIVE EXAMPLE 13

A sheet constituted by a foam member made of EPDM and having a thickness of 20 mm, a bulk density of 100 kg/m$^3$, a coefficient of water absorption of 0.071 g/cm$^3$ and 25%-compressive hardness of 0.040 N/cm$^2$ was prepared. The sheet had no through hole, non-through holes and double holes. Thus, a sound absorbing structure was manufactured so that the normal incidence sound absorption coefficient was measured.

COMPARATIVE EXAMPLE 14

A sheet constituted by a foam member made of EPDM and having a thickness of 20 mm, a bulk density of 100 kg/m$^3$, a coefficient of water absorption of 0.106 g/cm$^3$ and 25%-compressive hardness of 0.470 N/cm$^2$ was prepared. The sheet had no through hole, non-through holes and double holes. Thus, a sound absorbing structure was manufactured so that the normal incidence sound absorption coefficient was measured.

COMPARATIVE EXAMPLE 15

A sheet constituted by a foam member made of EPDM and having a thickness of 20 mm, a bulk density of 460 kg/m$^3$, a coefficient of water absorption of 0.0028 g/cm$^3$ and 25%-compressive hardness of 1.05 N/cm$^2$ was prepared. The sheet had no through hole, non-through holes and double holes. Thus, a sound absorbing structure was manufactured so that the normal incidence sound absorption coefficient was measured.

COMPARATIVE EXAMPLE 16

A sheet constituted by a foam member made of soft urethane and having a thickness of 20 mm, a bulk density of 25 kg/m$^3$, a coefficient of water absorption of 0.76 g/cm$^3$ and 25%-compressive hardness of 0.065 N/cm$^2$ was prepared. The sheet had no through hole, non-through holes and double holes. Thus, a sound absorbing structure was manufactured so that the normal incidence sound absorption coefficient was measured.

COMPARATIVE EXAMPLE 17

A sheet constituted by a foam member made of EPDM and having a thickness of 10 mm, a bulk density of 460 kg/m$^3$, a coefficient of water absorption of 0.0028 g/cm$^3$ and 25%-compressive hardness of 1.05 N/cm$^2$ was prepared. The sheet had through holes each having a diameter of 5 mm and formed at intersections of a lattice, the pitch of which was 20 mm. Moreover, a sheet having through holes each having a diameter of 15 mm and formed at the intersections of a lattice, the pitch of which was 20 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

COMPARATIVE EXAMPLE 18

A sheet constituted by a foam member made of soft urethane and having a thickness of 10 mm, a bulk density of 25 kg/m$^3$, a coefficient of water absorption of 0.76 g/cm$^3$ and 25%-compressive hardness of 0.065 N/cm$^2$ was prepared. The sheet had through holes each having a diameter of 5 mm and formed at intersections of a lattice, the pitch of which was 20 mm. Moreover, a sheet having through holes each having a diameter of 15 mm and formed at the intersections of a lattice, the pitch of which was 20 mm, was prepared. The two sheets were stacked so that a sound absorbing structure having double holes and a total thickness of 20 mm was manufactured. Then, the sheet having the through holes each having the diameter of 5 mm was disposed opposite to a rigid wall so that the normal incidence sound absorption coefficient was measured.

COMPARATIVE EXAMPLE 19

A sheet constituted by a foam member made of EPDM and having a thickness of 10 mm, a bulk density of 100 kg/m$^3$, a coefficient of water absorption of 0.071 g/cm$^3$ and 25%-compressive hardness of 0.040 N/cm$^2$ was prepared. The sheet had 17 mm×17 mm square through holes and formed at intersections of a lattice, the pitch of which was 20 mm, was prepared. Moreover, a sheet having through holes each having a diameter of 5 mm and formed at the intersections of a lattice, the pitch of which was 20 mm, was prepared. Moreover, a sheet having through holes each having a diameter of 5 mm and formed at the intersections of a lattice, the pitch of which was 20 mm, was prepared. Then, the sheets were stacked so that a sound absorbing structure having double holes and a total thickness of 20 mm was manufactured. The sheet having the through holes each having the diameter of 5 mm was disposed opposite to a rigid wall so that the normal incidence sound absorption coefficient was measured. The total area of opening of the double holes of the foregoing sound absorbing structure opposite to the sound source surface was 72%.

The normal incidence sound absorption coefficient of each of the foregoing sound absorbing structure was measured at each of predetermined frequencies. The measurement was performed by a method conforming to JIS A1405 under a close-contact with the rigid wall. Results of the measurement was shown in FIGS. 11 to 19.

As a result of the examples, it is evident that the structure according to the present invention has an excellent sound absorbing characteristic. When the arrangement (the density) of the double holes is appropriately changed, the sound absorption coefficient at a required frequency can be raised regardless of the position (the thickness). As an alternative to this, the sound absorption coefficient in a wide specific frequency range can be raised. Thus, a sound absorbing effect meeting a purpose can be realized.

As described above, according to the present invention, there are provided the sound absorbing structure having a satisfactory sound absorbing characteristic over a wide frequency range. Moreover, the sound absorbing structure is capable of improving the sound absorbing characteristic in a required frequency range or totally improving the sound absorption coefficient in a wide frequency range to meet a purpose. In addition, the engine cover for an automobile incorporates the sound absorbing structure can be also provided.

Now, a fourth embodiment of the present invention will be described in detail.

A porous member having continued voids in the fourth embodiment of the present invention is exemplified by a open-cell foam or a molded fibrous material. The present invention is not limited to the foregoing materials.

When the open-cell foam is employed in the fourth embodiment of the present invention, it is preferable that the coefficient of water absorption of the foam member is 0.2 g/cm$^3$ or higher, more preferably 0.3 g/cm$^3$ or higher and most preferably 0.4 g/cm$^3$ or higher. When the foam member having the foregoing coefficient of water absorption is employed, a sound absorbing structure exhibiting an excellent sound absorbing characteristic can be obtained.

The coefficient of water absorption is measured by a method conforming to JIS K6767-B.

The main component of the continued foam member maybe any one of a polymer materials, such as rubber, elastomer, thermoplastic resin and thermosetting resin. The polymer material is exemplified by rubber, such as CR (chloroprene rubber), SBR (styrenebutadiene rubber), NBR (nitrilebutadiene rubber), EPDM (ternary polymer of ethylene, propylene and diene), silicon rubber, fluorine rubber or acrylic rubber; any one of various elastomers, such as a thermoplastic elastomer and soft urethane; any one of thermoplastic resin, such as polyethylene, polypropylene, polyamide or polyester; and any one of thermosetting resin, such as hard urethane or phenol resin. The present invention is not limited to the foregoing materials. Since a foam member, the main component of which is soft urethane, is a low-cost material as well as having a satisfactory strength, the material is a preferred material to be combined with a sound insulating cover. As the foam member, a sheet constituted by a foam member made of soft urethane marketed as a cushion material may be employed.

The main component of the molded fibrous material as the porous member according to the present invention may be any one of a variety of molded fibrous materials, such as an organic molded fibrous material or an inorganic molded fibrous material. The molded fibrous material is exemplified by a molded organic fibrous material, such as polyester felt, cotton felt or unwoven nylon fiber and a molded inorganic fibrous material, such as glass wool or rock wool. The present invention is not limited to the foregoing material. Glass wool which is a low cost material exhibiting excellent heat resistance is a preferred material.

The molded fibrous material may be glass wool marketed as a sound insulation material or a heat insulation material as a building element.

The main component of a coating film provided for the porous member according to the present invention may be a variety of thermoplastic resin or thermosetting resin.

The coating film is exemplified by a polyethylene film, a polypropylene film, a polyester film, a polyvinyl chloride film, a polyamide film, a polyurethane film and ethylene-vinyl acetate copolymer film. The present invention is not limited to the foregoing materials.

The film is disposed to cover at least the overall surface of the sound source. When the film is disposed, a variety of pressure sensitive adhesives, such as an adhesive and an adhesive tape, may be employed. As an alternative to bonding of the film, the film may be joined by a means, such as a stapling or sewing. The film and the porous member may directly be welded to each other by a heat press or the like.

As an alternative to the film, the surface of the porous member may be fused with an iron or the like to form the coating film, the present invention is not limited to the method of forming the coating film.

The sound absorbing structure according to the present invention is constituted by forming through holes in the porous member coated with the coating film.

When a ratio of a total area of openings of the through holes (hereinafter called a "total area of openings") formed in the surface coated with the coating film is too low with respect to the area of the surface coated with the coating film, a satisfactory sound absorbing characteristic cannot be realized. If the ratio of the total area of the openings of the through hole formed in the surface coated with the coating film is too high, the sound absorption coefficient deteriorates.

Therefore, it is preferable for the present invention that the ratio of the total area of the openings in the surface coated with the coating film is specified to a predetermined range. It is preferable that the ratio is not less than 1% nor more than 70%, more preferably not less than 3% nor more than 50% and most preferably not less than 5% nor more than 40%. The sound absorbing structure having the ratio of the total area of the openings of the through holes which satisfies the foregoing range is able to satisfactorily improve the sound absorbing characteristic.

Figure 20A:
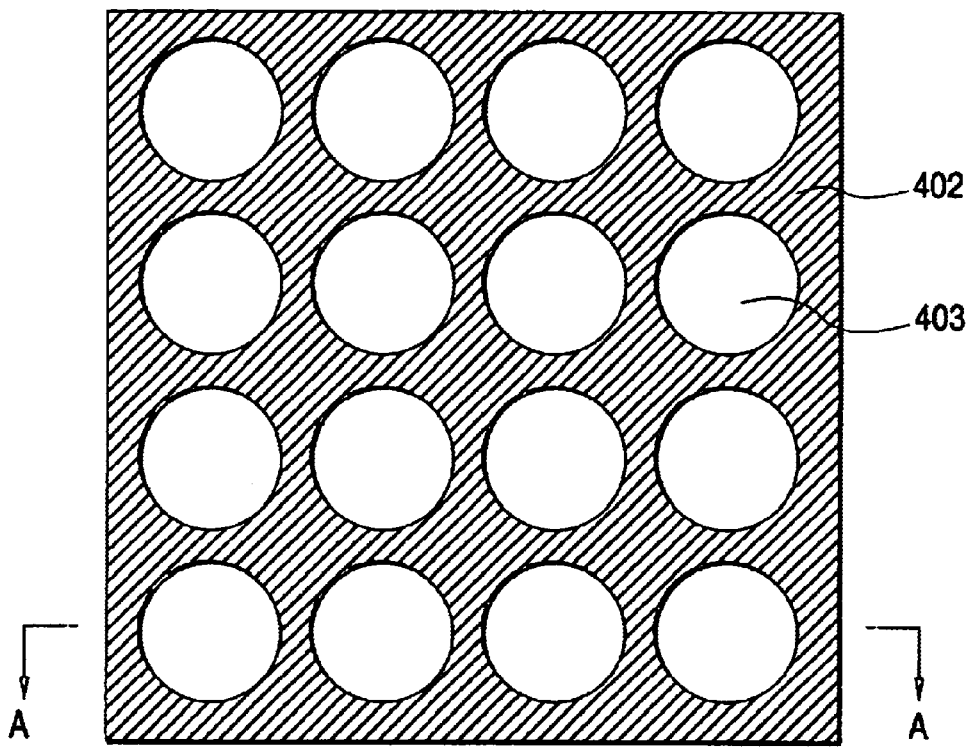
FIG. 20A is an a diagram showing an example of a fourth embodiment of a sound absorbing structure according to the present invention.
Figure 20B:
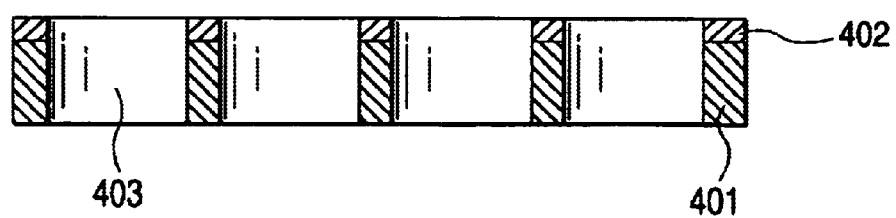
FIG. 20B is a sectional view a sectional view taken on line A—A of FIG. 20A.

The present invention is not limited to the size, the shape (a planar shape of the opening) and the positions of the openings which are formed in the porous member. For example, a structure as shown in FIG. 20A may be employed in which a plurality of circular through holes 403 having the same size may be formed at intersections of a lattice having a spacing such that the through holes 403 penetrate a porous member 401 and a coating film 402. In this case, the diameter of each of the through holes 403 is enlarged or the number of the through holes 403 per unit area is increased. That is, when the intervals of the intersections of the lattice are reduced, the sound absorption coefficient in a high frequency range can be improved. When the diameter of each of the through holes 403 is reduced or when the number of the through holes 403 per unit area is increased, that is, when the intervals of the intersections of the lattice are elongated, the sound absorption coefficient in a low frequency range can be improved. Therefore, the sound absorption coefficient in a required frequency range can be improved by determining the size of each of the through holes 403 or the intervals of the intersections of the lattice to be adequate values.

When the size and the positions of the through holes 403 are equal to constant, the sound absorption coefficient in the low frequency range can be improved as the thickness (a total thickness of the porous member 401 and the coating film 402) of the sound absorbing structure is enlarged. The frequency range in which the sound absorbing effect can be improved varies according to the thickness. When the size, shape and the positions of the through holes 403 are arbitrarily changed by adjusting the thickness of the sound absorbing structure, the sound absorbing effect in a predetermined frequency range can be improved. Therefore, a noise level in a required frequency range can be reduced.

As described above, the sound absorbing structure according to the present invention is able to easily improve the sound absorbing characteristic in a specific frequency range.

When the present invention is structured such that two or more layers of the porous members each having the coating film formed on at least either surface thereof are laminated, a sound absorbing structure having a more satisfactory sound absorption coefficient can be obtained. In the this case, each layer (the porous member coated with the coating film) must be disposed such that the surface coated with the coating film faces the sound source. Moreover, the through holes must be formed in the layer closest to the sound source. The through holes may be provided for the farthermost layer from the sound source or the through hole may be omitted from the farthermost layer. The total area of openings in the layer closest to the sound source is made to be largest. As the distance is elongated from the sound source, the total area of the openings is gradually reduced.

Figure 21A:
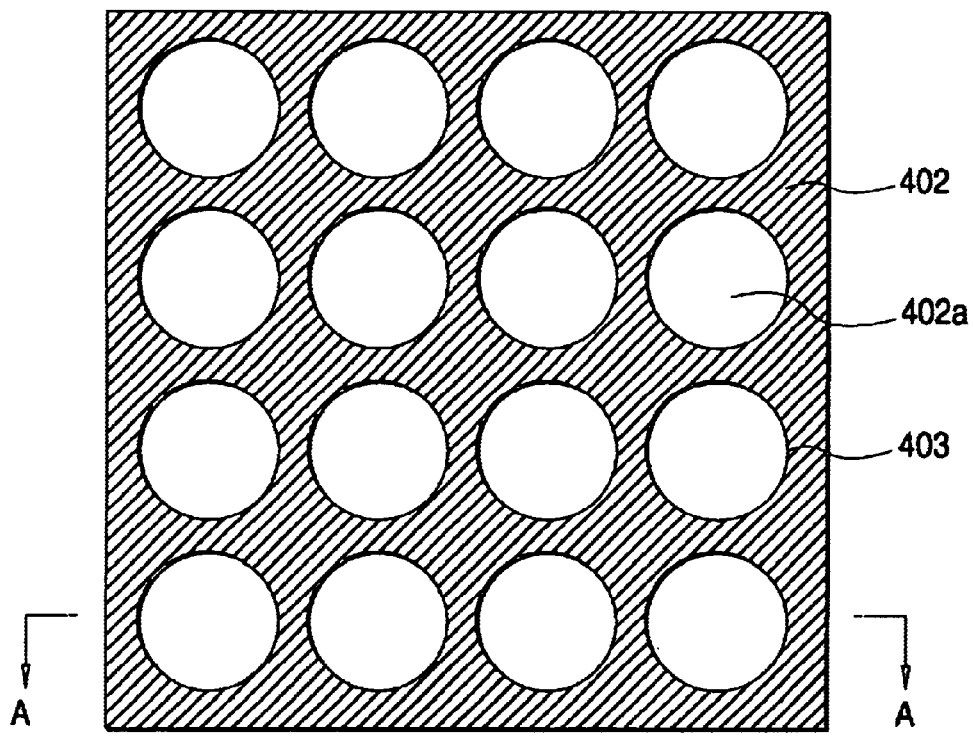
FIG. 21A is an a diagram showing another example of the fourth embodiment of the sound absorbing structure.
Figure 22A:
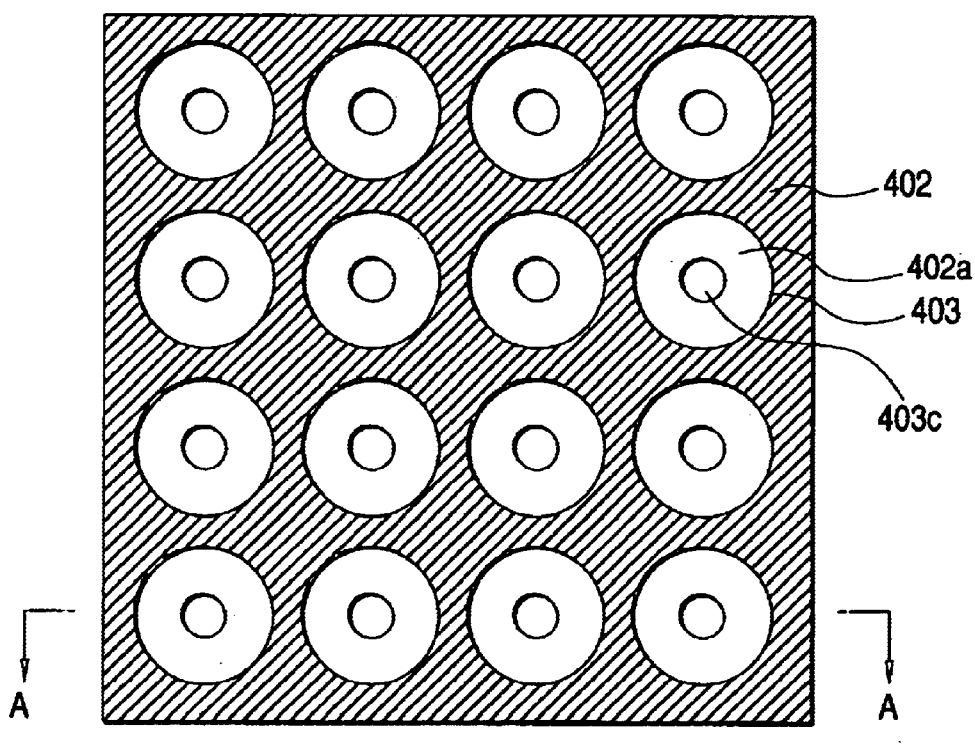
FIG. 22A is an a diagram showing another example of the fourth embodiment of the sound absorbing structure.

The sound absorbing structure having the laminate structure is shown in FIGS. 21A and 22A. Each of the portion on this side of the top view and the upper portion in the cross sectional view A—A are adjacent to the sound source.

Figure 21B:
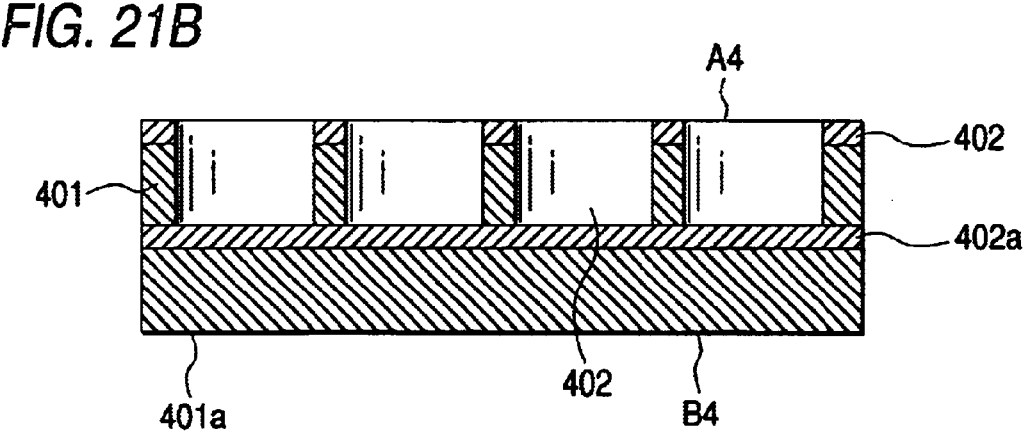
FIG. 21B is a sectional view a sectional view taken on line A—A of FIG. 21A.

As shown in FIGS. 21A and 21B, a first layer A4 is prepared which has a coating film 402 formed on either surface of a porous member 401 and which is provided with a plurality of circular through holes 403 having the same size and formed at the intersections of the lattice having a spacing. A second layer B4 having a coating film 402*a* formed on either surface of a porous member 401*a* is prepared. The first layer A4 and the second layer B4 are disposed such that the both of the coating films 402 and 402*a* face the sound source. Specifically, the first layer A4 is laminated closer to the sound source. Thus, the sound absorbing structure can be constituted.

The first layer A4 and second layer B4 may incorporate the same porous members and coating films. As an alternative to this, porous members and coating films, the materials, the thicknesses and the physical properties of which are different from each other, may be employed.

Figure 22B:
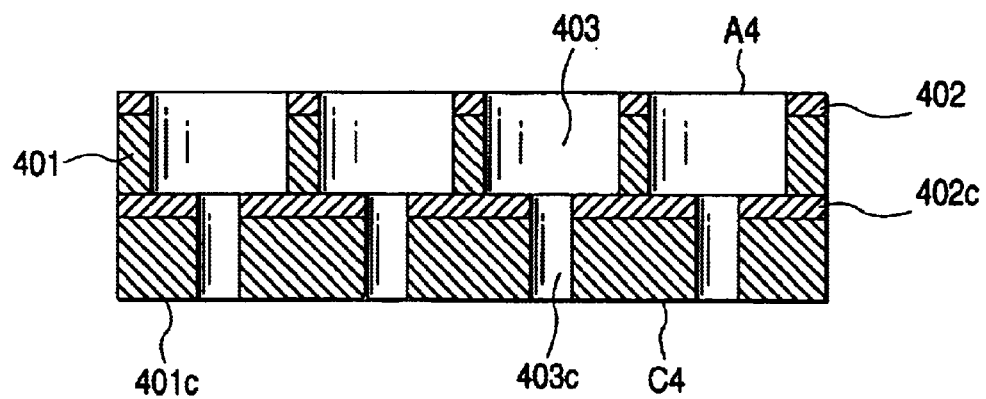
FIG. 22B is a sectional view a sectional view taken on line A—A of FIG. 22A.

As shown in FIGS. 22A and 22B, a first layer A4 is prepared which has a coating film 402 formed on either surface of a porous member 401 and which is provided with a plurality of circular through holes 403 having the same size and formed at the intersections of the lattice having a spacing. Moreover, a third layer C4 is prepared which has a coating film 402*c* formed on either surface of a porous member 401*c* and provided with a plurality of circular through holes 403c having the same size which is smaller than the size of each of the through holes 403 formed in the first layer A4 and formed at the intersections of the same lattice of the first layer A4. The first layer A4 and the third layer C4 are disposed such that both of the coating films 402 and 402c face the sound source. Moreover, the first layer A4 is laminated closer to the sound source. Thus, the sound absorbing structure can be constituted.

The first layer A4 and the third layer C4 may incorporate the same porous members and coating films. As an alternative to this, porous members and coating films, the materials, the thicknesses and the physical properties of which are different from each other, may be employed.

The sound absorbing structure may have a triple-layer structure (not shown) obtained by sequentially laminating the first layer A4, the third layer C4 and the second layer B4 in this order when viewed from the sound source.

The reason why the sound absorbing characteristic can be improved in a wide frequency range by employing the above-mentioned laminate structure is, by the inventors of the present invention, considered as follows.

That is, each of the porous members each of which is provided with the through holes and coated with the coating film is able to improve the sound absorbing characteristic with respect to a single frequency. When plural types of porous members coated with the coating films and arranged such that the sizes and/or positions of the through holes and the different frequency characteristics are laminated and integrated, each layer is able to improve the sound absorbing characteristic at each specific frequency. Thus, the laminated layers are able to improve the sound absorbing characteristics over a wide frequency range.

The sound absorbing structure according to the present invention may varied.

For example, the through hole may be formed into a triangular shape, a rectangular shape, a polygonal shape or an elliptic shape. In some cases, an amorphous shape may be employed. The through holes may be formed at random planar positions as well as the lattice configuration.

The sound absorbing structure according to the fourth embodiment of the present invention is not limited to a specific theory. This sound absorbing structure is characterized in that the structure is similar to a perforated plate which is a resonant-type sound absorbing structure having an air layer formed at the rear of a perforated hard board. Therefore, a sound absorbing mechanism using resonance similar to the perforated plate is effected as one of the sound absorbing mechanisms.

The characteristic of the structure of the sound absorbing structure according to the present invention lies in that the structure is similar to that of a membrane oscillation type sound absorbing structure having an air layer formed at the rear of a soft membrane substance, such as a resin film. Therefore, it is conceivable that also a sound absorbing mechanism using oscillations of the membrane is effected.

That is, the sound absorbing structure according to the present invention uses both of the resonant-type sound absorbing mechanism and the membrane oscillation type sound absorbing mechanism so that the satisfactory sound absorbing characteristic over a wide frequency range is realized.

In general, the membrane oscillation type sound absorbing structure incorporating the perforated plate constituted by a hard board or a resin film exhibits a somewhat satisfactory sound absorbing characteristic in a single frequency range. However, the overall sound absorbing characteristic is unsatisfactory. Although it has been known that the structure in which a open-cell foam or glass wool is provided for the air layer at the rear of the perforated plate or the membrane substance enables the sound absorbing characteristic to be improved, the sound absorbing characteristic is unsatisfactory.

On the other hand, the sound absorbing structure according to the present invention exhibits significantly excellent sound absorbing characteristic as compared with the conventional membrane oscillation type sound absorbing structure incorporating the perforated plate constituted by the hard board or the resin film. When also a comparison is made with the sole foam member and the molded fibrous member in the form of a sole structure, significantly excellent sound absorbing characteristics can be obtained contrary to expectations.

As described above, the sound absorbing structure according to the present invention exhibits satisfactory sound absorbing characteristic over a wide frequency range. Moreover, the sound absorbing characteristic in a required frequency range can be improved to meet a requirement.

When each of the sound absorbing structures is disposed on the inside (adjacent to the sound source) of the sound insulating cover, a sound insulating cover can be provided which is able to arbitrarily control the frequency range in which the sound insulation effect can be obtained. Note that the present invention includes the foregoing sound insulating cover.

The body of the sound insulating cover may be made of metal, such as iron, aluminum or stainless steel, or resin such as nylon, polypropylene or unsaturated polyester. The resin may be added with a filler and/or fibers. A material obtained by adding the filler and/or the fibers to nylon is a light weight material exhibiting excellent heat resistance and strength. Therefore, the foregoing material is a preferred material to constitute the sound insulating cover.

Figure 23:
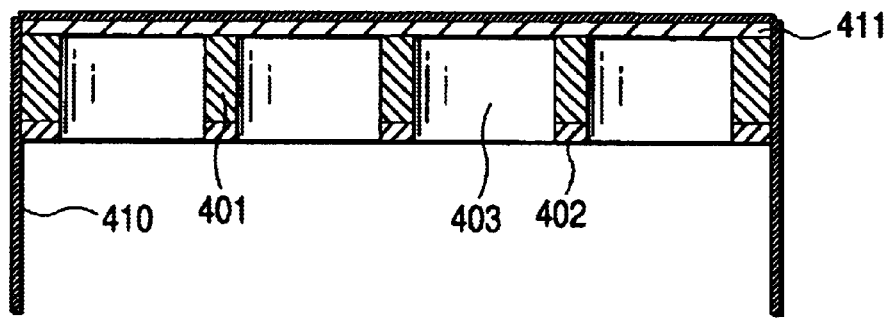
FIG. 23 is a cross sectional view showing an embodiment of a sound insulating cover according to the present invention.

The sound absorbing structure is secured to the inner surface of the sound insulating cover by a method which is not limited to a specific method. For example, a structure as shown in FIG. 23 may be employed in which the coating film 402 of the sound absorbing structure faces the sound source. Moreover, the interface between the porous member 401 and the body 410 of the sound insulating cover is secured by an adhesive means 411, such as an adhesive agent, a pressure sensitive adhesive agent or a pressure sensitive adhesive tape.

Figure 24:
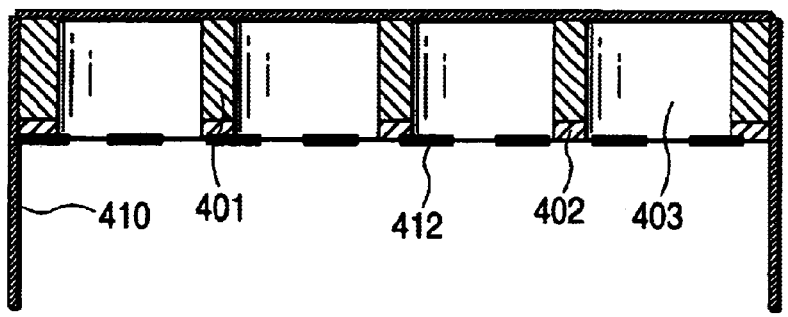
FIG. 24 is a cross sectional view showing another embodiment of a sound insulating cover according to the present invention.
Figure 25:
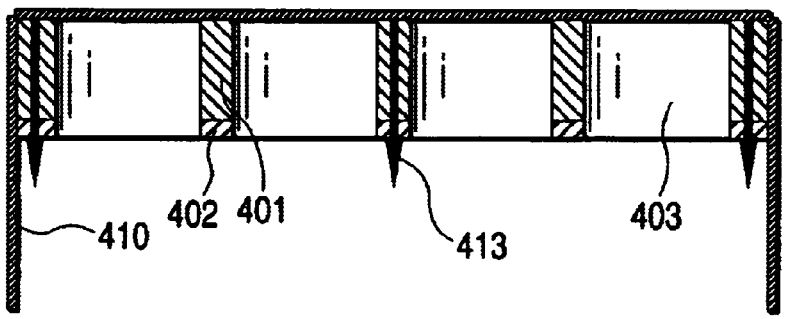
FIG. 25 is a cross sectional view showing another embodiment of a sound insulating cover according to the present invention.

A structure as shown in FIG. 24 may be employed in which the surface of the sound absorbing structure coated with the coating film 402 is covered with a net 412. Another structure as shown in FIG. 25 may be employed in which the porous member 401 of the sound absorbing structure is secured by a pin 413 allowed to project over the inner surface of the body 410 of the cover.

Examples of the present invention will now be described more in detail. Note that the present invention is not limited to the following examples.

In Examples 29 to 33 and Comparative Examples 20 to 25, normal incidence sound absorption coefficients were measured under rigid wall contact condition conforming to JIS A1405.

Figure 26:
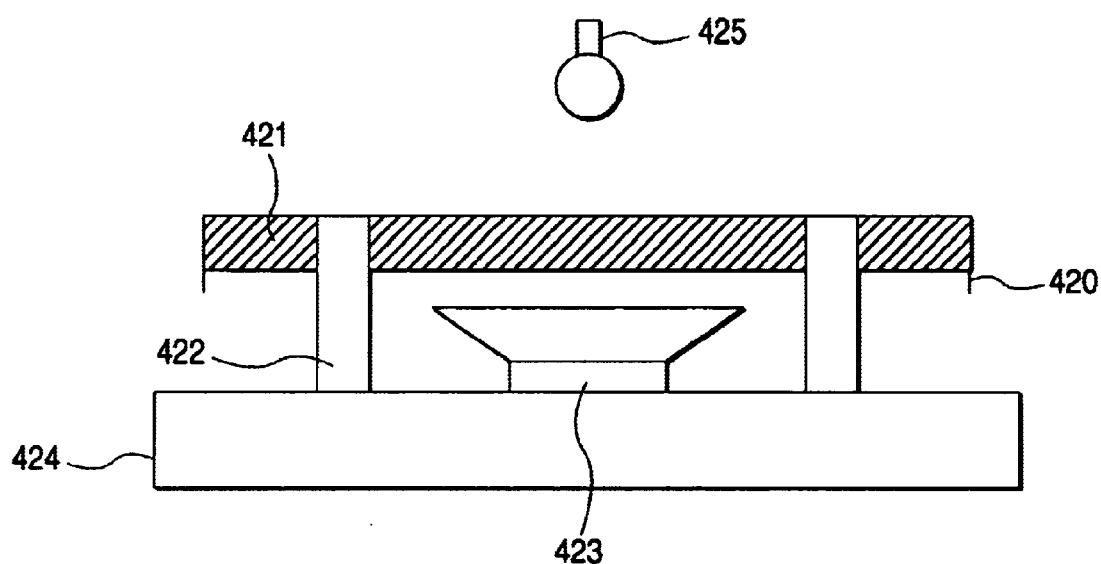
FIG. 26 is a schematic view showing the structure of a measuring apparatus for measuring sound absorbing characteristics of Examples 34 to 38 and Comparative Examples 26 to 31.

In Examples 34 to 38 and Comparative Examples 26 to 31, a measuring apparatus shown in FIG. 26 was employed. That is, a stainless steel container having a bottom formed into a rectangular shape, a size of 435 mm·330 mm and a depth of 35 mm was employed as a sound insulating cover body 420. A sound absorbing structure 421 having a size of 435 mm×330 mm was secured to the inner surface of the sound insulating cover body 420 by using a pressure sensitive adhesive agent. The sound insulating cover body 420 was secured to an aluminum plate 424 through legs 422 made of aluminum, having a rectangular cross sectional shape, a size of 20 mm×50 mm and a height of 70 mm with a pressure sensitive tape such that the sound absorbing structure 421 faced a speaker unit 423. The measurement was performed such that white noise was radiated from the speaker unit 423 so that a microphone 425 disposed immediately above the sound insulating cover body 420 at a height of 50 mm was used to measure the noise level. The noise level was measured in a frequency range from 250 Hz to 5000 Hz with a resolution of ⅓ octave. Also noise of the sole body of the sound insulating cover body 420 in a state in which the sound absorbing structure 421 was omitted was measured. The noise level realized when the sound absorbing structure 421 was disposed was subtracted from the noise level of the sole body of the sound insulating cover body 420 was the noise insulation effect of the sound absorbing structure 421. As the value of the noise insulation effect was increased, the effect of reducing noise was improved.

EXAMPLE 29

A foam-member sheet (a open-cell hereinafter applied to the following examples) made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. Moreover, a through hole having a diameter of 5 mm was formed at each of intersections of a lattice, the pitches of which were 20 mm. Thus, a sound absorbing structure was manufactured. The sound absorbing structure was disposed such that the surface to which the polyethylene film was not bonded faced the rigid wall. Then, the normal incidence sound absorption coefficient was measured.

EXAMPLE 30

A foam-member sheet made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. Moreover, a through hole having a diameter of 10 mm was formed at each of intersections of a lattice, the pitches of which were 20 mm. Thus, a sound absorbing structure was manufactured. The sound absorbing structure was disposed such that the surface to which the polyethylene film was not bonded faced the rigid wall. Then, the normal incidence sound absorption coefficient was measured.

EXAMPLE 31

A foam-member sheet made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. Moreover, a through hole having a diameter of 13 mm was formed at each of intersections of a lattice, the pitches of which were 20 mm. Thus, a sound absorbing structure was manufactured. The sound absorbing structure was disposed such that the surface to which the polyethylene film was not bonded faced the rigid wall. Then, the normal incidence sound absorption coefficient was measured.

EXAMPLE 32

A glass wool sheet having a bulk density of 48 kg/m$^3$ and a polyethylene film having a thickness of 0.05 mm were bonded to each other with an adhesive agent. Moreover, a through hole having a diameter of 10 mm was formed at each of intersections of a lattice, the pitches of which were 20 mm. Thus, a sound absorbing structure was manufactured. The sound absorbing structure was disposed such that the surface to which the polyethylene film was not bonded faced the rigid wall. Then, the normal incidence sound absorption coefficient was measured.

EXAMPLE 33

A foam-member sheet made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. Moreover, a through hole having a diameter of 10 mm was formed at each of intersections of a lattice, the pitches of which were 20 mm. Thus, a first sound absorbing structure was manufactured. A foam-member sheet made of soft urethane and having a thickness of 10 mm, a bulk density of 25 kg/m$^3$ and a coefficient of water absorption of0.76 g/cm$^3$ and a polyethylene film having a thickness of 0.05 mm were bonded to each other with an adhesive agent. Thus, a second sound absorbing structure was manufactured. The surface of the first sound absorbing structure to which the polyethylene film was not bonded was bonded to the surface of the polyethylene film of the second sound absorbing structure with an adhesive agent. Thus, a sound absorbing structure was obtained. The sound absorbing structure was disposed such that the surface to which the second sound absorbing structure faced the rigid wall. Then, the normal incidence sound absorption coefficient was measured.

EXAMPLE 34

A foam-member sheet made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. Moreover, a through hole having a diameter of 10 mm was formed at each of intersections of a lattice, the pitches of which were 20 mm. Thus, a first sound absorbing structure was manufactured. A foam-member sheet made of soft urethane and having a thickness of 10 mm, a bulk density of 25 kg/m$^3$ and a coefficient of water absorption 0.76 g/cm$^3$ and a polyethylene film having a thickness of 0.05 mm were bonded to each other with an adhesive agent. Moreover, a through hole having a diameter of 5 mm was formed at each of intersections of a lattice, the pitches of which were 20 mm. Thus, a second sound absorbing structure was manufactured. The first and second sound absorbing structures were disposed such that their through holes are made to be concentric. Then, the surface of the first sound absorbing structure to which the polyethylene film was not bonded was bonded to the surface of the polyethylene film of the second sound absorbing structure with an adhesive agent. Thus, a sound absorbing structure was obtained. The sound absorbing structure was disposed such that the surface to which second sound absorbing structure faced the rigid wall. Then, the normal incidence sound absorption coefficient was measured.

EXAMPLE 35

The sound absorbing structure according to Example 29 was used. The sound absorbing structure was disposed such that its surface to which the polyethylene film was not bonded faced the rigid wall. Then, the noise insulation effect was measured.

EXAMPLE 36

The sound absorbing structure according to Example 30 was used. The sound absorbing structure was disposed such that its surface to which the polyethylene film was not bonded faced the rigid wall. Then, the noise insulation effect was measured.

EXAMPLE 37

The sound absorbing structure according to Example 31 was used. The sound absorbing structure was disposed such that its surface to which the polyethylene film was not bonded faced the rigid wall. Then, the noise insulation effect was measured.

EXAMPLE 38

The sound absorbing structure according to Example 32 was used. The sound absorbing structure was disposed such that its surface to which the polyethylene film was not bonded faced the rigid wall. Then, the noise insulation effect was measured.

EXAMPLE 39

The sound absorbing structure according to Example 33 was used. The sound absorbing structure was disposed such that the second sound absorbing structure faced the rigid wall. Then, the noise insulation effect was measured.

EXAMPLE 40

The sound absorbing structure according to Example 34 was used. The sound absorbing structure was disposed such that the second sound absorbing structure faced the rigid wall. Then, the noise insulation effect was measured.

COMPARATIVE EXAMPLE 20

The normal incidence sound absorption coefficient of a sound absorbing structure in the form of one foam-member sheet was measured which was made of soft urethane and which had a thickness of 10 mm, a bulk density of 25 kg/m$^3$ and a coefficient of water absorption of 0.76 g/cm$^3$.

COMPARATIVE EXAMPLE 21

The normal incidence sound absorption coefficient of a sound absorbing structure in the form of one foam-member sheet was measured which was made of soft urethane and which had a thickness of 20 mm, a bulk density of 25 kg/m$^3$ and a coefficient of water absorption of 0.76 g/cm$^3$.

COMPARATIVE EXAMPLE 22

The normal incidence sound absorption coefficient of a sound absorbing structure in the form of one foam-member sheet (mixed-cell) was measured which was made of EPDM and which had a thickness of 10 mm, a bulk density of 100 kg/m$^3$ and a coefficient of water absorption of 0.071 g/cm$^3$.

COMPARATIVE EXAMPLE 23

The normal incidence sound absorption coefficient of a sound absorbing structure in the form of one foam-member sheet (closed-cell) was measured which was made of EPDM and which had a thickness of 10 mm, a bulk density of 460 kg/m$^3$ and a coefficient of water absorption of 0.0028 g/cm$^3$.

COMPARATIVE EXAMPLE 24

The normal incidence sound absorption coefficient of a sound absorbing structure in the form of one glass wool sheet was measured which had a thickness of 10 mm and a bulk density of 48 kg/m$^3$.

COMPARATIVE EXAMPLE 25

A foam-member sheet made of soft urethane and having a thickness of 10 mm, a bulk density of 25 kg/m$^3$ and a coefficient of water absorption of 0.76 g/cm$^3$ and a polyethylene film having a thickness of 0.05 mm were bonded to each other with an adhesive agent. The sound absorbing structure was disposed such that the surface to which the polyethylene film was not bonded faced the rigid wall. Then, the normal incidence sound absorption coefficient was measured.

COMPARATIVE EXAMPLE 26

An aluminum plate having a thickness of 5 mm was provided with through holes each having a diameter of 5 mm and formed at each intersection of a lattice, the pitches of which were 20 mm. Then, a foam-member sheet made of soft urethane and having a thickness of 5 mm, a bulk density of 25 kg/m$^3$ and a coefficient of water absorption of 0.76 g/cm$^3$ was bonded to the aluminum sheet with an adhesive agent. Thus, a sound absorbing structure was manufactured. The sound absorbing structure was disposed such that the foam member made of the soft urethane faced the rigid wall. Then, the normal incidence sound absorption coefficient was measured.

COMPARATIVE EXAMPLE 27

The sound absorbing structure according to Comparative Example 20 was used. The sound absorbing structure was bonded to the sound insulating cover body 420 shown in FIG. 26 with an adhesive agent. Then, the noise insulation effect was measured.

COMPARATIVE EXAMPLE 28

The sound absorbing structure according to Comparative Example 21 was used. The sound absorbing structure was bonded to the sound insulating cover body 420 shown in FIG. 26 with an adhesive agent. Then, the noise insulation effect was measured.

COMPARATIVE EXAMPLE 29

The sound absorbing structure according to Comparative Example 22 was used. The sound absorbing structure was bonded to the sound insulating cover body 420 shown in FIG. 26 with an adhesive agent. Then, the noise insulation effect was measured.

COMPARATIVE EXAMPLE 30

The sound absorbing structure according to Comparative Example 23 was used. The sound absorbing structure was bonded to the sound insulating cover body 420 shown in FIG. 26 with an adhesive agent. Then, the noise insulation effect was measured.

COMPARATIVE EXAMPLE 31

The sound absorbing structure according to Comparative Example 24 was used. The sound absorbing structure was bonded to the sound insulating cover body 420 shown in FIG. 26 with an adhesive agent. Then, the noise insulation effect was measured.

COMPARATIVE EXAMPLE 32

The sound absorbing structure according to Comparative Example 25 was used. The surface to which the polyethylene film was not bonded was bonded to the sound insulating cover body 420 shown in FIG. 26 with an adhesive agent. Then, the noise insulation effect was measured.

FIG. 26 with an adhesive agent. Then, the noise insulation effect was measured.

Table 5 collectively shows the material, structure and the physical properties of the sound absorbing structure according to each example. Table 6 collectively shows the material, structure and the physical properties of the sound absorbing structure according to each comparative example.

TABLE 5

|  |  | Example 29 Example 35 | Example 30 Example 36 | Example 31 Example 37 | Example 32 Example 38 | Example 33 Example 39 | Example 34 Example 40 |
|---|---|---|---|---|---|---|---|
| Material Adjacent to Sound Source | Material | Urethane Foam | Urethane Foam | Urethane Foam | Glass Wool | Urethane Foam | Urethane Foam |
|  | Thickness (mm) | 10 | 10 | 10 | 10 | 10 | 10 |
|  | Bulk Density (kg/m$^3$) | 25 | 25 | 25 | 48 | 25 | 25 |
|  | Coefficient of Water Absorption (g/cm$^3$) | 0.76 | 0.76 | 0.76 | — | 0.76 | 0.76 |
|  | Provision of Film | Provide | Provided | Provided | Provided | Provided | Provided |
|  | Provision of Through Holes | Provided | Provided | Provided | Provided | Provided | Provided |
|  | Diameter of Hole (mm) | 5 | 10 | 13 | 10 | 10 | 10 |
|  | Pitches of Lattice (mm) | 20 | 20 | 20 | 20 | 20 | 20 |
| Material adjacent to Rigid Wall or Cover | Material | — | — | — | — | Urethane Foam | Urethane Foam |
|  | Thickness (mm) | — | — | — | — | 10 | 10 |
|  | Bulk Density (kg/m$^3$) | — | — | — | — | 25 | 25 |
|  | Coefficient of Water Absorption (g/cm$^3$) | — | — | — | — | 0.76 | 0.76 |
|  | Provision of Film | — | — | — | — | Provided | Provided |
|  | Provision of Through Hole | — | — | — | — | Not Provided | Provided |
|  | Diameter of Hole (mm) | — | — | — | — | — | 5 |
|  | Pitches of Lattice (mm) | — | — | — | — | — | 20 |

* when the porous member has a single layer structure, the structure is shown in the column of the material adjacent to the sound source.

TABLE 6

|  |  | Comparative Example 20 Comparative Example 27 | Comparative Example 21 Comparative Example 28 | Comparative Example 22 Comparative Example 29 | Comparative Example 23 Comparative Example 30 | Comparative Example 24 Comparative Example 31 | Comparative Example 25 Comparative Example 32 | Comparative Example 26 Comparative Example 33 |
|---|---|---|---|---|---|---|---|---|
| Material Adjacent to Sound Source | Material | Urethane Foam | Urethane Foam | EPDM | EPDM | glass wool | Urethane Foam | Aluminum |
|  | Thickness (mm) | 10 | 20 | 10 | 10 | 10 | 10 | 5 |
|  | Bulk Density (kg/m$^3$) | 25 | 25 | 100 | 460 | 48 | 25 | — |
|  | Coefficient of Water Absorption (g/cm$^3$) | 0.76 | 0.76 | 0.071 | 0.0028 | — | 0.76 | — |
|  | Provision of Film | Not Provided | Not Provided | Not Provided | Not Provided | Not Provided | Provided | Not Provided |
|  | Provision of Through Holes | Not Provided | Not Provided | Not Provided | Not Provided | Not Provided | Not Provided | Provided |
|  | Diameter of Hole (mm) | — | — | — | — | — | — | 5 |
|  | Pitches of Lattice (mm) | — | — | — | — | — | — | 20 |
| Material adjacent to Rigid Wall or Cover | Material | — | — | — | — | — | — | Urethane Foam |
|  | Thickness (mm) | — | — | — | — | — | — | 5 |
|  | Bulk Density (kg/m$^3$) | — | — | — | — | — | — | 25 |
|  | Coefficient of Water Absorption (g/cm$^3$) | — | — | — | — | — | — | 0.76 |
|  | Provision of Film | — | — | — | — | — | — | Not Provided |
|  | Provision of Through Hole | — | — | — | — | — | — | Not Provided |
|  | Diameter of Hole (mm) | — | — | — | — | — | — | — |
|  | Pitches of Lattice (mm) | — | — | — | — | — | — | — |

* when the porous member has a single layer structure, the structure is shown in the column of the material adjacent to the sound source.

COMPARATIVE EXAMPLE 33

The sound absorbing structure according to Comparative Example 26 was used. The soft urethane foam member was bonded to the sound insulating cover body 420 shown in The sound absorbing structure according to Example 29 is the sound absorbing structure according to the present invention. The sound absorbing structures according to Comparative Examples 29 and 31 to 33 are constituted by general-purpose sound insulation materials, which were the open-cell urethane foam, the mixed-cell foam, the closed-cell foam and glass wool. The thickness of each of the sound absorbing structures was the same as that of the sound absorbing structure according to Example 29. In Example 35, the noise insulation effect of the sound absorbing structure according to Example 29 was measured. In Comparative Examples 27 and 29 to 31, the noise insulation effect of each of the general-purpose noise insulation materials according to Comparative Examples 20 and 22 to 24 was measured.

Figure 27:
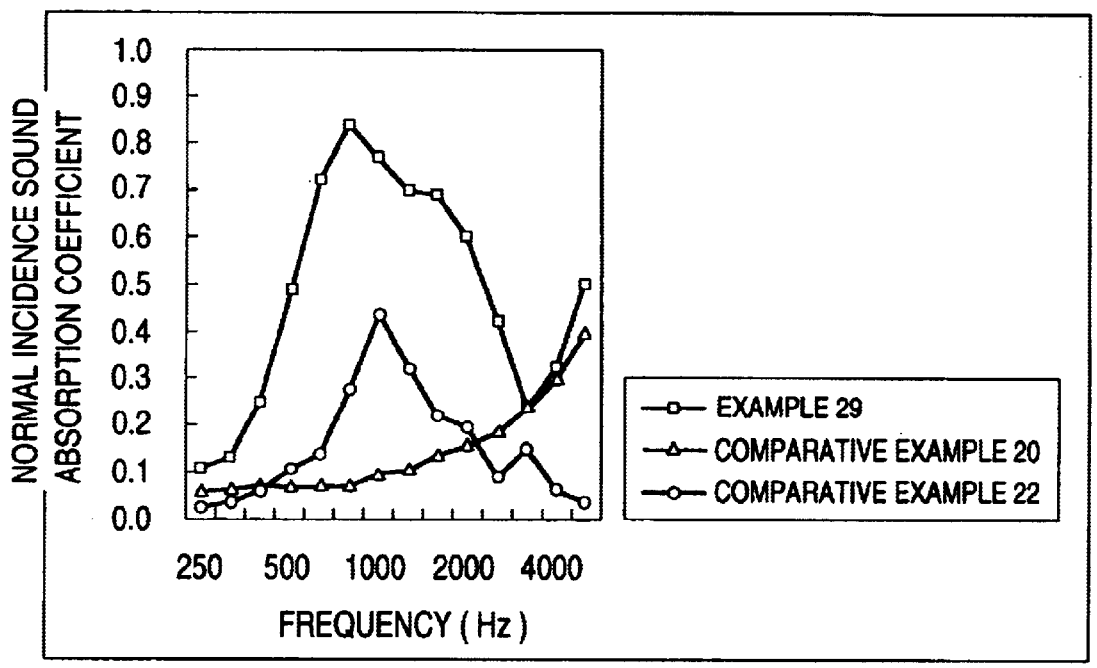
FIG. 27 is a graph showing results of measurement of sound absorption coefficients of sound absorbing structures according to Example 29 and Comparative Examples 20 and 22.
Figure 28:
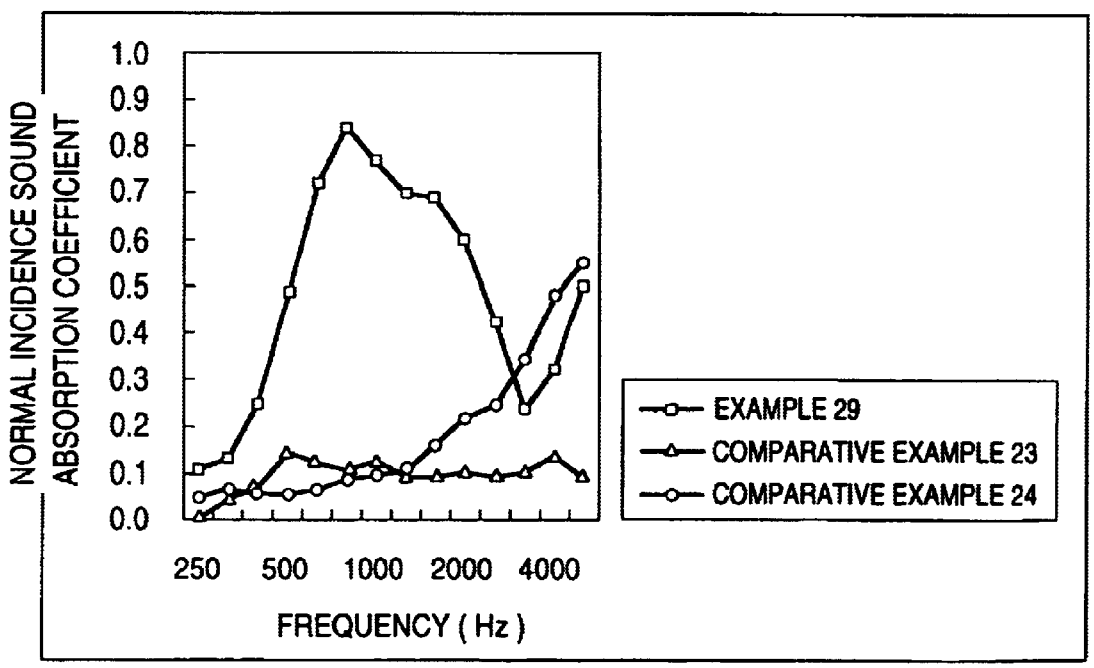
FIG. 28 is a graph showing results of measurement of the sound absorption coefficients of the sound absorbing structures according to Example 29 and Comparative Examples 23 and 24.
Figure 29:
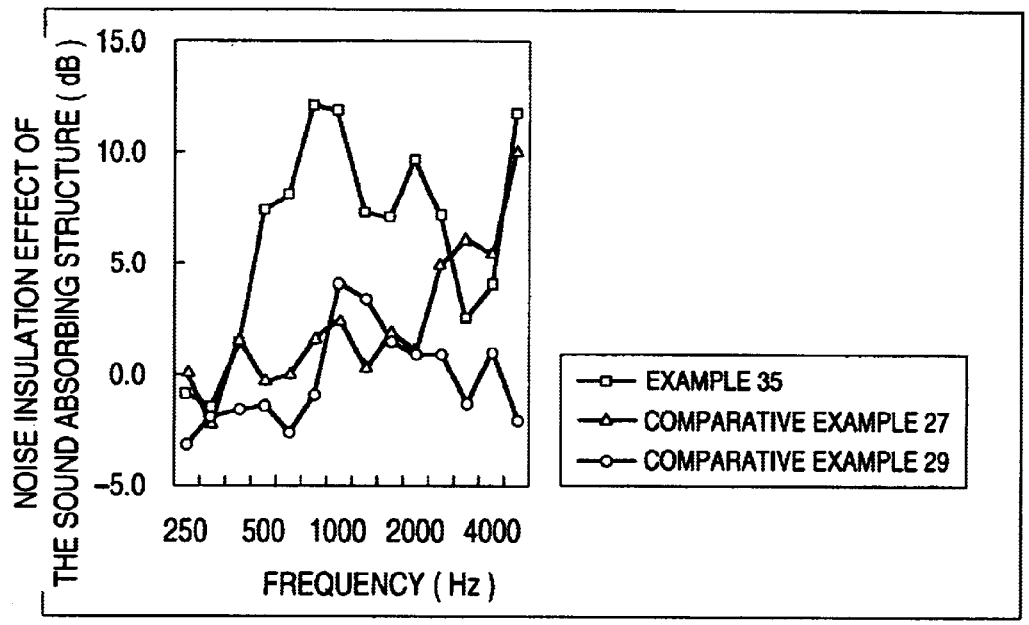
FIG. 29 is a graph showing results of measurement of the noise insulation effects of th(e sound absorbing structures according to Example 35 and Comparative Examples 27 and 29.
Figure 30:
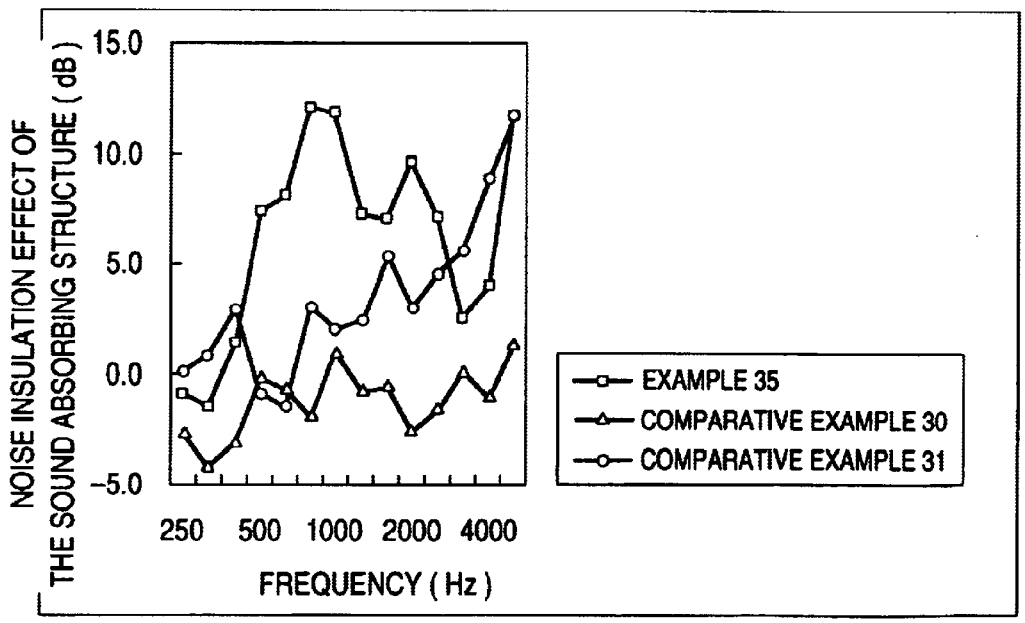
FIG. 30 is a graph showing results of measurement of the noise insulation effects of the sound absorbing structures according to Example 35 and Comparative Examples 30 and 31.

Results of measurement of the normal incidence sound absorption coefficients of Example 29 and Comparative Examples 20 and 22 are shown in FIG. 27. The normal incidence sound absorption coefficients of Example 29 and Comparative Examples 23 and 24 are shown in FIG. 28. Results of measurement of the noise insulation effects of Example 35 and Comparative Examples 27 and 29 are shown in FIG. 29. Results of measurement of the noise insulation effects of Example 35 and Comparative Examples 30 and 31 are shown in FIG. 30. As can be understood from the these drawings, the sound absorbing structures according to Examples 29 and 32 exhibit a high sound absorption coefficient and an excellent noise insulation effect in substantially the overall frequency range as compared with the comparative examples which are general-purpose noise insulation materials.

The structures according to Example 29 and Comparative Example 25 are arranged such that urethane foam and polyethylene film are combined with each other. The sound absorbing structure according to Example 29 is provided with the through holes. On the other hand, no through hole is provided for the structure according to Comparative Example 25. In Comparative Example 32, the noise insulation effect of the sound absorbing structure according to Comparative Example 25 was measured.

Figure 31:
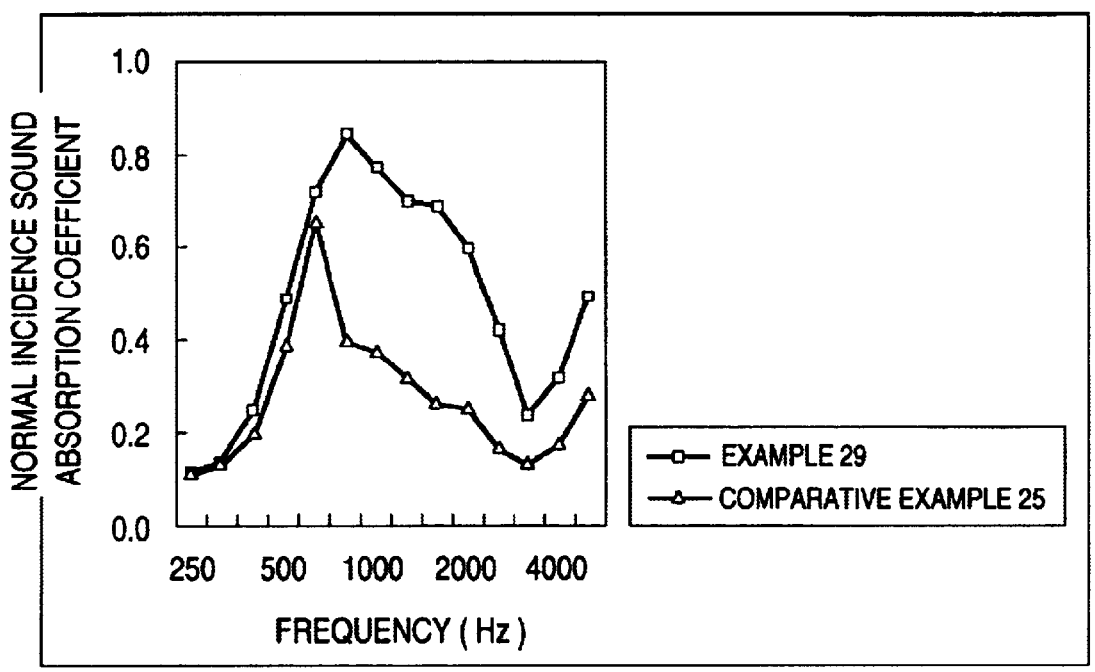
FIG. 31 is a graph showing results of measurement of the sound absorption coefficients of the sound absorbing structures according to Example 29 and Comparative Example 25.
Figure 32:
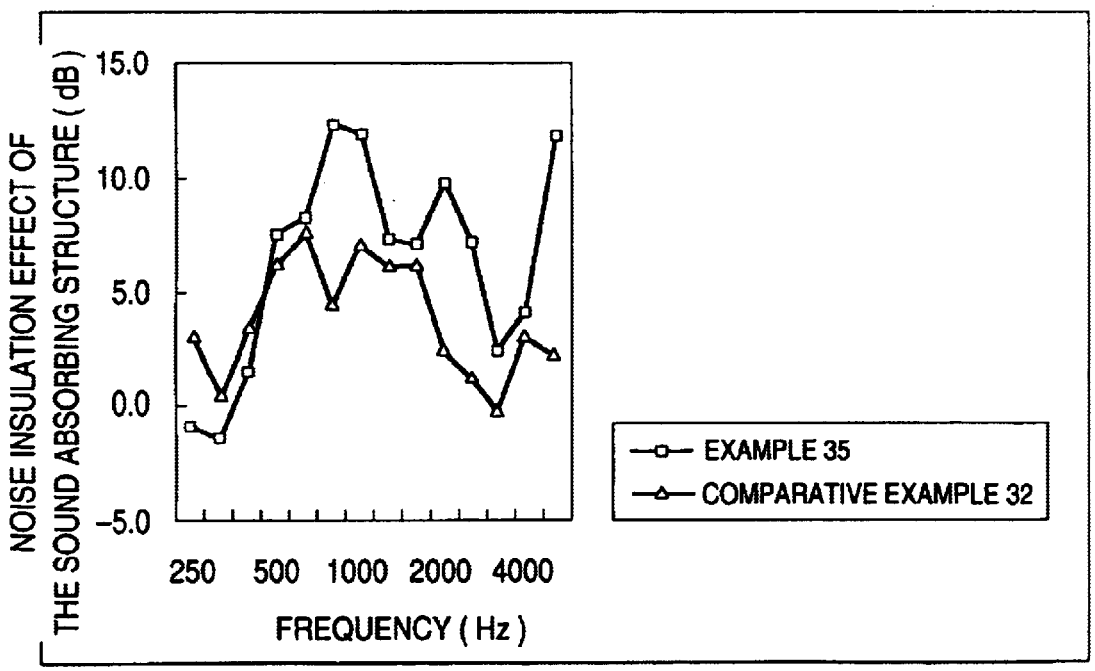
FIG. 32 is a graph showing results of measurement of the noise insulation effects of the sound absorbing structures of Example 35 and Comparative Example 32.

Results of measurement of the normal incidence sound absorption coefficient of each of Example 29 and Comparative Example 25 were shown in FIG. 31. Results of measurement of the noise insulation effect of each of Example 35 and Comparative Example 32 are shown in FIG. 32. As can be understood from the drawings, the structures according to Example 34 and Comparative Example 32 show somewhat high sound absorption coefficients and somewhat satisfactory noise insulation effects in a single and narrow frequency range. The sound absorbing structure according to Examples 29 and 35 exhibit high sound absorption coefficients and satisfactory noise insulation effects in a wide frequency range.

The structure according to Comparative Example 26 is a perforated plate having a resonant-type sound absorbing structure incorporating a hard board constituted by an aluminum plate and having through holes. In Comparative Example 33, the noise insulation effect of the perforated plate according to Comparative Example 26 was measured.

Figure 33:
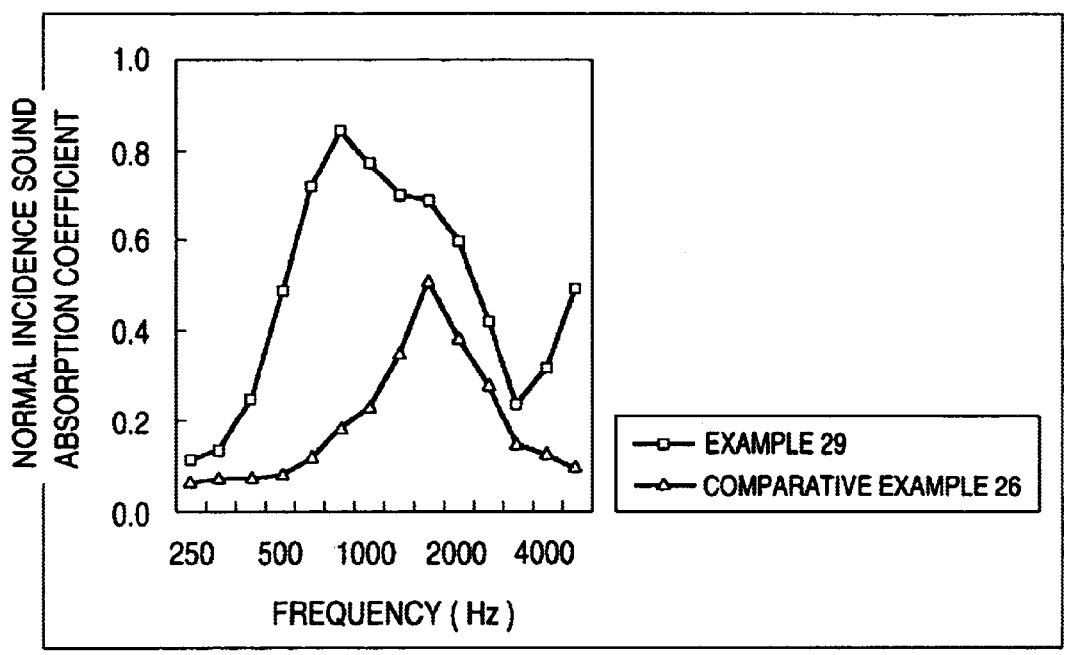
FIG. 33 is a graph showing results of measurement of the sound absorption coefficients of the sound absorbing structures according to Example 29 and Comparative Example 26.
Figure 34:
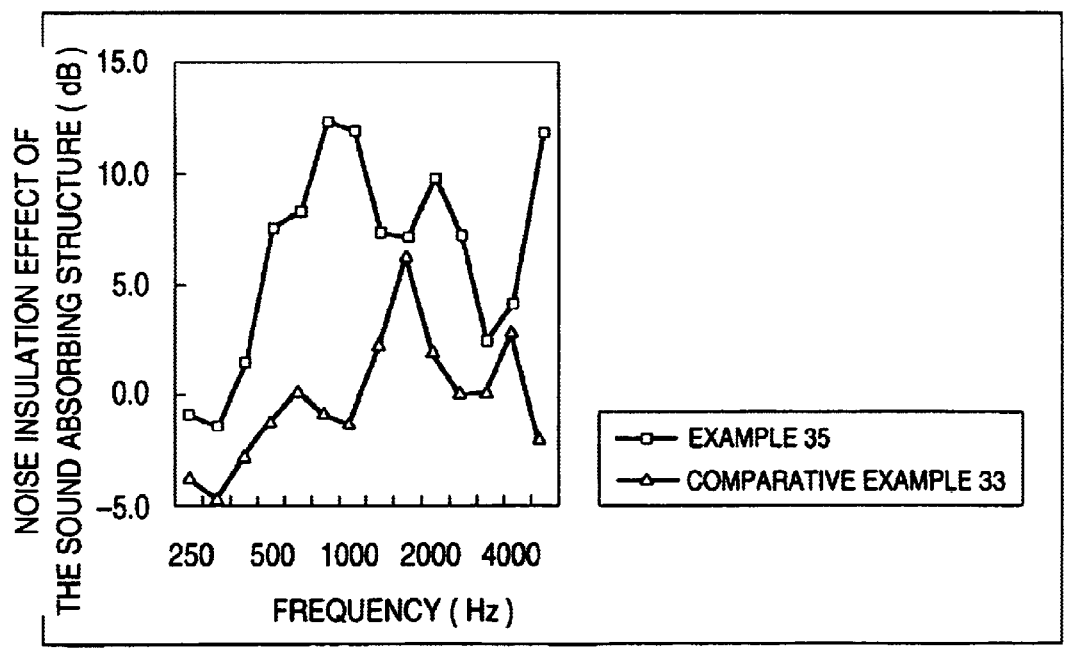
FIG. 34 is a graph showing results of measurement of the noise insulation effects of the sound absorbing structures according to Example 35 and Comparative Example 33.
Figure 35:
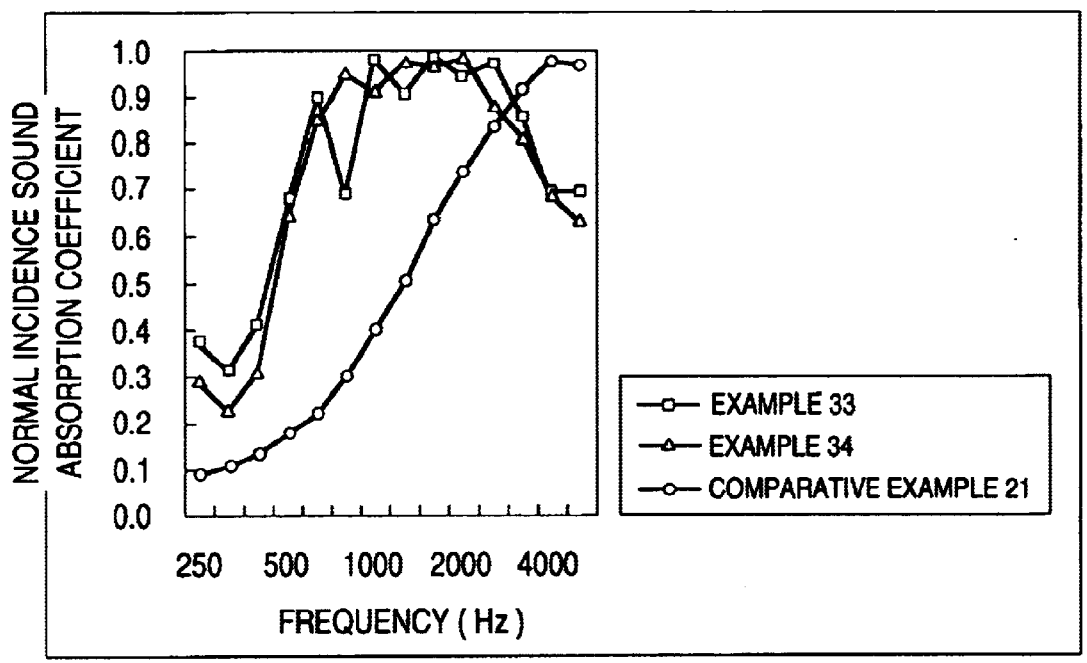
FIG. 35 is a graph showing results of measurement of the sound absorbing structures according to Examples 33 and 24 and Comparative Example 21.

The normal incidence sound absorption coefficients of Example 29 and Comparative Example 26 are shown in FIG. 33. Results of measurement of the noise insulation effects of Example 35 and Comparative Example 33 are shown in FIG. 34. As can be understood from the drawings, the structures according to Examples 29 and 35 exhibit high sound absorption coefficients in a relatively wide frequency range as compared with those of Comparative Examples 26 and 33.

The sound absorbing structures according to Examples 33 and 34 are the sound absorbing structure having the laminate structure according to the present invention. Both of the sound absorbing structures are provided with the through holes formed in the layer adjacent to the sound source. The sound absorbing structure according to Example 33 is not provided with the through hole in the layer distant from the sound source, while the sound absorbing structure according to Example 34 has the through holes as well as in the layer distant from the sound source. In Examples 39 and 40, the noise insulation effects of the sound absorbing structures according to Examples 33 and 6 were measured. In Comparative Example 28, the noise insulation effect of the sound absorbing structure according to Comparative Example 21 was measured.

Figure 36:
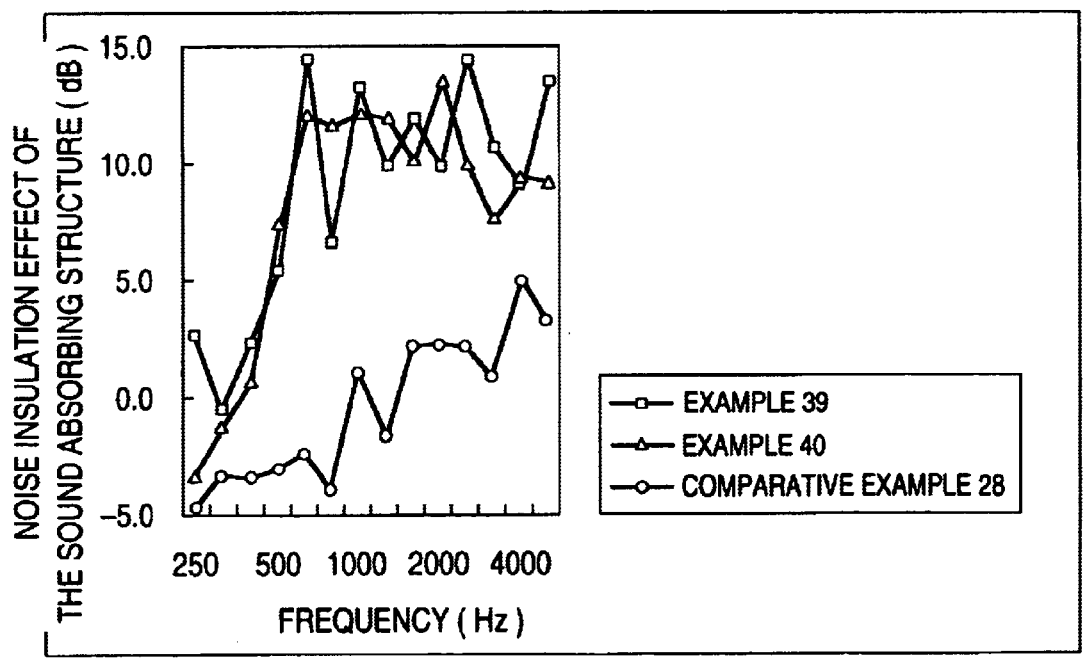
FIG. 36 is a graph showing results of measurement of the noise insulation effects of the sound absorbing structures according to Examples 39 and 40 and Comparative Example 28.

The normal incidence sound absorption coefficients of the structures according to Examples 33 and 34 and Comparative Example 21 are shown in FIG. .35. Results of measured noise insulation effects of Examples 39 and 40 and Comparative Example 28 are shown in FIG. 36. As can be understood from the drawings, the sound absorbing structures according to Examples 33, 34, 39, and 40 exhibited high sound absorption coefficients and satisfactory noise insulation effects in a wide frequency range. The structures according to Comparative Examples 21 and 28 results in high sound absorption coefficients and satisfactory noise insulation effects in only a high frequency range.

The sound absorbing structures according to Examples 29 to 31 are the sound absorbing structures according to the present invention and different from each other in the diameter of each of the through holes. In Examples 35 to 37, the noise insulation effects of the sound absorbing structures according to Examples 29 to 31 were measured.

Figure 37:
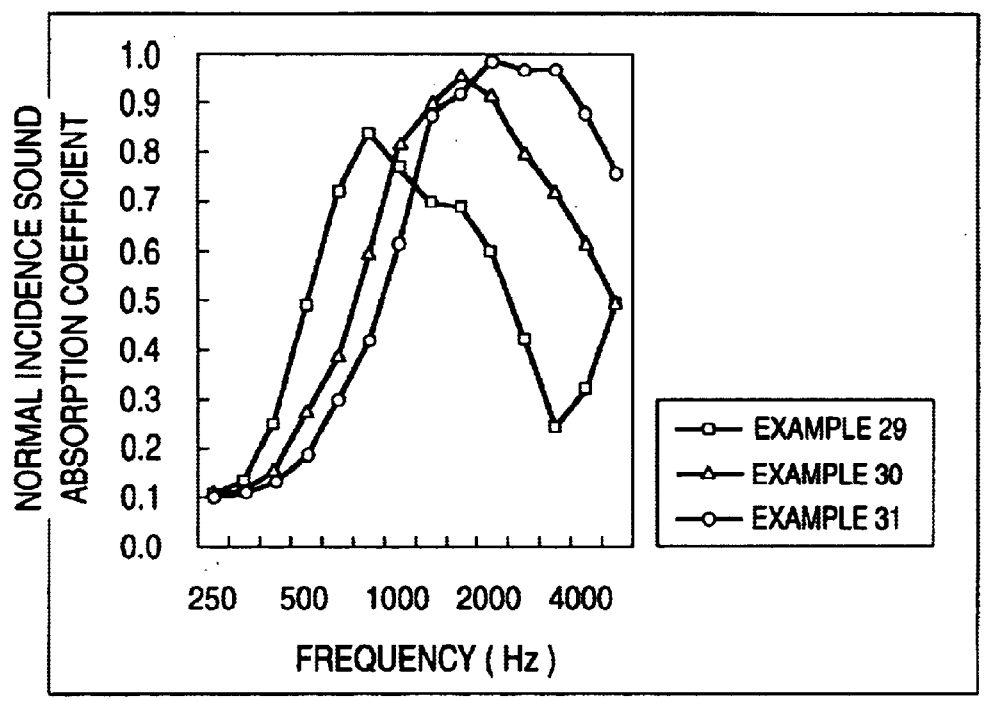
FIG. 37 is a graph showing results of measurement of the sound absorption coefficients of the sound absorbing structures according to Examples 29 to 31.
Figure 38:
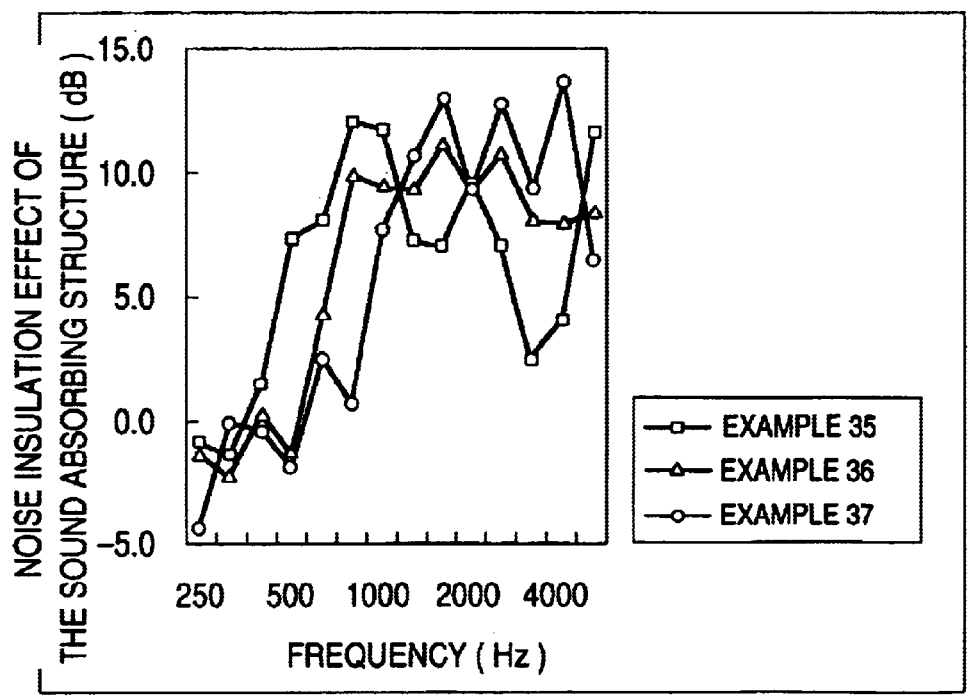
FIG. 38 is a graph showing results of measurement of the noise insulation effects of the sound absorbing structures according to Examples 35 to 37.

Results of measurement of the normal incidence sound absorption coefficients of Examples 29 to 31 are shown in FIG. 37. Results of the noise insulation effects of Examples 35 to 37 are shown in FIG. 38. As can be understood from the drawing, the sound absorbing structure according to Examples 29 to 31 exhibited high sound absorption coefficients in a relatively wide frequency rang. As the diameter of the through hole is increased, the frequency range in which the sound absorbing characteristic and the noise insulation effect are obtained is shifted to the high frequency range. That is, according to the present invention, arbitrary change in the diameter of the through hole enables the sound absorbing characteristic and the noise insulation effect in an arbitrarily frequency range to easily be improved.

The sound absorbing structure according to Examples 29 and 32 are the sound absorbing structures according to the present invention. The sound absorbing structure according to Example 29 incorporates the porous member constituted by the urethane foam. The sound absorbing structure according to Example 32 incorporates the porous member constituted by glass wool. In Examples 35 and 38, the noise insulation effects of the sound absorbing structures according to Examples 29 and 32 were measured.

Figure 39:
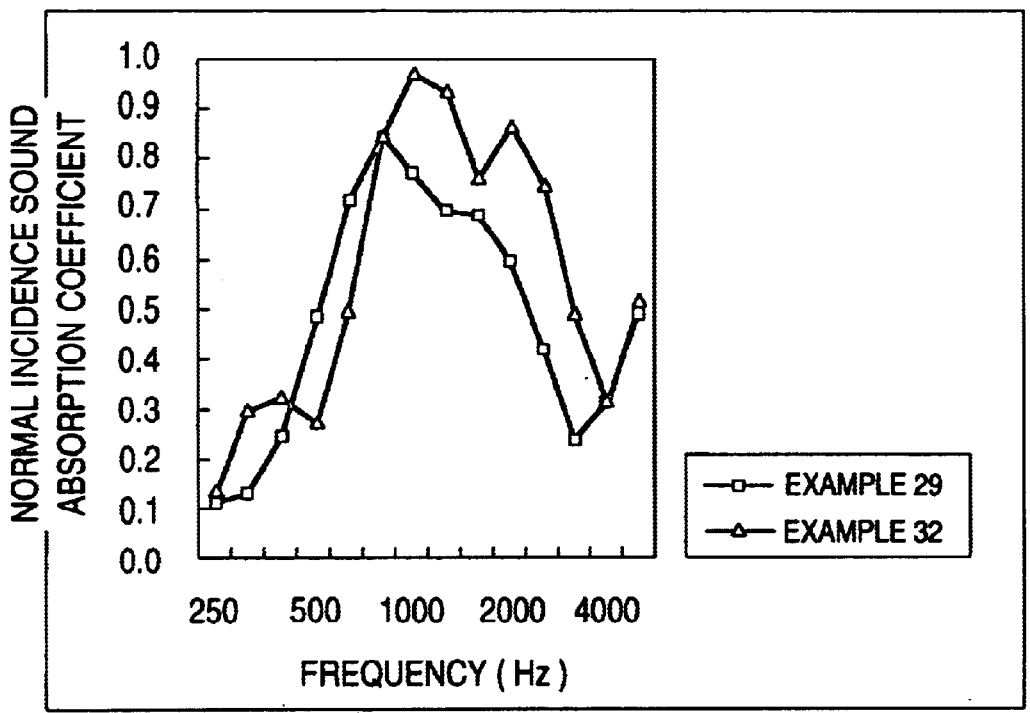
FIG. 39 is a graph showing results of measurement of the sound absorption coefficients of the sound absorbing structures according to Examples 29 and 32.
Figure 40:
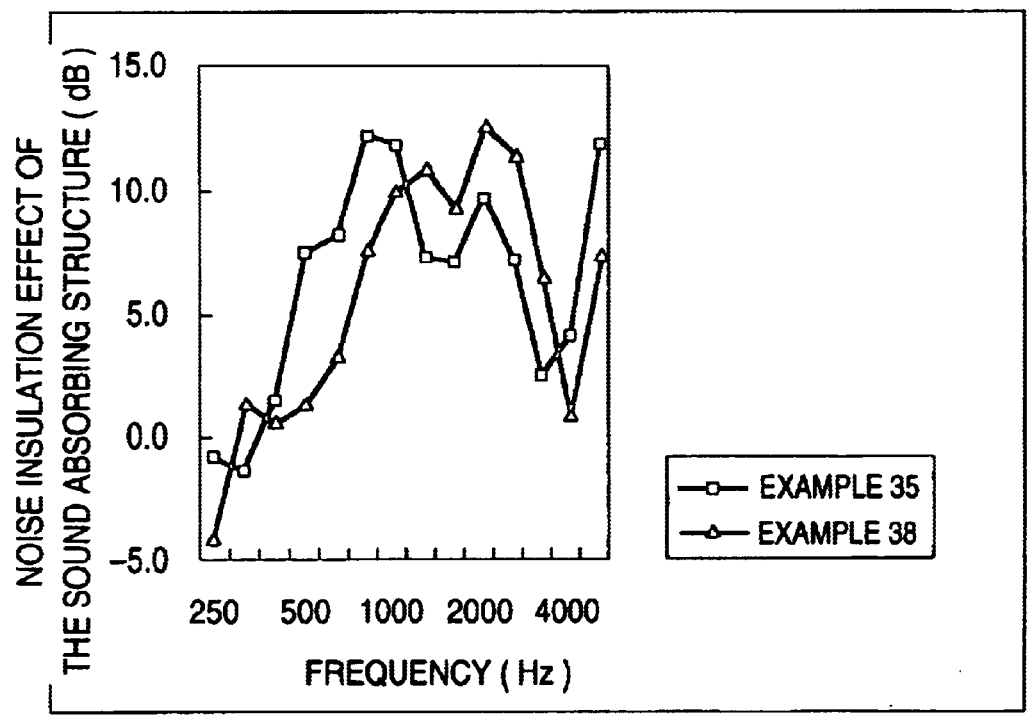
FIG. 40 is a graph showing results of measurement of the noise insulation effects of the sound absorbing structures according to Examples 35 and 38.

Results of measurement of the normal incidence sound absorption coefficient of Examples 29 and 32 were shown in FIG. 39. Results of measurement of the noise insulation effects of Examples 35 and 38 are shown in FIG. 40. As can be understood from the drawings, the sound absorbing structures according to Examples 29 and 32 exhibited high sound absorption coefficients and satisfactory noise insulation effects in a relatively wide frequency range. That is, the sound absorbing structure according to the present invention can be applied to the structure incorporating the porous member of a type constituted by the open-cell structure without any limitation.

As can be understood from the results, the sound absorbing structure according to the present invention exhibits excellent sound absorbing characteristics.

When the positions (dense or sparse) of through holes are arbitrarily changed, the sound absorption coefficient at a required frequency can be raised regardless of the positions (the thickness). When the sound absorbing structure according to the present invention is mounted on a sound insulating cover, the noise level at an arbitrary frequency can be reduced. Thus, a sound absorbing effect can be obtained to meet a purpose.

As described above, according to the present invention, a sound absorbing structure and a sound insulating cover can be provided which have satisfactory sound absorbing characteristics in a wide frequency range and which are capable of improving the sound absorbing characteristics in a required frequency range to meet a requirement.

While only certain embodiments of the invention have been specifically described herein, it will be apparent that numerous modifications may be made thereto without departing from the spirit and scope of the invention.

The present invention is based on Japanese Patent Applications No. Hei. 11-7994, Hei. 11-76152, Hei. 11-76153, and Hei. 11-364690 which are incorporated herein by references.

What is claimed is:

1. A sound absorbing structure comprising at least one porous member including a plurality of holes, wherein said holes are at least one kind of through holes, that penetrate through the porous member, and/or non-through holes, that extend into but do not penetrate through the porous member, wherein 25%-compressive hardness of said porous member is 0.5 N/cm$^2$ or lower, the sound absorbing structure further comprising a coating film formed on at least a surface of said porous member which is opposite to a sound source wherein said holes penetrate said coating film and said porous member, wherein a main component of said porous member is one of urethane foam and a molded fibrous material.

2. The sound absorbing structure according to claim 1, wherein said porous member includes a structure formed by mixing open-cells and closed-cells.

3. The sound absorbing structure according to claim 1, wherein said through holes and non-through holes have plural type of diameters, shape of openings and depths.

4. The sound absorbing structure according to claim 1, wherein the coefficient of water absorption of said porous member is in the range between 0.01 g/cm$^3$ and 0.2 g/cm$^3$, and the bulk density before said holes are provided is in the range between 20 kg/m$^3$ and 400 kg/m$^3$.

5. The sound absorbing structure according to claim 1, wherein a thickness of said porous member varies according to the position, and at least any one of the diameter, the shape of opening, the depth and the position of said holes of said porous member varies according to the thickness.

6. An engine cover comprising a sound absorbing structure according to claim 1.

7. The sound absorbing structure according to claim 1, wherein said holes of porous members are formed as diameter-varied holes, and an area of opening of each said diameter-varied hole formed in the surface opposite to a sound source is largest and the area of opening of each said diameter-varied hole is reduced in a direction of the thickness of said porous member.

8. The sound absorbing structure according to claim 7, wherein the sum of the areas of opening of said diameter-varied holes formed in the surface opposite to the sound source is in the range between 1% and 70%.

9. The sound absorbing structure according to claim 7, wherein the coefficient of water absorption of said porous member is in the range between 0.01 g/cm$^3$ and 0.2 g/cm$^3$, and the bulk density is in the range between 20 kg/m$^3$ and 400 kg/m$^3$.

10. The sound absorbing structure according to claim 7, wherein the thickness of said porous member varies according to the position, and at least any one of the shape of opening, the depth, and the position of each of said diameter-varied holes is varied according to the thickness.

11. An engine cover for an automobile comprising a sound absorbing structure according to claim 7.

12. The sound absorbing structure according to claim 1, wherein said porous member includes continued voids.

13. The sound absorbing structure according to claim 1, wherein a ratio of areas of openings of said holes opened in the surface having said coating film formed thereon is in the range of 1% and 70%.

14. A sound insulation cover comprising a sound absorbing member according to claim 1.

15. The sound absorbing structure according to claim 1, wherein said holes are holes that penetrate through the porous member, said holes extending through the sound absorbing structure.

16. The sound absorbing structure according to claim 1, wherein the sound absorbing structure is without a rear air layer.

17. A sound absorbing structure comprising at least one porous member including a plurality of holes, wherein said holes are at least one kind of through holes, that penetrate through the porous member, and/or non-through holes, that extend into but do not penetrate through the porous member, wherein 25%-compressive hardness of said porous member is 0.5 N/cm$^2$ or lower, wherein a plurality of porous members are stacked, the sound absorbing structure further comprising a coating film formed on at least a surface of said porous member which is opposite to a sound source wherein said holes penetrate said coating film and said porous member, wherein a main component of said porous member is one of urethane foam and a molded fibrous material.

18. The sound absorbing structure according to claim 17, wherein said porous member includes a structure formed by mixing open-cells and closed-cells.

19. The sound absorbing structure according to claim 17, wherein said porous members are stacked along at least one interface of the porous members such that either of said porous members is not secured to another porous member.

20. The sound absorbing structure according to claim 17, wherein said porous members are stacked along at least one interface of the porous members such that either of said porous members is partially secured to another porous member.

21. The sound absorbing structure according to claim 20, wherein the sum of areas with which said porous members are secured to each other is not larger than 50% of the area of the interface.

22. The sound absorbing structure according to claim 20, wherein said porous members are secured to each other by fixing using one of a plurality of pins and sewing.

23. The sound absorbing structure according to claim 17, wherein the coefficient of water absorption of said porous member is in the range between 0.01 g/cm$^3$ and 0.2 g/cm$^3$.

24. The sound absorbing structure according to claim 17, wherein the bulk density of said porous member is in the range between 20 kg/m$^3$ and 400 kg/m$^3$.

25. An engine cover for an automobile comprising a sound absorbing structure according to claim 17.

26. The engine cover according to claim 25, wherein said sound absorbing structure is secured to a cover body using at least one of pins, covering with a net, and sewing.

27. The sound absorbing structure according to claim 17, wherein said porous members include plural types of diameter-varied holes, the areas of opening of which are different from one another, and said through holes are positioned coaxially.

28. The sound absorbing structure according to claim 27, wherein the sum of the areas of opening of said diameter-varied holes formed in the surface opposite to the sound source is in the range between 1% and 70%.

29. The sound absorbing structure according to claim 27, wherein the coefficient of water absorption of said porous member is in the range between 0.01 g/cm$^3$ and 0.2 g/cm$^3$, and the bulk density is in the range between 20 kg/m$^3$ and 400 kg/m$^3$.

30. The sound absorbing structure according to claim 27, wherein the thickness of said porous member varies according to the position, and at least any one of the shape of opening, the depth and the position of each of said diameter-varied holes is varied according to the thickness.

31. An engine cover for an automobile comprising a sound absorbing structure according to claim 27.

32. The sound absorbing structure according to claim 17, wherein a total area of openings of said holes of said sound absorbing member disposed nearest the sound source is largest, the total area of openings of said through holes is gradually reduced as the distance form the sound source is increased and said through holes have the same center.

33. The sound absorbing structure according to claim 17, wherein said porous member includes continued voids.

34. The sound absorbing structure according to claim 17, wherein a ratio of areas of openings of said holes opened in the surface having said coating film formed thereon is in the range of 1% and 70%.

35. A sound insulation cover comprising a sound absorbing member according to claim 17.

* * * * *